US012516326B2

(12) United States Patent
Giuliano et al.

(10) Patent No.: US 12,516,326 B2
(45) Date of Patent: *Jan. 6, 2026

(54) VIRAL VECTORS FOR TREATING NEUROGENIC DETRUSOR OVERACTIVITY

(71) Applicants: UNIVERSITE DE VERSAILLES—ST QUENTIN EN YVELINES, Versailles (FR); ASSISTANCE PUBLIQUE—HOPITAUX DE PARIS, Paris (FR)

(72) Inventors: François Giuliano, Paris (FR); Alberto Epstein, Montigny-le-Bretonneux (FR); Olivier Le Coz, Le Mesnil saint denis (FR); Alejandro Aranda, Pamplon (ES)

(73) Assignees: UNIVERSITE DE VERSAILLES—ST QUENTIN EN YVELINES, Versailles (FR); ASSISTANCE PUBLIQUE—HOPITAUX DE PARIS, Paris (FR)

(*) Notice: Subject to any disclaimer, the term of this patent is extended or adjusted under 35 U.S.C. 154(b) by 99 days.

This patent is subject to a terminal disclaimer.

(21) Appl. No.: 17/866,022

(22) Filed: Jul. 15, 2022

(65) Prior Publication Data

US 2023/0134548 A1    May 4, 2023

Related U.S. Application Data

(63) Continuation of application No. 16/312,867, filed as application No. PCT/EP2017/065587 on Jun. 23, 2017, now Pat. No. 11,414,666.

(30) Foreign Application Priority Data

Jun. 23, 2016   (EP) .................................... 16305765

(51) Int. Cl.
| | | |
|---|---|---|
| A61P 13/06 | (2006.01) | |
| A61K 38/16 | (2006.01) | |
| A61K 38/17 | (2006.01) | |
| A61K 38/45 | (2006.01) | |
| A61K 38/48 | (2006.01) | |
| A61K 38/51 | (2006.01) | |
| C12N 15/11 | (2006.01) | |
| C12N 15/113 | (2010.01) | |
| C12N 15/86 | (2006.01) | |
| C12N 15/869 | (2006.01) | |

(52) U.S. Cl.
CPC ........ *C12N 15/1138* (2013.01); *A61K 38/164* (2013.01); *A61K 38/1793* (2013.01); *A61K 38/45* (2013.01); *A61K 38/4893* (2013.01); *A61K 38/51* (2013.01); *A61P 13/06* (2018.01); *C12N 15/86* (2013.01); *C12Y 304/24069* (2013.01); *C12Y 401/01015* (2013.01); *C12N 2310/11* (2013.01); *C12N 2320/31* (2013.01); *C12N 2320/32* (2013.01); *C12N 2710/16643* (2013.01); *C12N 2830/008* (2013.01); *C12N 2830/40* (2013.01)

(58) Field of Classification Search
CPC ....... A61P 13/06; C12N 15/11; C12N 15/869; A61K 38/16; A61K 38/4893
See application file for complete search history.

(56) References Cited

U.S. PATENT DOCUMENTS

| | | | |
|---|---|---|---|
| 6,812,339 B1 | 11/2004 | Venter et al. | |
| 11,414,666 B2* | 8/2022 | Giuliano et al. | ... C12N 15/1138 |
| 2015/0297649 A1* | 10/2015 | Goins et al. | ......... A61K 35/763 |

FOREIGN PATENT DOCUMENTS

| | | | | |
|---|---|---|---|---|
| WO | WO 99/03483 A1 | 1/1999 | | |
| WO | WO2004111074 A2 * | 12/2004 | | |
| WO | WO 2006/050211 A2 | 5/2006 | | |
| WO | WO 2010/022979 A1 | 3/2010 | | |
| WO | WO 2013/180799 A1 * | 12/2013 | ............. | A61K 38/48 |
| WO | WO2015009952 A1 * | 1/2015 | ........... | C12N 15/869 |
| WO | WO 2017/004514 A1 | 1/2017 | | |

OTHER PUBLICATIONS

Berthomme et al (2001) "Enhancer and long-term expression functions of herpes simplex virus type 1 latency-associated promoter are both located in the same region" Journal of Virology, 75(9), 4386-4393. (Year: 2001).*
Amelio et al. (2006) "A chromatin insulator-like element in the herpes simplex virus type 1 latency-associated transcript region binds CCCTC-binding factor and displays enhancer-blocking and silencing activities" Journal of virology, 80(5), 2358-2368. (Year: 2006).*
Washington et al. (2018) "Depletion of the insulator protein CTCF results in herpes simplex virus 1 reactivation in vivo" Journal of virology, 92(11), e00173-18. (Year: 2018).*
GenBank Accession No. M34090.1, "Rat calcitonin gene related peptide (CGRP) gene, 5' flank", entered: Apr. 27, 1993, available from: National Library of Medicine, National Center for Biotechnology Information, https://www.ncbi.nlm.nih.gov/nuccore/M34090.1. (Year: 1993).*
Su et al. (Jun. 9, 2015) "Preclinical assessment of potential interactions between botulinum toxin and neuromodulation for bladder micturition reflex" BMC urology, 15(1), 1-7. (Year: 2015).*
Kumar et al. (Feb. 2016) "The botulinum toxin as a therapeutic agent: molecular structure and mechanism of action in motor and sensory systems" In Seminars in neurology (vol. 36, No. 01, pp. 010-019), Thieme Medical Publishers. (Year: 2016).*

(Continued)

*Primary Examiner* — James Joseph Graber
(74) *Attorney, Agent, or Firm* — Elmore Patent Law Group, P.C.; Joseph C. Zucchero; Carolyn S. Elmore

(57) ABSTRACT

The present invention provides a method and a pharmaceutical composition for the treatment of the NDO comprising the viral expression vector carrying a transcription cassette that harbors transgene(s) inhibiting/silencing neurotransmission or synaptic transmission of afferent neurons.

8 Claims, 13 Drawing Sheets

Specification includes a Sequence Listing.

(56) References Cited

OTHER PUBLICATIONS

Doyal et al. (2014) "319. In Vivo Transcriptional Targeting of HSV Vector Mediated Transgene Expression in Sensory Neuron Subpopulations" Molecular Therapy, vol. 22, Supplement 1, S123. (Year: 2014).*
Fowler, C. J. (2011) "Systematic review of therapy for neurogenic detrusor overactivity" Canadian Urological Association Journal, 5(5 Suppl 2), S146-S148. (Year: 2011).*
Pirazzini et al. (Apr. 2017) "Botulinum neurotoxins: biology, pharmacology, and toxicology" Pharmacological reviews, 69(2), 200-235. (Year: 2017).*
Durham et al. (2004) "Regulation of calcitonin gene-related peptide secretion from trigeminal nerve cells by botulinum toxin type A: Implications for migraine therapy" Headache: The Journal of Head and Face Pain, 44(1), 35-43. (Year: 2004).*
Bose et al. (2022) "A Brief Introduction to Recombinant DNA Technology" In: Textbook on Cloning, Expression and Purification of Recombinant Proteins (pp. 1-12), Singapore: Springer Nature Singapore. (Year: 2022).*
"Sensorimotor" Merriam-Webster.com Dictionary, Merriam-Webster, https://www.merriam-webster.com/dictionary/sensorimotor, accessed May 14, 2024. (Year: 2024).*
Smith et al. (2004) "Botulinum toxin a has antinociceptive effects in treating interstitial cystitis" Urology, 64(5), 871-875. (Year: 2004).*
Oxford English Dictionary, s.v. "deafferentation (n.)," Dec. 2023, https://doi.org/10.1093/OED/4912814174. (Year: 2023).*
Crawford et al. (2020) "Functional anatomy of the sensory nervous system: updates from the neuroscience bench" Toxicologic pathology, 48(1), 174-189. (Year: 2020).*
"Sensory neuron" (Aug. 2, 2024), in Wikipedia, https://en.wikipedia.org/wiki/Sensory_neuron, webpage. (Year: 2024).*
"Motor neuron" (Apr. 27, 2024), in Wikipedia, https://en.wikipedia.org/wiki/Motor_neuron, webpage. (Year: 2024).*
"Unsuitable" Merriam-Webster.com Dictionary, Merriam-Webster, https://www.merriam-webster.com/dictionary/unsuitable, accessed Aug. 14, 2024. (Year: 2024).*
Munoz et al. (2011) "Central inhibitory effect of intravesically applied botulinum toxin A in chronic spinal cord injury" Neurourology and urodynamics, 30(7), 1376-1381 (Abstract only). (Year: 2011).*
Olejniczak et al. (2025) "Transcriptomic analysis of the TRP gene family in human brain physiopathology" Frontiers in Molecular Neuroscience, 18, 1576941, 11 pages. (Year: 2025).*
GenBank DQ015702.1, "Rattus norvegicus transient receptor potential vanilloid subtype-1 (TRPV1) gene, and promoter regions", entered: May 1, 2006. (Year: 2006).*
Xue et al. (2007) "Transcription of rat TRPV1 utilizes a dual promoter system that is positively regulated by nerve growth factor" Journal of neurochemistry, 101(1), 212-222. (Year: 2007).*
Amelio et al., "A Chromatin Insulator-Like Element in the Herpes Simplex Virus Type 1 Latency-Associated Transcript Region Binds CCCTC-Binding Factor and Displays Enhancer-Blocking and Silencing Activities," Journal of Virology, vol. 80, No. 5, Mar. 2006, pp. 2358-2368.
Berthomme et al., "Enhancer and Long-Term Expression Functions of Herpes Simplex Virus Type 1 Latency-Associated Promoter Are both Located in the Same Region," Journal of Virology, vol. 75, No. 9. May 2001, pp. 4386-4393.
Berthomme et al., "Evidence for a Bidirectional Element Located Downstream from the Herpes Simplex Virus Type 1 Latency-Associated Promoter That Increases Its Activity during Latency," Journal of Virology, vol. 74, No. 8, Apr. 2000, pp. 3613-3622.
Brindley et al., "Sacral anterior root simulators for bladder control in paraplegia: the first 50 cases," Journal of Neurology, Neurosurgery, and Psychiatry, vol. 49, 1986, pp. 1104-1114.
Doyal et al., "319. In Vivo Transcriptional Targeting of HSV Vector Mediated Transgene Expression in Sensory Neuron Subpopulations," Molecular Therapy, vol. 22, Supplement 1, May 2014, p. S123.
Epstein, "HSV-1-derived amplicon vectors: recent technological improvements and remaining difficulties—A Review," Mem Inst Oswaldo Cruz, vol. 104, No. 3, May 2009, pp. 399-410.
Fowler et al., "The neural control of micturition," Nat Rev Neurosci, vol. 9, No. 6, Jun. 2008, pp. 453-466 (28 pages total).
Fowler, "Systematic review of therapy for neurogenic detrusor overactivity," Canadian Urological Association, vol. 5, Oct. 2011, pp. S146-8148.
Furuta et al., "Latent Herpes Simplex Virus Type 1 in Human Vestibular Ganglia," Acta Oto-Laryngologica, Suppl. 503, 1993 (published online Jul. 8, 2009). pp. 85-89 (6 pages total).
Habermann et al., "Clostridial Neurotoxins: Handling and Action at the Cellular and Molecular Level," Current Topics in Microbiology and Immunology, vol. 129, 1986, pp. 93-179 (88 pages total).
International Search Report for International Application No. PCT/EP2017/065587, dated Sep. 15, 2017.
Lokensgard et al., "The Latency-Associated Promoter of Herpes Simplex Virus Type 1 Requires a Region Downstream of the Transcription Start Site for Long-Term Expression during Latency," Journal of Virology, vol. 71, No. 9, Sep. 1997, pp. 6714-6719.
Marconi et al., "HSV-1-derived helper-independent defective vectors, replicating vectors and amplicon vectors, for the treatment of brain diseases," Current Opinion in Drug Discovery & Development, vol. 13, No. 2, 2010, pp. 169-183.
Martens et al., "Clinical Results of a Brindley Procedure: Sacral Anterior Root Stimulation in Combination with a Rhizotomy of the Dorsal Roots," Advances in Urology, vol. 2011, 2011, pp. 1-7 (8 pages total).
Matak et al., "Botulinum toxin A. brain and pain," Progress in Neurobiology, vol. 119-120, 2014 (published online Jun. 7, 2014), pp. 39-59.
McCart et al., "Development of a Melanoma-Specific Adenovirus, " Molecular Therapy, vol. 6, No. 4, Oct. 2002, pp. 471-480.
Miyazato et al., "Herpes simplex virus vector-mediated gene delivery of gutamic acid decarboxylase reduces detrusor overactivity in spinal cord injured rats," Gene Ther., vol. 16, No. 5, May 2009, pp. 660-668 (20 pages total).
Morrison et al., "Neural Control," Incontinence. Plymouth: Health, 2005, pp. 363-422.
Perng et al., "The Spontaneous Reactivation Function of the Herpes Simplex Virus Type 1 LAT Gene Resides Completely within the First 1.5, Kilobases of the 8.3-Kilobase Primary Transcript," Journal of Virology, vol. 70, No. 2, Feb. 1996, pp. 976-984.
Ren et al., "Electrical Nerve Stimulation to Promote Micturition in Spinal Cord Injury Patients: A Review of Current Attempts," Neurology and Urodynamics, vol. 35, Feb. 8, 2015, pp. 365-370.
Stolarsky-Fredman et al., "Rat calcitonin gene related peptide (CGRP) gene, 5' flank, " Database EMBL, accession No. M34090, Jun. 22, 1990, 2 pages.
Su et al., "Preclinical assessment of potential interactions between botulinum toxin and neuromodulation for bladder micturition reflex," BMC Urology, published online Jun. 9, 2015, pp. 1-7.
Sugiyama, "Clostridium botulinum Neuorotoxin," Microbiological Reviews, vol. 44, No. 3, Sep. 1980, pp. 419-448.
Tanaka et al., "Construction of an Excisable Bacterial Artificial Chromosome Containing a Full-Length Infectious Clone of Herpes Simplex Virus Type 1: Viruses Reconstituted from the Clone Exhibit Wild-Type Properties ... ," Journal of Virology, vol. 77, No. 2, Jan. 2003, pp. 1382-1391.
Teng et al., "Adenoviral clostridial light chain gene-based synaptic inhibition through neuronal synaptobrevin elimination," Gene Therapy, vol. 12, 2005, pp. 108-119.
Warren et al., "Isolation of Latent Herpes Simplex Virus From the Superior Cervical and Vagus Ganglions of Human Beings," The New England Journal of Medicine, vol. 298, No. 19, May 11, 1978, pp. 1068-1069.
Xue et al., "Rattus norvegicus transient receptor potential vanilloid subtype-1 (TRPV1)," Database EMBL, accession No. EMBL:DQ015702, May 2006, 3 pages.

(56) References Cited

OTHER PUBLICATIONS

Yokoyama et al., "Gene Therapy for Bladder Overactivity and Nociception with Herpes Simplex Virus Vectors Expressing Preproenkephalin," Human Gene Therapy, vol. 20, Jan. 2009 (published online Jan. 14, 2009), pp. 63-71.

Yoshikawa et al., "Suppression of Detrusor Overactivity by Herpes Simplex Virus (HSV) Vector-Mediated Delivery of Glial Cell Line-Derived Neurotrophic Factor (GDNF) in Spinal Cord Injured Rats," International Continence Society 2013, Aug. 28, 2013, pp. 71-72.

Zaupa et al., Improved Packaging System for Generation of High-Level Noncytotoxic HSV-1 Amplicon Vectors Using Cre-1oxP Site-Specific Recombination to Delete the Packaging Signals of Defective Helper Genomes, Human Gene Therapy, vol. 14, Jul. 20, 2003, pp. 1049-1063.

Del Popolo et al., "Neurogenic Detrusor Overactivity Treated with English Botulinum Toxin A: 8-Year Experience of One Single Centre," European Urology, vol. 53, 2008, pp. 1013-1020.

Sin et al., "Preferential expression of an AAV-2 construct in Nos. positive intemneurons following intrastriatal injection," Molecular Brain Research, vol. 141, 2005, pp. 74-82.

De Groat, W. C, et al., "Mechanisms underlying the recovery of lower urinary tract function following spinal cord injury", Prog Brain Res., 152, DOI: 10.1016/S0079-6123(05)52005-3, 2006, 59-84.

De Groat, W. C, "Spinal cord projections and neuropeptides in visceral afferent neurons", Prog Brain Res., 67, DOI: 10.1016/s0079-6123(08)62762-4, 1986, 165-187.

Ross, J., "mRNA Stability in Mammalian Cells", Microbiological Reviews, 59(3), 423-450.

Toyama, B. H, et al., "Protein homeostasis: live long, won't prosper", Nat. Rev. Mol. Cell Biol., 14(1), Jan. 2013, 55-61.

Prescribing Information for BOTOX® (Nov. 2023).

Brenner, M., et al., "GFAP promoter directs astrocyte-specific expression in transgenic mice", J Neurosci., 14(3 Pt 1), Mar. 1994, 1030-1037.

Flatters, S. J, "Characterization of a model of persistent postoperative pain evoked by skin/muscle incision and retraction (SMIR)", Pain, 135(1-2), Mar. 2008, 119-30.

Forss-Peter, S., et al., "Transgenic mice expressing beta-galactosidase in mature neurons under neuron-specific enolase promoter control", Neuron, 5(2), Aug. 1990, 187-197.

Modi, A. D, et al., "Evaluating pain behaviours: Widely used mechanical and thermal methods in rodents", Behavioural Brain Research, 446, May 28, 2023.

Radhakrishnan, P., et al., "Cell Type-Specific Activation of the Cytomegalovirus Promoter by Dimethylsulfoxide and 5-Aza-2'-deoxycytidine", Int J Biochem Cell Biol., 40(9), 2008, 1944-1955.

Ratelade, J., "Intravesical administration of EG110A, a novel non-replicative herpes simplex virus Type 1 (HSV1)-derived vector expressing the light chain of botulinum toxin F, inhibits C-type fibers in an acute intravesical capsaicin rat model", Press Release of EG 427 presents positive preclinical data on lead asset EG110A at International Continence Society meeting, Sep. 27-29, 2023 in Toronto, Canada, Sep. 13, 2023.

Brindley, G. S., "The First 500 Patients With Sacral Anterior Root Stimulator Implants: General Description", Paraplegia, 32, 1994, 795-805.

Eleopra, R., "Biology and Clinical Pharmacology of Botulinum Neurotoxin Type C and Other Non-A/Non-B Botulinum Neurotoxins", Botulinum Toxin: Therapeutic Clinical Practice and Science, 1st ed., Chap. 6, J. Jankovic et al. (Eds), 2009, 77-84.

Handy, C., "Pain in Amyotrophic Lateral Sclerosis: A Neglected Aspect of Disease", Neurol. Res. Int., 2011, Art. 403808, doi:10.1155/2011/403808, Mar. 6, 2011, 1-8.

Hussain, "Neuromodulation for lower urinary tract dysfunction-an update", The Scientific World Journal, 7, Jun. 22, 2007, 1036-1045.

Patel, A., "Botulinum Toxin Injections for Neurogenic and Idiopathic Detrusor Overactivity: A critical Analysis of Results", European Urol., 50(4), doi:10.1016/j.eururo.2006.07.022, Aug. 4, 2006, 684-710.

* cited by examiner

A2- Therapeutic gene product

| Family | Promoter | Therapeutic gene |
|---|---|---|
| A2 | CMV | BoNT-X |
| A2 | CMV | TeNT |
| A2 | CMV | BoNT-X-SNARE-Y |
| A2 | CMV | GAD67 |
| A2 | CMV | NTR |
| A2 | CMV | Luc |
| A2 | CMV | AS-SNARE-X |

B.

A5-DRG specific promoters

| Family | DGR-promoter | Reporter gene |
|---|---|---|
| A5 | EF1a | Luciferase |
| A5 | rTRPV1 | Luciferase |
| A5 | rASIC3 | Luciferase |
| A5 | rCGRP | Luciferase |
| A5 | hCGRP | Luciferase |
| A5 | rADVL | Luciferase |
| A5 | hADVL | Luciferase |
| A5 | LAP1 | Luciferase |
| A5 | LAP2 | Luciferase |

C.

A8- Therapeutic cassettes

| Family | DRG-promoter | Therapeutic gene |
|---|---|---|
| A8 | EF1A | BoNT-F |
| A8 | rTRPV1 | BoNT-A-STX |
| A8 | hADVL | TeNT |
| A8 | hCGRP | GAD67 |
| A8 | rCGRP | NTR |
| A8 | hADVL | BoNT-F |
| A8 | rTRPV1 | GAD67 |
| A8 | hADVL | NTR |
| A8 | rCGRP | Luc |
| A8 | hCGRP | BoNT-A-STX |
| A8 | rADVL | GAD67 |
| A8 | hCGRP | BoNT-F |
| A8 | hCGRP | AS-SNARE-X |

A
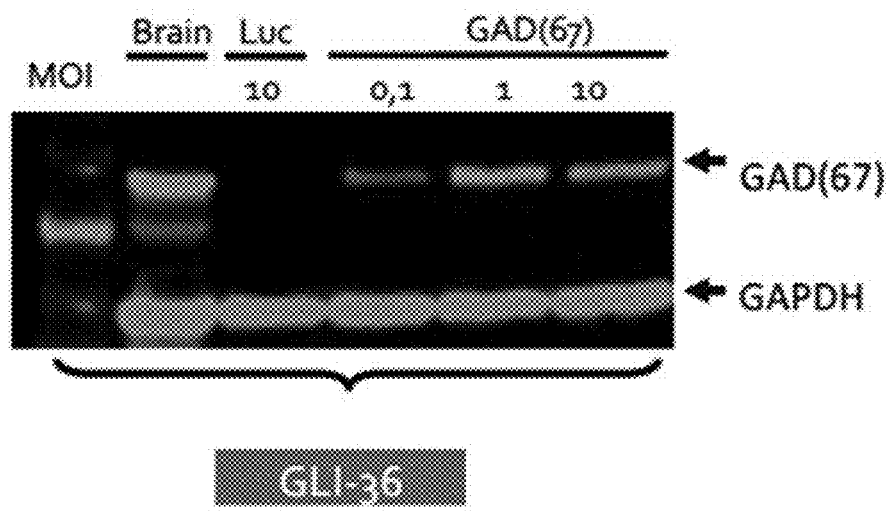
WB of GAD67 24h post infection in GLI-36 cells (n=1)
B
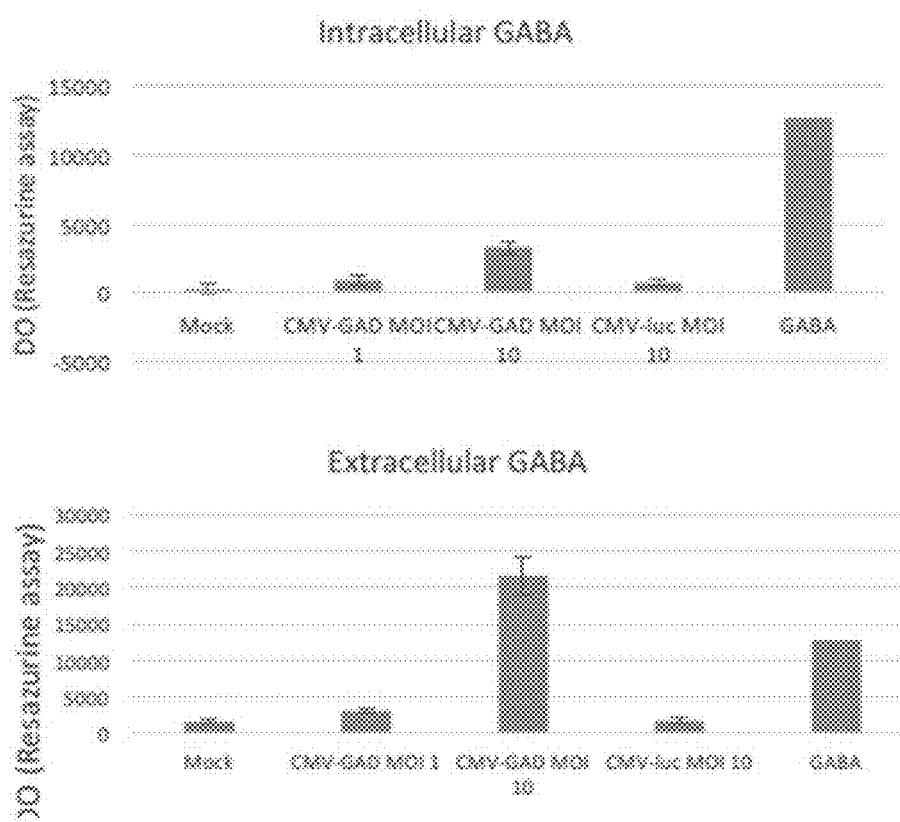
GABA release in primary cultures of embryonic rat DRG neurons (n=6)
Fig. 11

A
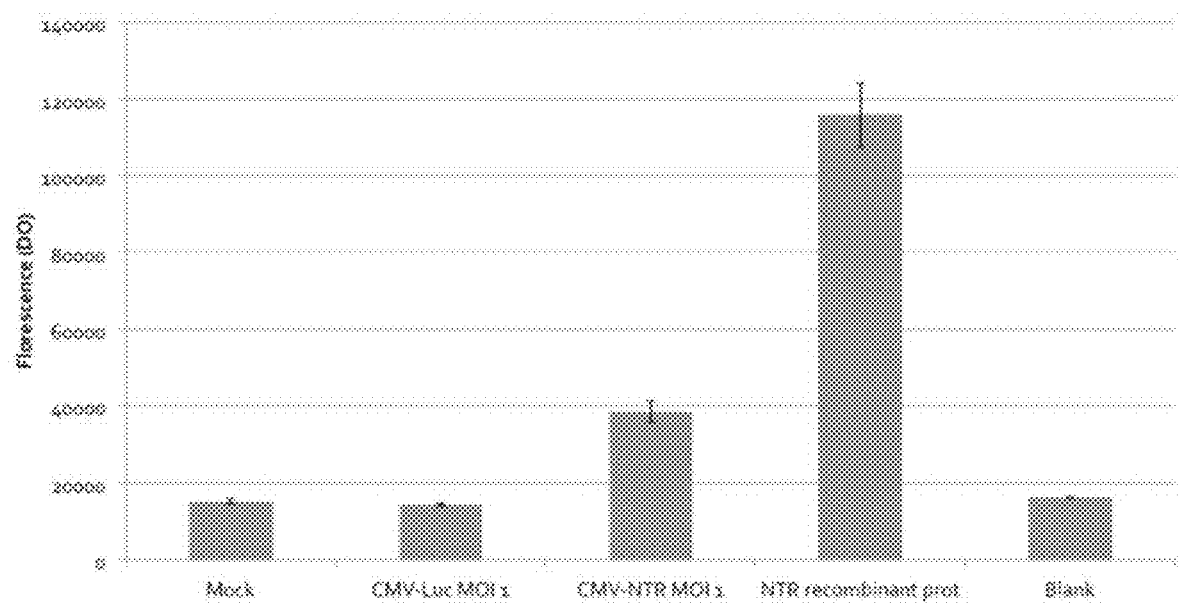
Gli 36 cells – reduction of 7'nitrocoumarin at 48 hs pi.
B
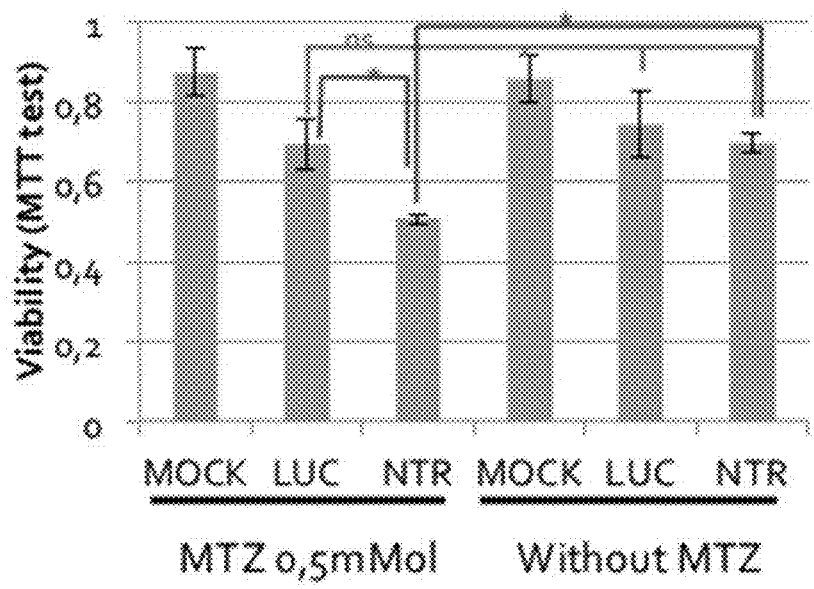
Gli 36 cells – MTT assay at 24 hs pi.
Fig. 12

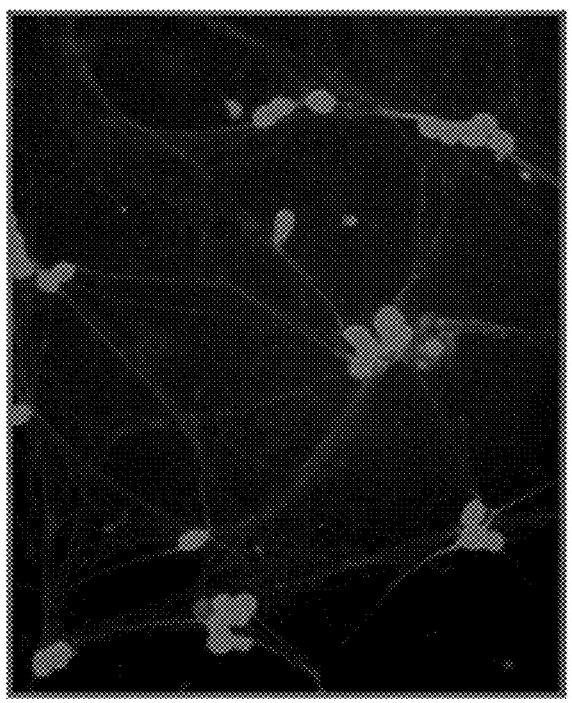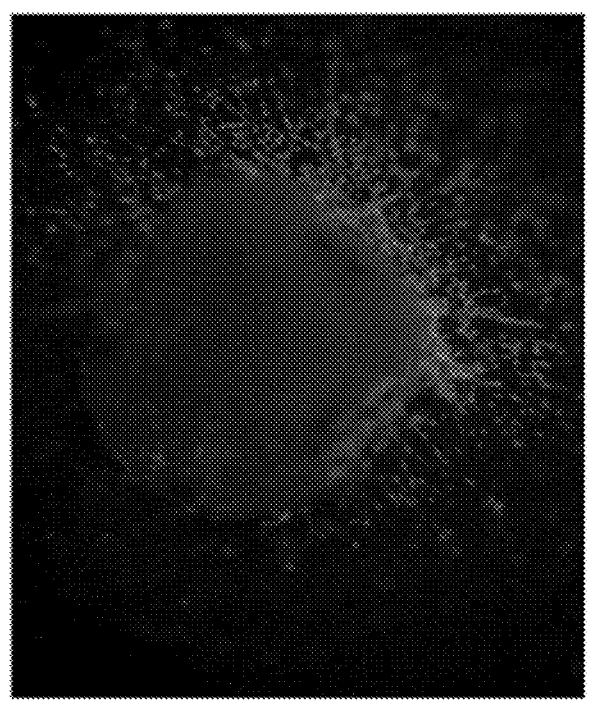
Fig. 14

SEQUENCE LISTING

```
Sequence total quantity: 33
SEQ ID NO: 1            moltype = DNA  length = 1020
FEATURE                 Location/Qualifiers
source                  1..1020
                        mol_type = genomic DNA
                        organism = Rattus norvegicus
SEQUENCE: 1
atatggagag gtggggtgag gggtggcaga gagggatcga gagaggagag aggggaacca  60
gatgtagcag ccaggaggcc aaaggtacaa aaggggtggg taaccaaaat gtctggatta 120
tataaaaaag agccagaggt caggcccact ttgatatgtt aaataggcac ctcagccatt 180
tatccaggtt tgaaatgtaa tataatttac atccccctgg cttcctagag accgttgttt 240
agacggatga cctctgcaga atgtttgagg gtgcagtctt gcatgtactc cctggtgggc 300
tttcttgggc aggatctggg caggaatggg cttgttctag tcacccactg cgtatgatgg 360
atgaacccgc ttcctagtag ttaggatggc actggggag gcgagaaatt agcacacgta 420
acgttttctt gtgttctatt gttcactaag ggaccccagt caagcaagac tgggccttgg 480
aagacctaga gaccaccaaa cctaatctct accccgggtc tgagtacaca gggactcaga 540
gtcccaaagg gggcagggcc tccagacagg tggctcagag gtcccagtcc tttggaaaca 600
tggcatcttc aggacactgg gctttgcatc tctggctgtg acagtccttt aagggagcta 660
ctcctcagac atacaggaga gatggtttgg aaagtccgag atccaaagcc tggttcaggc 720
tggactgggc tgcaggctgc taagtgctcc tctgccctgg catggctggg ggtggggcat 780
tggctgtggt ttctgaaaaa gggcaaaaat gatgggaaaa gctttgggat cctctgggaa 840
tcggagccgt ggtaacagca gctgctgcca ttgctgcaaa tgtttccttg agtgccagag 900
tatgcccaga gcccatccct gccgtacgcc aggggagggg cgaggaccct cacagaggca 960
gggaggccgg ccactcttac cacacagcag cctggctctc ccacaaagaa cagctatgca 1020

SEQ ID NO: 2            moltype = DNA  length = 975
FEATURE                 Location/Qualifiers
source                  1..975
                        mol_type = genomic DNA
                        organism = Homo sapiens
SEQUENCE: 2
gacttaccag gagctagggc atttataagc attgtgccct gaagataagt tcacccagg   60
cagttctgaa aaggactcgt caaacatgtc ctgctgtaga ataatttcta aaaatgtttt 120
tcagatctta ggagtaatat aaacatgcag aaaagtagaa ggaagaaaat aatgacctga 180
tacaaactaa aggtttgagt gctgtgtgaa cagtctaagg gaggttattg aattggggtg 240
aaaagaatag aaagaagagc gcagataatt gtaatagtaa caatagctaa tatttattga 300
agctttccca tgctgggcac aggttcaagt gctttacagg ggtcgcctca tttaattatt 360
actcatttct gtgtaggtgt gtagccggtg ggctagttca ggttcttgac tttgggacag 420
aaaataattt gaaagtgagt caaaagcaaa agcaagcaag agagttgact gcaaagccaa 480
agtacactct agcagccggt gcaaacgggc cactcaaagg caagacagct ctgtctaata 540
ctgggggatc tcccttatg ggaaatttgc atgattattc atgaagggt ggtaagggt 600
gttgctatta agcatgttag gagtggtttc ttaggtccac atgtgcagtg gctgtacatg 660
ctagtacatc catcgcatgt cttataagca ttttaaatct ccacctgggg gtgtgttttt 720
tactattata atgagcacag gtcagcccaa ggacactaat cacgggtttc tgtgcttgta 780
caaatgtggg gatttttctc ttctgctcct gcctttttgc tgtagggtgt tctaaccacg 840
agctcaggat gcggtctgtg cactgttagg tggtttgttc tcttcatcaa tttgacaagt 900
ttcttgtttc ctgtcaaggg aggctctgac cacctcatct aacctgcctc aggtgcagcc 960
ttattgccat tttac                                                  975
```

```
SEQ ID NO: 3              moltype = DNA    length = 1360
FEATURE                   Location/Qualifiers
source                    1..1360
                          mol_type = genomic DNA
                          organism = Rattus sp.
SEQUENCE: 3
gagggacttg aaggcaggct tgggacaatt tgagaatgaa cccctaagga tgcttctgtg     60
ggccacagag actgctgagt ggctgtgctt tctggatacg gtaccatttt ggaaagagag    120
gagagtctct gtgccaggag aagtgtgact ggtagtgaat gtgaggttta gtacggggca    180
acatctccac agcgctgtca agcctgcctg cctgctcttc agctctttag ctcggagatc    240
taagggtggg ggtaggaggg gagccaccgg accaaataca actggacat cttggcaaac     300
agcagcggga agcaaagggg cagctgtgca aatccttagg caggcgggcg ggcgggcagg    360
cgggcgggcg ggcgggcagg cgggcaggcg ggcgggcagg cggccggatg agtagtgatg    420
gatagccagg caggaggtgg agagatctac actggagact ttagaggcat ctggtccttc    480
ctcacactgt ccccactacc ccgtacccct actccctacc caagcagga cccagctgaa     540
tacaacccct tctcacacat gtgagtgagt gagttatcca gcacataaga atgccaagct    600
gaagacggat gattcacttt ggggaaggag agattttata gctcaggaaa caccaaggtt    660
tctgcctact agccaggccc ttcaaaaggg gaccaggata ccactgaaa agtttaatat     720
gttgagcttt cgtgcaggcc tttggggggt tggggggggg gaattttga attttttttt     780
tcgtttttgtt tttacctgtg gtcacataac cagcacgagg cagctacaag gttcaggtct    840
gacagagccc ctgtgtccag caccaacacc tttggctatc agcctaaacc tgtgccaccc    900
tgccaaagcc agccttgcag accaagagtc caccctacg gtgcactaaa gtcttccgga    960
ttaggcacgg actagggtcg gggcacgatt agaatcagac atgcagcaag gagtacttga    1020
gatactggac tctactctcc aaggtccaga gattggagtc gggatgttc aaagtcagga    1080
gggaagaaga gataaaattt accttgacgt caaaaggccc tccaaattcc cgctaatttt    1140
aagggtggtt ctcactgctc cccaccatcc tcccacttcc atcaatgact caatttaaa    1200
ttcaaatggt gtcatcttgc tagatgctcg gagttctgga agcaccgagg tgacgcaatc    1260
tgtctggggc acgggccct tccacctatt ggctgcctgg cgccccggga ccctcccaa     1320
ctaccgcggc gggaataaga gcagctgcag gcgcttggaa                          1360

SEQ ID NO: 4              moltype = DNA    length = 1837
FEATURE                   Location/Qualifiers
source                    1..1837
                          mol_type = genomic DNA
                          organism = Homo sapiens
SEQUENCE: 4
gatcaattaa gggcatctta gaagttaggc gttcccgctg cctcctttga gcacggaggc     60
caccaacccc ctaggggaa gagatgtagc gcgaggcagg ggtgtcgtgc taagaaattt     120
cgacgcttct ggggactgag gacaaaggtg cggacacgac cccggggtac ctggagttcc    180
gtgactcgcg ccacggacgg cacacctagg ggctaatttc tgctctgcct caaagaacct    240
caagctagag tccttgcctc cgcccacagc cccgggatgc cgctgctgcg ctcaccgcac    300
aggcagcgcc cggaccggct gcagcagatc gcgcgctgcg cgttccaccg ggagatggtg    360
gagacgctga aaagcttctt tcttgccact ctggacgctg tgggcggcaa gcgccttagt    420
ccctacctct gctgagctga acgctcaggc acagtggaac tgaaaccggg ttctgcggga    480
tgtgagagct gttgaggtca cgcgtaattg ggtgtgatgg agggcgcctg ttcgtgatgt    540
gtgcaggttt gatgcaagca ggtcatcgtc gtgcgagtgt gtggatgcga ccgcccgaga    600
gactcggagg caggcttggg acacgtttga gtgaacacct caggatactc ttctggccag    660
tatctgttttt ttagtgtctg tgattcagag tgggcacatg ttgggagaca gtaatggtt    720
tgggtgtgtg taaatgagtg tgaccggaag cgagtgtgag cttgatctag cagggacca     780
cacagcactg tcacacctgc ctgctcttta gtagaggact gaagtgcggg ggtggggta    840
cggggccgga ataaatgtc tctgggacat ctttggcaaac agcagccgga agcaaagggg    900
cagctgtgca aacggctcag gcaggtgatg gatggcaggg taggaagggg gaggtccaga    960
ggtctggatg gaggcttccg catctgtacc ttgcaactca cccctcaggc ccagcaggtc    1020
atcgccccc tcctcacaca tgtaatggat ctgaagagta cccccgggaca gtccggggag    1080
atggagattc ggaaagtatc catggagtct ttacagaatc ccctatgcgg accaggaaac    1140
tcttgtagat ccctgcctat ctgaggccca ggcgctgggc tgtttctcac aatattcctt    1200
caagatgaga ttgtggtccc catttcaaag atgagtacac tgagcctctg tgaagttact    1260
tgcccatgat cacacaacca ggaattgggc caactgtaat tgaactcctg tctaacaaag    1320
ttcttgctcc cagctccgtc tcttgtttcc cacgagccct ggccctctgt gggtaataac    1380
agctactgga gtcagatttc ttgggccag aacccacct tagggggcatt aactcttaaa    1440
atctcacttg gcaggggtc tgggatcaga gttggaagag tccctacaat cctgaccct     1500
ttccgccaaa tcgtgaaacc aggggtggag tgggcgagg gttcaaaacc aggccggact    1560
gagaggtgaa attcaccatg acgtcaaact gccctcaaat tcccgctcac tttaagggcg    1620
ttacttgttg gtgccccac catccccac catttccatc aatgacctca atgcaaatac    1680
aagtgggacg gtcctgctgg atcctccagg ttctgaagc atgagggtga cgcaaccag     1740
gggcaaagga cccctccgcc cattggttgc tgtgcactgg cggaactttc ccgacccaca    1800
gcggcggaa taagagcagt cgctggcgct gggaggc                               1837

SEQ ID NO: 5              moltype = DNA    length = 1633
FEATURE                   Location/Qualifiers
source                    1..1633
                          mol_type = genomic DNA
                          organism = Rattus sp.
SEQUENCE: 5
tggccctgcc ctgccctgtt cagaggcttc ttggcagtgc ggcccatttg tgctgtcctg     60
catccagtgt atcagcctag ctaagtgtga gccattccca ttgggggcta ctcttcagtt    120
cctttttttaa aatagcttag ccctctccct tacctctacc cctagacagg gtttcatgaa    180
ttccaagcag gggcctcaac tcacatttag ccaggaatga tcttgaactg acctcctgag    240
tgctggggtt acaggtgtga tcaccttgct gcttaggag gtgctgggaa caacccaggg    300
```

```
catcgtgtgt gttaagcaca cactcccagc taagctacat ccccagtccc tctttctaga   360
aaacatcatt agttaaatat attcagggga gaagaggtca caggtctggc cagctgcccc   420
atcctttagt gcagggtcag ctcccagaac tgctctgctc tgctctgcaa gctggtgatt   480
ctccttacct gtgattactc cagatctgcc tatttccaag atgccatttg aaggggaggg   540
gtctgcttcc cactgtgact gggctatggg atccttgacc ccttgcttc atgatttgat    600
acatttgttg tattcaaaaa cttgaactgt aggatgccat taagagtctg ttatatttt    660
tggaatattt gtattacaat tgttttaata aaggccggtt taaaaaccta tgcatgagtg   720
ggggctgctt tccttcccg ccactggtcc cacacacggt ggacgctgtt cttcccgtat    780
tcccttttg gtcctaagat tatagcaccc agcagaacaa acactgggtt ctgatcaagg    840
ttgcaaaggt tggactgcat tagctcttct ctggcccagg ttggaaccaa ctccctctcc   900
cctgggtact tagcaaacat gtgcttgctg tgctattgac tgctgggtat agactgaagc   960
ccttggggaa ttggggactc ctgtgcatgc tcttgatact gccaaacagg agccatgaga  1020
ctcagagccc agcacggttt ccaggcacat agtaggagga cttgtaaaga ctaaacaaaa  1080
gctttcctat caccacaaat ttgcccagaa tcatctcgaa atcctgaaca tccaggcata  1140
cagtaggaga gctctagcca gccgcctgtc atcagcataa tacattcata tctacaatat  1200
ggcaaattca tatcctccct cactgaatta tgatggact ctgcactttt aaaaaaatca   1260
atagaccagg ggtggagctg gagttaaaag aagcctttaa aagtctgctc ttcttgtttt  1320
tgctgttttg aataggagca gataaagctt tccccgctgg tttgaataag tcaagcccaa  1380
ggctaggtcg gctgtgattg gccagagctg ggaaaatgtg gttatgatgc aaacgcaagc  1440
aaatataacc cagtgtctgt gtgctgtgtg gccattgctg aaacaggctt caggacccga  1500
ggtcgcctgc ttcgggaccg ctcgtcagta cttcacctgc tgctttgctg ggaaagggag  1560
aacagagggt caggtaaggt ctactgtgtg tgtccttgtc agctgaaggt gaggggacag  1620
gggtcacgcc ttc                                                     1633

SEQ ID NO: 6        moltype = DNA  length = 1460
FEATURE             Location/Qualifiers
source              1..1460
                    mol_type = genomic DNA
                    organism = Homo sapiens
SEQUENCE: 6
gcagcacagg gtggggcagc acaagttatc aaattaaatt ctcaaacact ggctgctccg     60
caccattgcc ttgctttagt cctgctacag cagtagacaa agcgagtctg ctttgagctt    120
tatggttttt tgccaaagtc catactagat ggcgcatgct ctccaaactt ggctttgtcc    180
atcaaggttc aagaaaacaa tggtcagaca tgttcctctt aacaaacagt atgtcccaa     240
acagcaaaaa tgcatacagt cctttctggg tgaattttta aatcttacat aaatccatca    300
accccatcct ttttcctttg cctcttggga gaaattaatc tagctttaca ttaattatgc    360
atgttatcag atttcaagct ccttgagagc aggtatttta attctataaa gcctctacgt    420
ggccttggac atgggtaggt gcttaattac ccaagatgct ccttgaatac agatggtaca    480
cgacctacac agacttagat cttaccact tcccccctct ccccaccctg acttgctcaa     540
tcctgaagga actggagacg tctaagtgtc tgaggttcac gcttccacac agaagcttgg    600
gtctgtgtgg gagggaaaaa ggaagccatc tgtccgcagg ccagaccagg ccacaccctg    660
ctagcaccca gaacccttg tcccaggccc agccctgcca ttttactttc cttgcatctg     720
gaaagcacag ggaatatagt agtgacaaaa gaaggaaggg ttgtttgagt ttaagaatag    780
tttactctaa aaaaaaaaaa aaaaaaaaa aaaggacaaa agccaaagag aaggtcaaag     840
ttgactgtgg agaaggcctt gcaagcaggg aacttgggaa gaattggaat gagagtgaga    900
gaaggcaact gagtttggaa atattttttc tgactagctt ttctttccaa atgccactga    960
acttagattg gtttaggaag ggttgtagta catcaaagtg actagaagca caggtttggg   1020
gatcagataa ggatttcatt ctagagtgtg atcttgtaca agttattcag cctttgcaaa   1080
cctcagattc acacaatgta agatgaagaa actcaccttc tgaaaattag agataacata   1140
tgcaaagtga atcaatacag ggcttaacat atttatcacc cctttggtaa ataaccatga   1200
cgattaccag agctcttaag ggcaatggca ggtgggaagc agaactcatg ggtggtaatc   1260
cccaggccag ccaggctcac catgtgcact tggacaagtc cttgccccca tcattgtgaa   1320
atggtgcagg gatgcaccat gagggtgtgg caggatggct gacaacagac tgggaagcag   1380
ctcggcagaa aaactggatt gatgcccact atggcaagag atatcatctc ccctcttgtt   1440
ctgtgatgtt tcagtcctgg                                               1460

SEQ ID NO: 7        moltype = DNA  length = 351
FEATURE             Location/Qualifiers
misc_feature        1..351
                    note = VAMP2 Antisense
source              1..351
                    mol_type = other DNA
                    organism = synthetic construct
SEQUENCE: 7
ttaagtgctg aagtaaacta tgatgatgat gaggatgatg cgcaaaatca ctcccaagat     60
gatcatcatc ttgaggtttt tccaccagta tttgcgcttg agcttggctg cgcttgtttc    120
aaactgggag gccccgcct ggagtgcatc tgcacggtcg tccagctccg acagcttctg     180
gtctcgctcc aggaccttgt ccacgttcac cctcatgatg tccaccacct catccacctg    240
ggcctgggtc tgctgcagtc tcctgttact ggtgaggttt ggagggggtg caggggggacc   300
accctccca gccggggcag cagggggggc cgtggcagcg gtagcagaca t               351

SEQ ID NO: 8        moltype = DNA  length = 621
FEATURE             Location/Qualifiers
misc_feature        1..621
                    note = SNAP25 Antisense
source              1..621
                    mol_type = other DNA
                    organism = synthetic construct
SEQUENCE: 8
```

-continued

```
ttaaccactt cccagcatct ttgttgcacg ttggttggcc tcatcaattc tggttttgtt    60
ggaatcagcc ttctccatga tcctgtcgat ctggcgattc tgtgtatcga tctcattgcc   120
catatccagg gccatgtgac ggaggttccc gatgatgccg ctcacctgct ctaggttttc   180
atccatttca ttttctcggg catcatttgt taccctgcgg atgaagccgc cactgatggc   240
catctgctcc cgttcgtcca ctacacgagc aggctgagcc gccaccactc cgtcctgatt   300
attgccccag gcttttttgt aagcatcact tgatttaagc ttgttacaag gacatatgaa   360
aaggccacag catttcccta aatcttttaa attttctca gcctccttca tgtcttggtt    420
gatatggttc atgccttctt cgacacgatc gagttgttct ccttgttcat ccaacataac   480
caaagtcctg ataccagcat ctttactctc ttcaaccagt tgcagcatac gacgggtgct   540
ttccagcgac tcatcagcca actggtcagc ccttcgctgc atctcctcca gctcattgcg   600
catgtctgcg tcttcggcca t                                              621

SEQ ID NO: 9              moltype = DNA   length = 840
FEATURE                   Location/Qualifiers
misc_feature              1..840
                          note = STX Antisense
source                    1..840
                          mol_type = other DNA
                          organism = synthetic construct
SEQUENCE: 9
ttaattcagg ccaacggaaa gtccaataat caatgctaaa atgcccagca acacaactac    60
tagcacaatg ataattatca atttcttccg ggcctagctc tggtatttca cagcttttt   120
gctttcatct cgtgccttct ccacgtggtc cactgtgtgc atgacattca actctatgtt   180
atctaacatc tcaccctgat tctccaccag catggcgatg tccataaaca tgtcgtgaag   240
ctccttgatg ctgctctcca gcctcacaat gtccttgtgt cgtccctcaa tctcactgag   300
ggcttgcttg gaaatctgtg agtcaatgat cccagaagtg aagatggccg ggttgccact   360
ctccaacatc tcctccagct cctcatcggt tgtcttttg ccagtaattt cgagctgccg    420
ctggattcgc ccttttgctgc gttctcggaa gtccacttga gcttcattgt atttggtcat   480
cacctccaca aacttccgag aaaggacaga gtgctgggat ttccgaatcc gaaggtctgc   540
cgatgacctg acctcatctt cttcaatatg cttctccatg ctcttcagtt tgttccgaag   600
gttgttggcc cttttcttaa tctcagtgct gagctgctct aggtcatcct tggttttttg   660
ctctggaatc ggtgcagaga gaatgatact gtagagtttc ttagcctcct ctacatgttc   720
tgagatcttg tcaatgttaa gccgagtttc ctcaatctca gaaagaact cgtccataaa    780
agccgtgttg tcgatagcaa tctcaaccgc atcagtatca tcatcctgtg tcagttgcat   840

SEQ ID NO: 10             moltype = AA   length = 457
FEATURE                   Location/Qualifiers
REGION                    1..457
                          note = Light chain of botulinum neurotoxin A
source                    1..457
                          mol_type = protein
                          organism = synthetic construct
SEQUENCE: 10
MHHHHHHQFV NKQFNYKDPV NGVDIAYIKI PNVGQMQPVK AFKIHNKIWV IPERDTFTNP    60
EEGDLNPPPE AKQVPVSYYD STYLSTDNEK DNYLKGVTKL FERIYSTDLG RMLLTSIVRG   120
IPFWGGSTID TELKVIDTNC INVIQPDGSY RSEELNLVII GPSADIIQFE CKSFGHEVLN   180
LTRNGYGSTQ YIRFSPDFTF GFEESLEVDT NPLLGAGKFA TDPAVTLAHE LIHAGHRLYG   240
IAINPNRVFK VNTNAYYEMS GLEVSFEELR TFGGHDAKFI DSLQENEFRL YYYNKFKDIA   300
STLNKAKSIV GTTASLQYMK NVFKEKYLLS EDTSGKFSVD KLKFDKLYKM LTEIYTEDNF   360
VKFFKVLNRK TYLNFDKAVF KINIVPKVNY TIYDGFNLRN TNLAANFNGQ NTEINNMNFT   420
KLKNFTGLFE FYKLLCVRGI ITSKTKSLDK GYNKALN                            457

SEQ ID NO: 11             moltype = DNA   length = 1374
FEATURE                   Location/Qualifiers
misc_feature              1..1374
                          note = Light chain of botulinum neurotoxin A
source                    1..1374
                          mol_type = other DNA
                          organism = synthetic construct
SEQUENCE: 11
atgcaccacc accaccacca ccagttcgtg aacaagcagt tcaactacaa ggaccccgtg    60
aacggcgtgg acatcgccta catcaagatc cccaacgtgg gccagatgca gcccgtgaag   120
gccttcaaga tccacaacaa gatctgggtg atccccgaga gagacacctt caccaacccc   180
gaggaggggg acctgaaccc cccccccgag gccaagcagg tgcccgtgag ctactacgac   240
agcacctacc tgagcaccga caacgagaag gacaactacc tgaagggcgt gaccaagctg   300
ttcgagagaa tctacagcac cgacctgggc agaatgctgc tgaccagcat cgtgagaggc   360
atccccttct ggggcggcag caccatcgac accgagctga aggtgatcga caccaactgc   420
atcaacgtga tccagcccga cggcagctac agaagcgagg agctgaacct ggtgatcatc   480
ggccccagcg ccgacatcat ccagttcgag tgcaagagct tcggccacga ggtgctgaac   540
ctgaccagaa acggctacgg cagcacccag tacatcagat tcagccccga cttcaccttc   600
ggcttcgagg agagcctgga ggtggacacc aaccccctgc tgggcgccgg caagttcgcc   660
accgaccccg ccgtgaccct ggcccacgag ctgatccacg ccggcacag actgtacggc   720
atcgccatca accccaacag agtgttcaag gtgaacacca acgcctacta cgagatgagc   780
ggcctggagg tgtcgttcga ggagctgaga accttcggcg gccacgacgc caagttcatc   840
gacagcctgc aggagaacga gttcagactg tactactaca acaagttcaa ggacatcgcc   900
agcaccctga acaaggccaa gagcatcgtg ggcaccaccg ccagcctgca gtacatgaag   960
aacgtgttca aggagaagta cctgctgagc gaggacacca gcggcaagtt cagcgtggac  1020
aagctgaagt tcgacaagct gtacaagatg ctgaccgaga tctacaccga ggacaacttc  1080
gtgaagttct tcaaggtgct gaacagaaag acctacctga acttcgacaa ggccgtgttc  1140
```

```
aagatcaaca tcgtgcccaa ggtgaactac accatctacg acggcttcaa cctgagaaac  1200
accaacctgg ccgccaactt caacggccag aacaccgaga tcaacaacat gaacttcacc  1260
aagctgaaga acttcaccgg cctgttcgag ttctacaagc tgctgtgcgt gagaggcatc  1320
atcaccagca agaccaagag cctggacaag ggctacaaca aggccctgaa ctga        1374
```

```
SEQ ID NO: 12           moltype = AA  length = 447
FEATURE                 Location/Qualifiers
REGION                  1..447
                        note = Light chain of botulinum neurotoxin B
source                  1..447
                        mol_type = protein
                        organism = synthetic construct
SEQUENCE: 12
MHHHHHHPVT INNFNYNDPI DNNNIIMMEP PFARGTGRYY KAFKITDRIW IIPERYTFGY   60
KPEDFNKSSG IFNRDVCEYY DPDYLNTNDK KNIFLQTMIK LFNRIKSKPL GEKLLEMIIN  120
GIPYLGDRRV PLEEFNTNIA SVTVNKLISN PGEVERKKGI FANLIIFGPG PVLNENETID  180
IGIQNHFASR EGFGGIMQMK FCPEYVSVFN NVQENKGASI FNRRGYFSDP ALILMHELIH  240
VLHGLYGIKV DDLPIVPNEK KFFMQSTDAI QAEELYTFGG QDPSIITPST DKSIYDKVLQ  300
NFRGIVDRLN KVLVCISDPN ININIYKNKF KDKYKFVEDS EGKYSIDVES FDKLYKSLMF  360
GFTETNIAEN YKIKTRASYF SDSLPPVKIK NLLDNEIYTI EEGFNISDKD MEKEYRGQNK  420
AINKQAYEEI SKEHLAVYKI QMCKSVK                                     447
```

```
SEQ ID NO: 13           moltype = DNA  length = 1344
FEATURE                 Location/Qualifiers
misc_feature            1..1344
                        note = Light chain of botulinum neurotoxin B
source                  1..1344
                        mol_type = other DNA
                        organism = synthetic construct
SEQUENCE: 13
atgcaccacc atcatcacca ccctgttacc atcaataact ttaactataa cgatccaata   60
gacaacaaca acatcatcat gatggagccc ccctttgcta gagggactgg tcggtactac  120
aaagctttta agatcaccga tcggatttgg attatccctg aacggtatac atttggctac  180
aaacccgaag acttcaataa atcttctggt attttcaatc gagacgtgtg tgaatactat  240
gatcccgact acctcaacac taacgataaa aagaacattt tcctgcagac aatgattaag  300
ctgttcaatc ggatcaagag taaacccttg ggtgaaaaac ttctggagat gattatcaac  360
ggtataccct tacctgggcga caggagggtg ccactcgaag agttcaatac aaacatagcc  420
agcgtgaccg tgaataagct gatcagtaac ccaggcgaag ttgagcggaa gaagggaatt  480
ttcgctaacc tcatcatctt cggaccagga cctgtcctta acgagaatga gacaattgat  540
attggaatcc agaaccattt cgcatcacgc gaaggcttcg ggggtatcat gcagatgaag  600
ttctgcccgg agtatgtctc tgtgttcaac aacgtgcagg aaaataaggg agcgagcatt  660
ttcaatcgca gaggctattt ttccgacccc gcgctcatcc ttatgcacga gctgatccat  720
gtcctgcacg gactgtacgg catcaaagtc gacgatttgc caattgtgcc caacgaaaag  780
aagttcttca tgcagtccac cgacgctatc caagcggagg agctctatac ttttggcgga  840
caggaccctt ctatcatcac tccatctaca gataagagta tatacgataa ggttctccag  900
aatttccgcg gaatcgtcga ccgccttaac aaggtgctga tttgtatttc cgacccaaac  960
atcaatataa atatctataa gaacaagttc aaagataagt ataagttcgt ggaggacagc 1020
gagggtaagt actctattga tgtggagagc tttgataaac tgtacaagtc tctcatgttc 1080
ggtttcacag agactaatat cgccgagaac tataagataa aaacccgggc aagctatttc 1140
tccgatagcc tgccaccggt taagattaag aacctgctgg acaatgaaat atataccatc 1200
gaggaaggat taacatctc cgacaaggac atggagaaag aataccgggg acagaacaag 1260
gccattaata gcaaggctta cgaggagatt agcaaggagc acctggctgt gtacaaaatc 1320
cagatgtgca gtcagtgaa gtag                                        1344
```

```
SEQ ID NO: 14           moltype = AA  length = 457
FEATURE                 Location/Qualifiers
REGION                  1..457
                        note = Light chain of botulinum neurotoxin C1
source                  1..457
                        mol_type = protein
                        organism = synthetic construct
SEQUENCE: 14
MHHHHHHPIT INNFNYSDPV DNKNILYLDT HLNTLANEPE KAFRITGNIW VIPDRFSRNS   60
NPNLNKPPRV TSPKSGYYDP NYLSTDSDKD PFLKEIIKLF KRINSREIGE ELIYRLSTDI  120
PFPGNNNTPI NTFDFDVDFN SVDVKTRQGN NWVKTGSINP SVIITGPREN IIDPETSTFK  180
LTNNTFAAQE GFGALSIISI SPRFMLTYSN ATNDVGEGRF SKSEFCMDPI LILMHELNHA  240
MHNLYGIAIP NDQTISSVTS NIFYSQYNVK LEYAEIYAFG GPTIDLIPKS ARKYFEEKAL  300
DYYRSIAKRL NSITTANPSS FNKYIGEYKQ KLIRKYRFVV ESSGEVTVNR NKFVELYNEL  360
TQIFTEFNYA KIYNVQNRKI YLSNVYTPVT ANILDDNVYD IQNGFNIPKS NLNVLFMGQN  420
LSRNPALRKV NPENMLYLFT KFCHKAIDGR SLYNKTL                          457
```

```
SEQ ID NO: 15           moltype = DNA  length = 1374
FEATURE                 Location/Qualifiers
misc_feature            1..1374
                        note = Light chain of botulinum neurotoxin C1
source                  1..1374
                        mol_type = other DNA
                        organism = synthetic construct
SEQUENCE: 15
```

```
atgcaccacc accaccacca ccccatcacc atcaacaact tcaactacag cgacccgtg      60
gacaacaaga acatcctgta cctggacacc cacctgaaca ccctggccaa cgagcccgag    120
aaggccttca gaatcaccgg caacatctgg gtgatccccg acagattcag cagaaacagc    180
aaccccaacc tgaacaagcc ccccagagtg accagcccca gagcggcta ctacgacccc     240
aactacctga gcaccgacag cgacaaggac cccttcctga ggagatcat caagctgttc     300
aagagaatca acagcagaga gatcggcgag gagctgatct acagactgag caccgacatc    360
cccttccccg gcaacaacaa cacccccatc aacaccttcg acttcgacgt ggacttcaac    420
agcgtggacg tgaagaccag cagggcaac aactgggtga gaccggcag catcaacccc      480
agcgtgatca tcaccggccc cagagagaaa atcatcgacc ccgagaccag caccttcaag    540
ctgaccaaca acaccttcgc cgcccaggag ggcttcggcg ccctgagcat catcagcatc    600
agccccagat tcatgctgac ctacagcaac gccaccaacg acgtgggcga gggcagattc    660
agcaagagcg agttctgcat ggaccccatc ctgatcctga tgcacgagct gaaccacgcc    720
atgcacaacc tgtacggcat cgccatcccc aacgaccaga ccatcagcag cgtgaccagc    780
aacatcttct acagccagta caactgaagg tggagtacg ccgagatcta cgccttccgg     840
ggccccacca tcgacctgat ccccaagagc gccagaaagt acttcgagga gaaggccctg    900
gactactaca agagcatcgc caagagactg aacagcatca ccaccgccaa ccccagcagc    960
ttcaacaagt acatcggcga gtacaagcag aagctgatca gaaagtacag attcgtggtg   1020
gagagcagcg gcgaggtgac cgtgaacaga aacaagttcg tggagctgta caacgagctg   1080
acccagatct tcaccgagtt caactacgcc aagatctaca cgtgcagaa cagaaagatc    1140
tacctgagca cacgtgtacac ccccgtgacc gccaacatcc tggacgacaa cgtgtacgac   1200
atccagaacg gcttcaacat ccccaagagc aacctgaacg tgctgttcat gggccagaac   1260
ctgagcagaa acccgccct gagaaaggtg aaccccgaga acatgctgta cctgttcacc   1320
aagttctgcc acaaggccat cgacggcaga agcctgtaca acaagaccct gtga         1374

SEQ ID NO: 16                moltype = AA  length = 429
FEATURE                      Location/Qualifiers
REGION                       1..429
                             note = Light chain of botulinum neurotoxin E3
source                       1..429
                             mol_type = protein
                             organism = synthetic construct
SEQUENCE: 16
MHHHHHHPKI NSFNYNDPVN DRTILYIKPG GCQEFYKSFN IMKNIWIIPE RNVIGTTPQD     60
FHPPTSLKNG DSSYYDPNYL QSDEEKDRFL KIVTKIFNRI NNNLSGGILL EELSKANPYL    120
GNDNTPDNQF HIGDASAVEI KFSNGSQHIL LPNVIIMGAE PDLFETNSSN ISLRNNYMPS    180
NHGFGSIAIV TFSPEYSFRF NDNSINEFIQ DPALTLMHEL IHSLHGLYGA KGITTTCIIT    240
QQQNPLITNR KGINIEEFLT FGGNDLNIIT VAQYNDIYTN LLNDYRKIAS KLSKVQVSNP    300
QLNPYKDIFQ EKYGLDKDAS GIYSVNINKF DDILKKLYSF TEFDLATKFQ VKCRETYIGQ    360
YKYFKLSNLL NDSIYNISEG YNINNLKVNF RGQNANLNPR IIKPITGRGL VKKIIRFCKN    420
IVSVKGIRK                                                            429

SEQ ID NO: 17                moltype = DNA  length = 1290
FEATURE                      Location/Qualifiers
misc_feature                 1..1290
                             note = Light chain of botulinum neurotoxin E3
source                       1..1290
                             mol_type = other DNA
                             organism = synthetic construct
SEQUENCE: 17
atgcaccatc accatcacca tcccaagatt aattctttca actataatga tccagtcaac     60
gacaggacca ttctctacat caagccgggc ggctgtcagg aattctacaa atcatttaac    120
atcatgaaga atatttggat catacctgaa agaaatgtga ttggaaccac accccaggat    180
ttccacccc caacaagctt gaaaaacgga gacagttcct actatgaccc taattatctt    240
cagagcgatg aggagaaaga cagattcctg aagatcgtga ccaaaatctt caaccggatc    300
aacaataatc tctccggggg tattttgctg gaggagctga caaaggcgaa tccttacctt    360
ggcaatgata acacaccgga caatcagttc cacataggag atgcttcagc tgtcgagatt    420
aaattcagca acggttccca gcatattctg cttccgaatg tcattattat gggagccgag    480
ccagacctgt tcgagaccaa ttcttccaac ataagcttga ggataatta catgccatct    540
aaccacggtt ttgggtcaat cgcaattgtc acttttagtc cggagtacag cttccgctt    600
aatgacaaca gcatcaatga attcatacag gatcccgctc tgacactcat gcatgagctg    660
atccactctc tgcatggcct gtatggtgct aaggggatca ccaccacatg tattatcacg    720
cagcagcaaa atccactgat tacaaacagg aaaggcataa atattgaaga gttcctgaca    780
ttcggcggca atgaccttaa cattatcact gtggctcagt ataacgatat ttatactaat    840
ctgctgaacg actataggaa aatcgcttca aactgagca aggtcaggt ctcaaacca     900
cagttgaatc catataagga tatctttcag gaaaagtatg gttggacaa ggatgcttca    960
ggcatctaca gtgtcaatat caacaaattc gacgacatct gaagaaact gtatagcttt   1020
acggagttcg atctggcgac taagttccaa gtgaaatgcc gggagacata catcggtcaa   1080
tataaatatt ttaaactgtc caaccttctc aatgatagca tctacaatat cagtgaagga   1140
tataacatta ataacctgaa agtgaatttc cgaggccaga acgccaattt gaaccccgg    1200
attatcaagc ccattacagg acgggggctg gtgaagaaaa ttattcgctt ttgtaagaat   1260
atcgtgtcag tgaagggaat aagaaagtag                                    1290

SEQ ID NO: 18                moltype = AA  length = 442
FEATURE                      Location/Qualifiers
REGION                       1..442
                             note = Light chain of botulinum neurotoxin F1
source                       1..442
                             mol_type = protein
                             organism = synthetic construct
```

```
SEQUENCE: 18
MHHHHHHPVV INSFNYNDPV NDDTILYMQI PYEEKSKKYY KAFEIMRNVW IIPERNTIGT    60
DPSDFDPPAS LENGSSAYYD PNYLTTDAEK DRYLKTTIKL FKRINSNPAG EVLLQEISYA   120
KPYLGNEHTP INEFHPVTRT TSVNIKSSTN VKSSIILNLL VLGAGPDIFE NSSYPVRKLM   180
DSGGVYDPSN DGFGSINIVT FSPEYEYTFN DISGGYNSST ESFIADPAIS LAHELIHALH   240
GLYGARGVTY KETIKVKQAP LMIAEKPIRL EEFLTFGGQD LNIITSAMKE KIYNNLLANY   300
EKIATRLSRV NSAPPEYDIN EYKDYFQWKY GLDKNADGSY TVNENKFNEI YKKLYSFTEI   360
DLANKFKVKC RNTYFIKYGF LKVPNLLDDD IYTVSEGFNI GNLAVNNRGQ NIKLNPKIID   420
SIPDKGLVEK IVKFCKSVIP RK                                            442

SEQ ID NO: 19           moltype = DNA   length = 1329
FEATURE                 Location/Qualifiers
misc_feature            1..1329
                        note = Light chain of botulinum neurotoxin F1
source                  1..1329
                        mol_type = other DNA
                        organism = synthetic construct
SEQUENCE: 19
atgcaccatc atcatcacca tcccgtggtt atcaatagct ttaattataa cgatcccgtg    60
aatgatgata caattctcta catgcagatt ccatacgagg aaaagagcaa gaagtattat   120
aaagcattcg aaataatgcg gaacgtttgg attattcccg agagaaacac aatcggaacc   180
gacccgtccg attttgatcc acccgcctca ttggaaaacg gcagtgccgc ctactacgat   240
cccaattatc tcaccacaga tgctgagaag gaccgctatc tgaaaaccac aatcaagctc   300
tttaagagaa tcaactctaa tccagctggc gaagtcctgc tgcaggaaat tagctacgca   360
aagccatatc tcggcaacga gcatacacct attaatgagt tccatcccgt cactcggacg   420
acctctgtga acataaaaag ctctacaaac gtgaagagct ctataatact gaacctgctc   480
gtgctgggtg ctggcccaga cattttcgag aatagttcct atccagttcg aaagttgatg   540
gattctgggg gcgtgtacga tcctagcaat gacggatttg ggagtattaa tatagtcaca   600
ttcagtcccg agtatgaata caccttcaac gacatcagcg gtggctacaa ttcatcaact   660
gagagcttca ttgccccatc agccatcagt ctggcccatg agttgatcca tgccctgcac   720
ggcctctatg gggctagagg ggttacctac aaggaaacaa ttaaagtcaa gcaggctcca   780
ctcatgatcg ctgaaaagcc cattcggctc gaggagtttc tgacattcgg cggccaggat   840
ctcaacataa tcaccagtgc tatgaaagag aagatctaca ataaccttct gcaaattac    900
gaaaaaatcg caacacggct gtcacgggtg aatagcgctc ccctgagtcg cgacattaac   960
gagtataaag attacttcca gtggaaatac gggctgaaca aaaatgccga cgggagctac  1020
acagtgaacg agaacaagtt taacgagatc tacaagaaac tgtactcatt taccgagatt  1080
gacctggcta taagttttaa ggtcaagtgc agaaatactt atttcatcaa gtacggattt  1140
ttgaaagtcc ctaatctgct ggacgacgat atttatactg tgtctgaagg tttaatatc   1200
ggaaaccttg ccgtgaataa ccgcgggcag aatataaagc ttaatcctaa gatcatcgat  1260
tcaattcctg acaaaggcct cgtcgagaaa atagtgaaat ctgcaaaag tgtgattcct   1320
agaaagtga                                                          1329

SEQ ID NO: 20           moltype = AA   length = 457
FEATURE                 Location/Qualifiers
REGION                  1..457
                        note = Light chain of tetanic neurotoxin
source                  1..457
                        mol_type = protein
                        organism = synthetic construct
SEQUENCE: 20
MPITINNFRY SDPVNNDTII MMEPPYCKGL DIYYKAFKIT DRIWIVPERY EFGTKPEDFN    60
PPSSLIEGAS EYYDPNYLRT DSDKDRFLQT MVKLFNRIKN NVAGEALLDK IINAIPYLGN   120
SYSLLDKFDT NSNSVSFNLL EQDPSGATTK SAMLTNLIIF GPGPVLNKNE VRGIVLRVDN   180
KNYFPCRDGF GSIMQMAFCP EYVPTFDNVI ENITSLTIGK SKYFQDPALL LMHELIHVLH   240
GLYGMQVSSH EIIPSKQEIY MQHTYPISAE ELFTFGGQDA NLISIDIKND LYEKTLNDYK   300
AIANKLSQVT SCNDPNIDID SYKQIYQQKY QFDKDSNGQY IVNEDKFQIL YNSIMYGFTE   360
IELGKKFNIK TRLSYFSMNH DPVKIPNLLD DTIYNDTEGF NIESKDLKSE YKGQNMRVNT   420
NAFRNVDGSG LVSKLIGLCK KIIPPTNIRE NLYNRTA                            457

SEQ ID NO: 21           moltype = DNA   length = 1373
FEATURE                 Location/Qualifiers
misc_feature            1..1373
                        note = Light chain of tetanic neurotoxin
source                  1..1373
                        mol_type = other DNA
                        organism = synthetic construct
SEQUENCE: 21
atgcccatca ccatcaacaa cttccggtac agcgacccccg tgaacaacga caccatcatc    60
atgatggagc cccccctactg caagggcctg gacatctact acaaggcctt caagatcacc   120
gaccggatct ggatcgtgcc cgagcggtac gagttcggca ccaagcccga ggacttcaac   180
ccccccagca gcctgatcga gggcgccagc gagtactacg accccaacta cctgcggacc   240
gacagcgaca aggaccggtt cctgcagacc atggtgaagc tgttcaaccg gatcaagaac   300
aacgtggccg gcgaggccct gctggacaag atcatcaacg ccatccccta cctgggcaac   360
agctacagcc tgctggacaa gttcgacacc aacagcaaca gtgtgagctt caacctgctg   420
gagcaggacc ccagcggcgc caccaccaag agcgccatgc tgaccaacct gatcatcttc   480
ggccccggcc ccgtgctgaa caagaacgag gtgcggggca tcgtgctgcg ggtggacaac   540
aagaactact cccctgccg ggacggcttc ggcagcatca tgcagatggc cttctgcccc    600
gagtacgtgc ccaccttcga caacgtgatc gagaacatca ccagcctgac catcggcaag   660
agcaagtact tccaggaccc cgccctgctg ctgatgcacg agctgatcca cgtgctgcac   720
```

```
ggcctgtacg gcatgcaggt gagcagccac gagatcatcc ccagcaagca ggagatctac    780
atgcagcaca cctaccccat cagcgccgag gagctgttca ccttcggcgg ccaggacgcc    840
aacctgatca gcatcgacat caagaacgac ctgtacgaga agaccctgaa cgactacaag    900
gccatcgcca acaagctgag ccaggtgacc agctgcaacg accccaacat cgacatcgac    960
agctacaagc agatctacca gcagaagtac cagttcgaca aggacagcca cggccagtac   1020
atcgtgaacg aggacaagtt ccagatcctg tacaacagca tcatgtacgg cttcaccgag   1080
atcgagctgg gcaagaagtt caacatcaag acccggctga gctacttcag catgaaccac   1140
gaccccgtga gatccccaa cctgctggac gacaccatct acaacgacac cgagggcttc   1200
aacatcgaga gcaaggacct gaagagcgag tacaagggcc agaacatgcg ggtgaacacc   1260
aacgccttcc ggaacgtgga cggcagcggc ctggtgacga gctgatcgg cctgtgcaag   1320
aagatcatcc cccccaccaa catccgggag aacctgtaca accggaccgc ctg          1373

SEQ ID NO: 22           moltype = AA  length = 594
FEATURE                 Location/Qualifiers
source                  1..594
                        mol_type = protein
                        organism = Homo sapiens
SEQUENCE: 22
MASSTPSSSA TSSNAGADPN TTNLRPTTYD TWCGVAHGCT RKLGLKICGF LQRTNSLEEK     60
SRLVSAFRER QSSKNLLSCE NSDRDARFRR TETDFSNLFA RDLLPAKNGE EQTVQFLLEV    120
VDILLNYVRK TFDRSTKVLD FHHPQLLEG MEGFNLELSD HPESLEQILV DCRDTLKYGV    180
RTGHPRFFNQ LSTGLDIIGL AGEWLTSTAN TNMFTYEIAP VFVLMEQITL KKMREIVGWS    240
SKDGDGIFSP GGAISNMYSI MAARYKYFPE VKTKGMAAVP KLVLFTSEQS HYSIKKAGAA    300
LGFGTDNVIL IKCNERGKII PADFEAKILE AKQKGYVPFY VNATAGTTVY GAFDPIQEIA    360
DICEKYNLWL HVDAAWGGGL LMSRKHRHKL NGIERANSVT WNPHKMMGVL LQCSAILVKE    420
KGILQGCNQM CAGYLFQPDK QYDVSYDTGD KAIQCGRHVD IFKFWLMWKA KGTVGFENQI    480
NKCLELAEYL YAKIKNREEF EMVFNGEPEH TNVCFWYIPQ SLRGVPDSPQ RREKLHKVAP    540
KIKALMMESG TTMVGYQPQG DKANFFRMVI SNPAATQSDI DFLIEEIERL GQDL          594

SEQ ID NO: 23           moltype = DNA  length = 1785
FEATURE                 Location/Qualifiers
source                  1..1785
                        mol_type = genomic DNA
                        organism = Homo sapiens
SEQUENCE: 23
atggcgtctt cgaccccatc ttcgtccgca acctcctcga acgcgggagc ggaccccaat     60
accactaacc tgcgccccac aacgtacgat acctggtgcg gcgtggccca tggatgcacc    120
agaaaactgg ggctcaagat ctgcggcttc ttgcaaagga ccaacagcct ggaagagaag    180
agtcgccttg tgagtgcctt cagggagagg caatcctgca agaacctgct ttcctgtgaa    240
aacagcgacc gggatgcccg cttccggcgc acagagactg acttctctaa tctgtttgct    300
agagatctgc ttccggctaa gaacggtgag gagcaaaccg tgcaattcct cctggaagtg    360
gtggacatac tcctcaacta tgtccgcaag acatttgatc gctccaccaa ggtgctggac    420
tttcatcacc cacaccagtt gctggaaggc atggaggagt tcaacttgga gctctctgaa    480
caccccgagt ccctggagca gatcctggtt gactgcagag acaccttgaa gtatgggggtt    540
cgcacaggtc atcctcgatt tttcaaccag ctctccactg gattggatat tattggccta    600
gctggagaat ggctgacatc aacggccaat accaacatgt ttacatatga aattgcacca    660
gtgttttgtcc tcatggaaca aataaacactt aagaagatga gagagatgt tggatggtca    720
agtaaagatg gtgatgggat atttttctcct gggggcgcca tatccaacat gtacagcatc    780
atggctgctc gctacaagta cttccgggaa gttaagacaa agggcatggc ggctgtgcct    840
aaactggtcc tcttcacctc agaacagagt cactattcca taaagaaagc tggggctgca    900
cttggctttg gaactgacaa tgtgattttg ataaagtgca tgaaaggggg gaaaataatt    960
ccagctgatt ttgaggcaaa aattcttgaa gccaaacaga agggatatgt tcccttttat   1020
gtcaatgcaa ctgctggcac gactgtttat ggagctttg atccgataca agagattgca   1080
gatatatgtg agaaatataa ccttggttg catgtcgatg ctgcctgggg aggtgggctg   1140
ctcatgtcca ggaagcaccg ccataaactc aacggcatag aaagggccaa ctcagtcacc   1200
tggaaccctc acaagatgat gggcgtgctg ttgcagtgct ctgccattct cgtcaaggaa   1260
aagggtatac tccaaggatg caaccagatg tgtgcaggat atcttccca gccagacaag   1320
cagtatgatg tctcctacga caccggggac aaggcaattc agtgtggccg ccacgtggat   1380
atcttcaagt tctggctgat gtggaaagca aaggcgcaag tgggatttga aaaccagatc   1440
aacaaatgcc tggaactggc tgaataactc tatgccaaga ttaaaaacag agaagaattt   1500
gagatggttt tcaatggcga gcctgagcac acaaacgtct gttttttggta tattccacaa   1560
agcctcaggg gtgtgccaga cagccctcaa cgacgggaaa agctacacaa ggtggctcca   1620
aaaatcaaag ccctgatgat ggagtcaggt acgaccatgg ttggctacca gccccaaggg   1680
gacaaggcca acttcttccg gatggtcatc tccaaccccag ccgctaccca gtctgacatt   1740
gacttcctca ttgagggagat agaaagactg gccaggatc tgtaa                   1785

SEQ ID NO: 24           moltype = AA  length = 254
FEATURE                 Location/Qualifiers
REGION                  1..254
                        note = Saporin S6 protein
source                  1..254
                        mol_type = protein
                        organism = unidentified
SEQUENCE: 24
MVTSITLDLV NPTAGQYSSF VDKIRNNVKD PNLKYGGTDI AVIGPPSKEK FLRINFQSSR     60
GTVSLGLKRD NLYVVAYLAM DNTNVNRAYY FRSEITSAES TALFPEATTA NQKALEYTED    120
YQSIEKNAQI TQGDQSRKEL GLGIDLLSTS MEAVNKKARV VKDEARFLLI AIQMTAEAAR    180
FRYIQNLVIK NFPNKFNSEN KVIQFEVNWK KISTAIYGDA KNGVFNKDYD FGFGKVRQVK    240
DLQMGLLMYL GKPK                                                      254
```

| SEQ ID NO: 25 | moltype = DNA  length = 765 |
|---|---|
| FEATURE | Location/Qualifiers |
| misc_feature | 1..765 |
| | note = Saporin S6 gene |
| source | 1..765 |
| | mol_type = genomic DNA |
| | organism = unidentified |

SEQUENCE: 25
```
atggtaacat caattaccct cgaccttgtc aacnctaccg ctggacaata ctcatcnttc   60
gtagataaaa taaggaacaa tgtcaaagac cctaatctca agtacggtgg tacagatatc  120
gctgtcatcg ccctccctc aaaagaaaaa ttcctcagga taaactttca atcttccagg  180
ggaacggtct cacttggact taagagggat aatctgtatg tggtggctta tttggcaatg  240
gataatacta acgtgaatcg cgcatattac tttcggattg aaataacaag tgcagagagc  300
accgcattgt tccccgaagc gacaactgcg aaccagaaag ccttggaata cacagaggac  360
tatcagtcca tcgaaaagaa cgcgcagata actcaaggag accagagtag aaagaactc   420
ggcctcggca tcgatctctt gagtaccagc atggaggccg tgaacaaaaa ggctagggta  480
gttaaagatg aagccaggtt cctcctgata gctatacaga gcgctga ggccgccagg    540
tttaggtata tccaaaacct tgtgatcaag aatttttccca acaaattcaa cagcgagaat  600
aaggtgatac agtttgaggt aaactggaaa aaaatcagca ccgctattta tggggacgcg  660
aaaaacggag tattcaataa agactacgat ttcggcttcg ggaaagttcg ccaagttaaa  720
gacttgcaaa tgggactgtt gatgtatctc ggcaaaccga agtga             765
```

| SEQ ID NO: 26 | moltype = AA  length = 217 |
|---|---|
| FEATURE | Location/Qualifiers |
| REGION | 1..217 |
| | note = Nitroreductase nfnB protein |
| source | 1..217 |
| | mol_type = protein |
| | organism = unidentified |

SEQUENCE: 26
```
MDIISVALKR HSTKAFDASK KLTPEQAEQI KTLLQYSPSS TNSQPWHFIV ASTEEGKARV   60
AKSAAGNYVF NERKMLDASH VVVFCAKTAM DDVWLKLVVD QEDADGRFAT PEAKAANDKG  120
RKFFADMHRK DLHDDAEWMA KQVYLNVGNF LLGVAALGLD AVPIEGFDAA ILDAEFGLKE  180
KGYTSLVVVP VGHHSVEDFN ATLPKSRLPQ NITLTEV                          217
```

| SEQ ID NO: 27 | moltype = DNA  length = 654 |
|---|---|
| FEATURE | Location/Qualifiers |
| misc_feature | 1..654 |
| | note = Nitroreductase nfnB gene |
| source | 1..654 |
| | mol_type = genomic DNA |
| | organism = unidentified |

SEQUENCE: 27
```
atggacataa tttccgtcgc tctcaagcga cattcaacaa aggcgtttga cgcttcaaaa   60
aagttgacac ctgaacaggc ggaacagatc aagacgttgc tccagtattc cccgtcttct  120
actaacagcc agccctggca cttttatcgtg gcttccacag aggagggcaa agctcgagta  180
gctaaaagcg cggcaggcaa ctatgtattc aatgagcgaa agatgcttga cgcgtccat    240
gtcgtggtat tttgtgcgaa gacagctatg gacgatgtgt ggcttaagct ggtggtagat  300
caagaggatg ccgacggcag gttcgccacc ccagaagcca aggctgctaa tgacaagggt  360
cgcaaatttt ttgcggatat gcacaggaaa gatctccacg acgatgccga atggatggca  420
aaacaggtct acctcaacgt aggtaacttt ttgcttggtg tggctgcttt gggtctggat  480
gcggtgccga tcgagggctt tgatgcggct atacttgatg ctgagttcgg cttgaaggaa  540
aaaggatata cttcccttgt cgtagtgccc gttgggcatc atagtgtcga ggactttaac  600
gctaccctgc cgaaatctag gctcccgcaa aacataacac tcacgaggt ctga         654
```

| SEQ ID NO: 28 | moltype = AA  length = 465 |
|---|---|
| FEATURE | Location/Qualifiers |
| REGION | 1..465 |
| | note = C. botulinum neurotoxin of type A linked to the |
| | signal peptide ofsyntaxin 1a |
| source | 1..465 |
| | mol_type = protein |
| | organism = synthetic construct |

SEQUENCE: 28
```
MHHHHHHQFV NKQFNYKDPV NGVDIAYIKI PNVGQMQPVK AFKIHNKIWV IPERDTFTNP   60
EEGDLNPPPE AKQVPVSYYD STYLSTDNEK DNYLKGVTKL FERIYSTDLG RMLLTSIVRG  120
IPFWGGSTID TELKVIDTNC INVIQPDGSY RSEELNLVII QFPEQCKSFG HEVLN       180
LTRNGYGSTQ YIRFSPDFTF GFEESLEVDT NPLLGAGKFA TDPAVTLAHE LIHAGHRLYG  240
IAINPNRVFK VNTNAYYEMS GLEVSFEELR TFGGHDAKFI DSLQENEFRL YYYNKFKDIA  300
STLNKAKSIV GTTASLQYMK NVFKEKYLLS EDTSGKFSVD KLKFDKLYKM LTEIYTEDNF  360
VKFFKVLNRK TYLNFDKAVF KINIVPKVNY TIYDGFNLRN TNLAANFNGQ NTEINNMNFT  420
KLKNFTGLFE FYKLLCVRGI ITSIMIIICC VILGIVIAST VGGIF                 465
```

| SEQ ID NO: 29 | moltype = DNA  length = 1401 |
|---|---|
| FEATURE | Location/Qualifiers |
| misc_feature | 1..1401 |
| | note = C. botulinum neurotoxin of type A linked to the |
| | signal peptide ofsyntaxin 1a |

| source | 1..1401 |
| --- | --- |
| | mol_type = other DNA |
| | organism = synthetic construct |

SEQUENCE: 29

```
atgcaccacc accaccacca ccagttcgtg aataaacaat tcaattataa agacccagtg   60
aatggtgttg acatagcata catcaaaatc ccgaacgtgg gacagatgca accggtgaaa  120
gccttcaaga ttcataacaa gatctgggtt attcctgaac gggacacttt taccaaccct  180
gaagaaggtg acctgaaccc tcctccagag gctaagcagg ttcctgtttc ctactacgat  240
tcaacttatc tgagcactga taacgaaaag gataattacc ttaagggagt taccaaactg  300
ttcgagcgca tttatagcac agacctcggc agaatgctgc tgaccagcat agtgcgggga  360
attccatttt gggggggcag cacaatcgac acggagttga aggtcatcga tacgaattgc  420
atcaacgtga tacaaccaga tggctcttac agatccgagg aactgaacct ggtgatcatc  480
ggcccctctg ctgatataat ccaattcgaa tgcaaaagct tcggtcacga ggtgctgaat  540
cttacccgga acggatacgg gtccacccag tacatacgct ttagtcccga ctttacattc  600
ggcttcgagg aaagtcttga agtggacacg aatccactgt gggagctgg caagttcgcc   660
actgatcctg ccgttacact tgctcatgaa ctgattcatg ctggacaccg gctttatggg  720
atagctataa atccgaatag agtctttaag gttaacacaa atgcctacta cgaaatgtct  780
ggccttgagg tttcattcga ggagcttagg acctttggag gccacgacgc taaattcatc  840
gactctctgc aggagaatga gtttcggctg tactactaca caagtttaa ggacattgcc   900
agtactctga caaggctaa gagcatcgtc gggaccacag ccagcctcca atatatgaaa   960
aacgtgttca aggaaaagta cctttctgtc aagacacat caggaaaatt ctcagtgac  1020
aaactgaaat ttgacaagct gtacaagatg ctgactgaaa tatacacaga ggacaacttc  1080
gtgaagtttt ttaaagtcct gaacagaaag acttacttga acttcgacaa agccgtcttt  1140
aaaatcaata tcgtcccaaa ggttaattac actatctatg acggattcaa tctcagaaac  1200
acgaacttgg ctgccaactt caatggacag aacacagaga tcaacaacat gaattttact  1260
aagcttaaaa atttcacagg cctgttcgag ttctataagc ttctttgcgt ccgaggcatc  1320
attacatcca tcatgatcat aatgctgctgt gtgatattgg gcatagtgat tgcatccacc  1380
gtgggggggca tttttgccta g                                           1401
```

| SEQ ID NO: 30 | moltype = AA  length = 469 |
| --- | --- |
| FEATURE | Location/Qualifiers |
| REGION | 1..469 |
| | note = C. botulinum neurotoxin of type B linked to the signal peptide ofsyntaxin 1a |
| source | 1..469 |
| | mol_type = protein |
| | organism = synthetic construct |

SEQUENCE: 30

```
MHHHHHHPVT INNFNYNDPI DNNNIIMMEP PFARGTGRYY KAFKITDRIW IIPERYTFGY   60
KPEDFNKSSG IFNRDVCEYY DPDYLNTNDK KNIFLQTMIK LFNRIKSKPL GEKLLEMIIN  120
GIPYLGDRRV PLEEFNTNIA SVTVNKLISN PGEVERKKGI FANLIIFGPG PVLNENETID  180
IGIQNHFASR EGFGGIMQMK FCPEYVSVFN NVQENKGASI FNRRGYFSDP ALILMHELIH  240
VLHGLYGIKV DDLPIVPNEK KFFMQSTDAI QAEELYTFGG QDPSIITPST DKSIYDKVLQ  300
NFRGIVDRLN KVLVCISDPN ININIYKNKF KDKYKFVEDS EGKYSIDVES FDKLYKSLMF  360
GFTETNIAEN YKIKTRASYF SDSLPPVKIK NLLDNEIYTI EEGFNISDKD MEKEYRGQNK  420
AINKQAYEEI SKEHLAVYKI QMCKSVIMII ICCVILGIVI ASTVGGIFA              469
```

| SEQ ID NO: 31 | moltype = DNA  length = 1410 |
| --- | --- |
| FEATURE | Location/Qualifiers |
| misc_feature | 1..1410 |
| | note = C. botulinum neurotoxin type B linked to the signal peptide ofsyntaxin 1a |
| source | 1..1410 |
| | mol_type = other DNA |
| | organism = synthetic construct |

SEQUENCE: 31

```
atgcaccacc accatcatca tcccgtgacc atcaacaatt tcaactataa tgaccctatc   60
gataacaaca acatcattat gatggagccc ctttcgccc gcggcaccgg agatactac   120
aaggccttca aaataaccga taggatctgg atcatccag agaggtacac cttcgggtac  180
aagcctgagg actttaataa atcaagcggt atctttaata gggatgtgtg tgaatactac  240
gaccctgact atctcaatac aacgacaaa agaatatct tccttcagac tatgatcaag   300
ctttttcaatc gaattaagag taagccgctt ggtgagaaac tgctggagat gatcataaac  360
ggcatcccct acctcggaga tcgccgcgtt ccgctgaag agtttaacac taatatcgca  420
agcgtcactg taaataaact catcagcaac ccggggaacg tggaaaggaa gaagggaatc  480
tttgctaacc tgattatctt tggaccaggc ccagtgttga atgaaaacga gaccatcgac  540
atcgggatcc agaaccactt tgcatcacga gaggggtttg ggggattat gcagatgaag  600
ttctgccccg agtacgtgtc agtgttcaat aacgtgcagg aaaacaaagg agcatccatc  660
ttcaatcgcc gaggctactt ctctgatcct gctctcatcc tcatgcacga gctcattcac  720
gtgctgcacg gacttatgg catcaaggtg gacgacctgc ctattgtgcc gaatgaaaag  780
aagttcttca tgcagagtac tgatgccatc caggctgagg aactgtacac tttcgggggc  840
caggaccat ccattatcac cccaagtact gataagtcaa tctatgacaa agttctgcag   900
aacttccgcg gaatcgtgga taggctcaac aaagtgctgg tgtgtattag cgaccccaac  960
attaacatca atatttacaa gaacaaattc aaggacaaat ataaattcgt ggaggactct  1020
gagggcaagt attcaattga cgtggagagc ttcacaaaag cctgatgttc  1080
ggtttcacag agaccaacat agcagagaac tataagatta aactcgcgc gagctacttt  1140
tcagattcac tgcctccggt gaaaatcaag aaccctctgg ataatgagat ctataccata  1200
gaagaaggat ttaacatttc cgacaaggac atggaaaagg agtaccgggg acagaacaag  1260
gccatcaaca acaggcctta tgaagaaatc agcaaggagc acctcgccgt ctacaaaatt  1320
caaatgtgca aaagcgtcat aatgattatt atctgctgcg taatcctggg gatagtgatc  1380
```

```
gcttccaccg taggcggcat cttcgcctga                                     1410

SEQ ID NO: 32          moltype = AA  length = 476
FEATURE                Location/Qualifiers
REGION                 1..476
                       note = C. botulinum neurotoxin of serotype C linked to the
                       signalpeptide of VAMP2
source                 1..476
                       mol_type = protein
                       organism = synthetic construct
SEQUENCE: 32
MHHHHHHPIT INNFNYSDPV DNKNILYLDT HLNTLANEPE KAFRITGNIW VIPDRFSRNS   60
NPNLNKPPRV TSPKSGYYDP NYLSTDSDKD PFLKEIIKLF KRINSREIGE ELIYRLSTDI  120
PFPGNNNTPI NTFDFDVDFN SVDVKTRQGN NWVKTGSINP SVIITGPREN IIDPETSTFK  180
LTNNTFAAQE GFGALSIISI SPRFMLTYSN ATNDVGEGRF SKSEFCMDPI LILMHELNHA  240
MHNLYGIAIP NDQTISSVTS NIFYSQYNVK LEYAEIYAFG GPTIDLIPKS ARKYFEEKAL  300
DYYRSIAKRL NSITTANPSS FNKYIGEYKQ KLIRKYRFVV ESSGEVTVNR NKFVELYNEL  360
TQIFTEFNYA KIYNVQNRKI YLSNVYTPVT ANILDDNVYD IQNGFNIPKS NLNVLFMGQN  420
LSRNPALRKV NPENMLYLFT KFCHKAIDGR SLYNMMIILG VICAIILIII IVYFST      476

SEQ ID NO: 33          moltype = DNA  length = 1431
FEATURE                Location/Qualifiers
misc_feature           1..1431
                       note = C. botulinum neurotoxin of serotype C linked to the
                       signalpeptide of VAMP2
source                 1..1431
                       mol_type = other DNA
                       organism = synthetic construct
SEQUENCE: 33
atgcaccacc atcatcatca tcctattaca atcaacaatt ttaattattc tgacccagtg    60
gacaacaaaa acatacttta ccttgatacc cacctcaata ctctggcgaa cgagccagag   120
aaagcgttcc gcataacagg aaacatatgg gtgattcctg acagattcag tcgaaatagt   180
aacccaaacc tgaacaagcc tccgagggtt acatcccta agtccggtta ttacgacccc    240
aattacctgt ctacagatag cgataaagat cctttcctga aagagatcat taaactgttc   300
aaacgaataa actcccgcga aatcggggag gaactcattt atcgattgtc cacggacatc   360
cctttccctg gtaataacaa caccccgatt aataccttg acttcgacgt cgactttaac    420
tctgtggatg tgaagactcg gcagggtaac aactgggtta aaactgggtc aatcaacccg   480
tctgtcataa ttacaggccc tagggagaat ataattgatc cggagaccag cacctttaaa   540
ttgactaata atactttcgc cgcacaggag gggttcggcg ccctgtctat catatcaatc   600
agtccccgat ttatgctgac ctactctaat gcaactaacg acgtcgggga aggtcggttt   660
agcaaaagtg agttctgcat ggacccgatc ctcatactga tgcacgagtt gaaccatgca   720
atgcataatc tgtatggaat cgctattccc aacgatcaga caatatcttc cgtcacgtca   780
aacattttct attctcagta taatgtgaaa ctggaatatg ctgagatcta cgccttttggt  840
ggccccacaa ttgacctgat tccaaagagc gccaggaagt acttcgagga aaaggcactt   900
gattattata ggagcatcgc aaagcgcctg aacagcatca caacgccaa cccaagctct   960
ttcaacaaat atataggcga ataagcaa aaactcatta gaaatacag gtttgtggtg    1020
gaaagcagcg gagaggtaac cgtaaaccgc aacaaattcg tggagctgta caacgaactg  1080
actcagatct ttacggaatt caattacgct aagatctaca atgtgcagaa ccggaagatt  1140
tacctgtcca atgtttacac acctgtcact gctaatattc tcgatgacaa tgtgtacgac  1200
attcagaatg gcttcaacat ccccaagtct aacctgaacg tgctgttcat gggccagaac  1260
cttagccgca atcctgcgct gcgcaaagtc aaccctgaga atatgctgta tctcttcacg  1320
aagttctgtc acaaggccat agacggtaga agtctttata atatgatgat tatactgggg  1380
gtgatctgcg cgattatcct tattattatc attgtatact tctctacatg a           1431
```

VIRAL VECTORS FOR TREATING NEUROGENIC DETRUSOR OVERACTIVITY

CROSS-REFERENCE TO RELATED APPLICATIONS

This application is a Continuation of copending application Ser. No. 16/312,867, filed on Dec. 21, 2018, which is the National Phase under 35 U.S.C. § 371 of International Application No. PCT/EP2017/065587, filed on Jun. 23, 2017, which claims the benefit under 35 U.S.C. § 119(a) to Patent Application No. 16305765.6, filed in Europe on Jun. 23, 2016, all of which are hereby expressly incorporated by reference into the present application.

REFERENCE TO ELECTRONIC SEQUENCE LISTING

The application contains a Sequence Listing which has been submitted electronically in .XML format and is hereby incorporated by reference in its entirety. Said .XML copy, created on Jul. 14, 2022, is named "2022-07-15_Sequence-Listing_3493-0679PUS2.xml" and is 68.4 KB in size. The sequence listing contained in this .XML file is part of the specification and is hereby incorporated by reference herein in its entirety.

The present invention is directed to a viral expression vector and a pharmaceutical composition thereof that selectively modulates or silences the afferent nerves of the bladder, as a gene therapy strategy for the treatment of neurogenic detrusor overactivity (NDO).

In particular, the present invention is related to the field of control of urine storage and bladder emptying or micturition, which is dependent upon the activity of two functional units in the lower urinary tract: (1) a reservoir (the urinary bladder) and (2) an outlet consisting of the bladder neck, urethra, and striated muscles of the external urethral sphincter (EUS) (Fowler et al. 2008; Morrison et al. 2005). These structures are controlled by three sets of efferent peripheral nerves: sacral parasympathetic (pelvic nerves), thoracolumbar sympathetic (hypogastric nerves and lumbo-sacral sympathetic chain), and somatic nerves (pudendal nerves) distributed bilaterally (de Groat 1986; Morrison et al. 2005). These nerves consist of efferent axons originating at thoracolumbar and sacral spinal levels. Parasympathetic efferent nerves contract the bladder and relax the urethra. Sympathetic efferent nerves relax the bladder and contract the urethra. Somatic efferent nerves contract the EUS. These nerves also contain afferent neurons that transmit information from the lower urinary tract to the lumbosacral spinal cord. The cellular bodies of the afferent neurons of the human lower urinary tract are located in the S2-S4 and T11-L2 dorsal root ganglia (DRG). Sensations of bladder fullness are conveyed to the spinal cord by the pelvic and hypogastric nerves, whereas sensory input from the bladder neck and the urethra is carried in the pudendal and hypogastric nerves.

A similar segmental organization occurs in nonhuman primates, cats and dogs. In rats, cellular bodies of the afferent neurons of pelvic, pudendal and hypogastric nerves are located in the L6-S1 and T11-L2 DRG respectively. The neural pathways that control lower urinary tract function are organized as simple on-off switching circuits that maintain a reciprocal relationship between the urinary bladder and the urethral outlet. Storage reflexes are activated during bladder filling and are organized primarily in the spinal cord, whereas voiding is mediated by reflex mechanisms that are organized in the brain (Fowler et al. 2008). Throughout bladder filling, the parasympathetic innervation of the detrusor is inhibited and the smooth and striated parts of the urethral sphincter are activated, preventing involuntary bladder emptying. This process is organized by urethral reflexes known collectively as the 'guarding reflex'. They are activated by bladder afferent activity that is conveyed through the pelvic nerves, and are organized by interneuronal circuitry in the spinal cord (Fowler et al. 2008).

NDO refers to a condition in which abnormal bladder function is observed in patients with neurological diseases, such as cerebrovascular disease or cerebral infarction, brain or spinal cord injury due to trauma, multiple sclerosis, Parkinson's disease, congenital malformation e.g. spina bifida, or disease e.g. hereditary spastic paraplegia of the central nervous system, peripheral neuropathy, and various spinal lesions, that is, spinal cord compression and injury due to vertebra(e) fracture, cervical and lumbar spondylosis, spondylosis deformans, spondylolisthesis, spinal stenosis, vertebral disk hernia and the like.

NDO is characterized by involuntary detrusor (bladder) contractions during the filling phase, which may be spontaneous or provoked due to a relevant neurological condition. It is often associated to bladder-sphincter dyssynergia.

NDO due to spinal cord injury (SCI) is the most severe form of NDO. Immediately after SCI there is a period of spinal shock lasting for 2-12 weeks during which the bladder is areflexic, accountable for complete urinary retention. Then, a spinal micturition reflex progressively develops that is responsible for NDO. For SCI patients, these impairments lead to urinary incontinence and increase in bladder pressure, which, if untreated, can damage upper urinary tract and precipitate renal failure. Urinary incontinence is associated with a significant burden and severely impairs quality of life. In SCI patients, recurrent urinary tract infections due to incomplete bladder emptying and renal failure remain the first cause of rehospitalization and second cause of mortality respectively. SCI disrupts voluntary control of voiding as well as the normal reflex pathways that coordinate bladder and sphincter functions. In suprasacral spinal lesion, NDO results of the unmasking of a segmental reflex at the level of the sacral cord, mediated by bladder afferent nociceptive C-fibers (de Groat and Yoshimura, 2006). These silent C-fibers become mechano-sensitive and initiate automatic micturition reflex after SCI. This reflex is facilitated after elimination of supraspinal control. Plasticity occurs in bladder afferents and is associated with changes in the properties of ion channels and electrical excitability of afferent neurons, and appears to be mediated in part by neurotrophic factors released in the spinal cord and the peripheral target organs. Overall, the neurobiological substrate for NDO comprises functional alterations in bladder urothelium and sub-urothelium as well as increased afferent sensory messages to the spinal cord, originating in the bladder. Exacerbated afferent bladder stimuli, resulting from hypertrophy and hyperactivity of non-myelinated type-C bladder afferent neurons, are the main mechanisms causing NDO in SCI subjects.

Standard of care for the treatment of NDO consists in inhibiting efferent neurotransmission at the detrusor level. Accordingly, NDO patients are currently treated with antimuscarinics, which block the activity of the muscarinic acetylcholine receptors thereby inhibiting detrusor contractions, and/or repeated intradetrusor injection of *Clostridium botulinum* neurotoxin A (BoNT-A), again to block detrusor contractions by acting on bladder efferents. Both treatments must be combined with intermittent bladder catheterization (5-6 times/day).

BoNT-A injections suppress the formation of SNARE complex, blocking the fusion of neurotransmitter-filled vesicles with the plasma membrane of efferent neurons and their release during exocytosis. Accordingly, injection of BoNT-A is used as medication for treating patients with overactive bladder from neurogenic origin or not. For example, PCT patent applications WO 99/03483 and WO 2010/022979 disclose the use of BoNT-A injection to prevent a nerve from stimulating its target tissue, e.g. a muscle, a gland, or another nerve, for the treatment of various urinary disorders.

WO2013/180799 discloses the use of a viral vector encoding a modified *botulinum* neurotoxin, thereby producing a protein that has improved binding properties to its human receptors. Following production in cell lines, once recovered and purified from the supernatants, this neurotoxin can be locally applied to treat a condition associated with unwanted neuronal activity such as NDO. However, these vectors are not conceived for a gene therapy approach.

Nevertheless, injection of *botulinum* neurotoxins presents the inconvenient of toxin diffusion, which is largely due to diffusion of toxins to other regions of the body. The adverse effects range from transient non-serious events such as ptosis and diplopia to life-threatening events even death. In addition, for NDO these injections must be repeated in average every 6 months because of decreased efficacy overtime.

Because NDO, with or without bladder-sphincter dyssynergia, caused by supra sacral spinal lesions is due to the emergence of an abnormal reflex mediated by bladder afferences (aδ and c fibers), an alternative approach for the treatment of NDO has been developed by Brindley (Brindley et al 1986). This approach combines posterior sacral rhizotomies and sacral anterior roots stimulation (SARS). This treatment appeared to be one of the most effective therapeutic methods for NDO caused by complete suprasacral spinal lesions: sacral rhizotomies permanently increases the compliance of the bladder and eliminates hyperactivity of the detrusor—and detrusor-sphincteric dyssynergia—which are the main causes of renal failure and urinary incontinence, while implantation of a stimulator of the anterior spinal roots enables the patient to elicit and to control micturition.

Deafferentation by posterior sacral rhizotomies, as proposed by Brindley (1986), consists of the complete surgical transsection of all afferent neural fibers to the spinal S2-S4 segments, including those providing sensory input from the detrusor muscle. In this way, the sensory stimuli from the detrusor muscle cannot reach anymore the central nervous system, and consequently, reflex activities generated by the central nervous system causing uncontrolled bladder contractions can be inhibited. The procedure is necessary to prevent exacerbated reflex activities of detrusor and allows larger amount of urine to be stored at low bladder pressure. However, bladder deafferentation obtained from extensive, non-selective, irreversible pelvi-perineal deafferentation by posterior sacral rhizotomies (S2-S4) has many pitfalls and drawbacks, as it is responsible for loss of remaining pelvi-perineal sensation if present, impairing orgasm if present, reflex erection and ejaculation if present, and reflex micturition and defecation if present, and possibly facilitating bedsore because of loss of skin sensory innervation. In addition, the magnitude of neurosurgical procedure makes it expensive and can be responsible for cerebrospinal fluid fistulas and in the long-term for Charcot spinal arthropathy.

Consequently, there is a need for a new strategy to treat NDO in case of supraspinal lesion, targeting specifically its pathophysiology i.e. the abnormal spinal reflex mediated by bladder afferences, but without affecting other afferent neurons conveyed in the same nerves, while sparing the bladder efferent neurons. The strategy we propose is a gene therapy approach resulting in selective molecular bladder deafferentation, to restore continence and micturition in NDO patients when combined with sacral anterior roots stimulation. This has been achieved by a new strategy requiring a viral expression vector able to deliver therapeutic transgene(s) presenting:

capacity to inhibit/silence neurotransmission or synaptic transmission of afferent neurons;

high selectivity, notably for the afferent neurons of the bladder;

high efficiency;

stability of expression over time; and absence of off-target denervation.

In the context of the present invention, the inventors surprisingly found that, following injection of the viral expression vector in the bladder wall, it is possible to obtain selective and stable transgenes expression in the afferent neurons of the bladder, using a viral expression vector that stably expresses over time proteins and/or transcripts to treat NDO, by specifically inhibiting/silencing neurotransmission or synaptic transmission of bladder afferent neurons at the spinal cord level.

The present invention provides a method and a pharmaceutical composition for the treatment of the NDO comprising the viral expression vector carrying a transcription cassette that harbors transgene(s) inhibiting/silencing neurotransmission or synaptic transmission of afferent neurons. Preferably, the method and a pharmaceutical composition according to the invention comprise a viral expression vector carrying a transcription cassette that harbors transgene(s) disrupting SNARE complex, and/or ribosomal complex, and/or activating GABA(A) receptors, and/or inducing conditionally targeted neuron ablation, when transcribed, that inhibit/silence neurotransmission or synaptic transmission of bladder afferent neurons.

The term "transcription cassette" as used herein refers to any nucleic acid sequence containing a promoter and a downstream coding sequence or transgene, which expression is driven by said promoter, which is followed by a polyadenylation signal. The term "transgene" refers to a particular nucleic acid sequence encoding for a RNA and/or a polypeptide or a portion of a polypeptide to be expressed in a cell into which the nucleic acid sequence is introduced. The term "transgene" includes (1) a nucleic acid sequence that is not naturally found in the cell (i.e., a heterologous nucleic acid sequence); (2) a nucleic acid sequence that is a mutant form of a nucleic acid sequence naturally found in the cell into which it has been introduced; (3) a nucleic acid sequence that serves to add additional copies of the same (i.e., homologous) or a similar nucleic acid sequence naturally occurring in the cell into which it has been introduced; or (4) a silent naturally occurring or homologous nucleic acid sequence whose expression is induced in the cell into which it has been introduced. By "mutant form" is meant a nucleic acid sequence that contains one or more nucleotides that are different from the wild-type or naturally occurring sequence, i.e., the mutant nucleic acid sequence contains one or more nucleotide substitutions, deletions, and/or insertions. In some cases, the transgene may also include a sequence encoding a leader peptide or signal sequence such that the transgene product will be secreted from the cell, or the transgene may include both a leader peptide or signal sequence plus a membrane anchor peptide or even be a fusion protein between two naturally occurring proteins or part of them, such that the transgene will remain anchored to cell membranes.

As used herein, the term "ribosomal complex" refers to a complex which is essentially composed of the subunits of ribosomes, such as 80S and 70S subunits that catalyzes the synthesis of proteins, referred as translation.

In a first aspect, the present invention thus provides a viral expression vector comprising at least:

a) one promoter selectively active in afferent neurons of the bladder,
b) one transcription cassette comprising a nucleotide sequence operably linked to said promoter, wherein said nucleotide sequence silences or inhibits the transduction of the neurotransmitter signal in postsynaptic cell when transcribed, and
c) one sequence conferring long-term expression, such as that known as LTE (Lokensgard et al, 1997) and/or containing DNA insulators (Amelio et al, 2006) from the HSV-1 genome, operably linked to said transcription cassette.

In preferred embodiment, the nucleotide sequence of viral expression vector according to the invention silences or inhibits neurotransmission or synaptic transmission when transcribed or translated by disrupting the SNARE complex, and/or the ribosomes complex, and/or by activating GABA (A) receptors, and/or by inducing conditionally targeted neuron ablation.

In a preferred embodiment, the nucleotide sequence of viral expression vector according to the invention, when transcribed, disrupts at least one of the proteins selected from VAMP, SNAP-25 or syntaxin 1a, which are part of the SNARE complex, or codes for the protein GAD67 or for an active fragment thereof, or codes for a protein disrupting the ribosomes complex or for an active fragment thereof, or codes for a protein inducing conditionally targeted neuron ablation, or for an active fragment thereof.

In a particular embodiment, the said protein disrupting the ribosomes complex according to the invention is a wild-type or a modified ribosome inactivating protein (RIP) or an active fragment thereof, preferentially said RIP are selected from RIP of type 1 or type 2, preferentially RIP of type 1 are selected from saporin, gelonin, dianthin, trichosanthin; and RIP of type 2 are selected from ricin, volkensin and abrin, more preferentially said RIP of type 1 is saporin S6 or an active fragment thereof.

The term "protein inducing conditionally targeted neuron ablation" relates to a protein which converts innocuous prodrug substrates, such as metronidazole (MTZ), into cytotoxic DNA crosslinking agents—providing cell-specific ablation of the targeted cell type i.e. afferent neuron of the bladder. Example of such protein inducing conditionally targeted neuron ablation are nitroreductases (NTR).

The protein inducing conditionally targeted neuron ablation according to the invention is therefore selected from the group consisting of a wild-type or a modified NTR or an active fragment thereof. Preferentially, said NTR is selected from the group consisting of a wild-type or a modified oxygen-insensitive NAD(P)H nitroreductases or an active fragment thereof, more preferentially said NTR is selected from the group consisting of a wild-type or a modified *E. coli* nitroreductases, even more preferentially said NTR is a wild-type or a modified *E. coli* nfnB or an active fragment thereof.

The term "viral vector" or "viral expression vector" as used herein refers to a nucleic acid vector that includes at least one element of a virus genome and may be packaged into a viral particle. In the context of the present invention, the term "viral vector" has to be understood broadly as including nucleic acid vector (e.g. DNA viral vector) as well as viral particles generated thereof. According to the present invention the viral expression vector is an adeno-associated virus (AAV) vector or a herpes simplex virus (HSV) vector, preferably a HSV-1 vector or a HSV-2 vector, even more preferably a defective viral vector derived from HSV-1. As used herein the term "defective viral vector" shall refer to viral vectors that are missing genes or parts of genes necessary to complete successfully the viral life cycle.

According to the present invention, the term "AAV" refers to the Adeno-Associated Virus itself or to derivatives thereof including recombinant AAV vector particles. Furthermore, as used herein, the term "AAV" includes many different serotypes, which have been isolated from both human and non-human primate samples. Preferred AAV serotypes are the human serotypes, more preferably human AAV of serotypes 2, 5 and 9, most preferably human AAV of serotype 5, which is the serotype displaying the highest level of neurotropism.

According to the present invention, the term "defective viral vector derived from HSV" refers both to defective recombinant HSV vectors and amplicon HSV vectors. The terms "defective recombinant HSV", as used herein, describes a helper-independent vector, the genome of which comprises at least complete deletions of the genes coding for two essential proteins, known as ICP4 and ICP27. The ICP4 gene is present in two copies, located in the inverted repeated sequences known as c and c' of the virus genome, and both copies of this gene are deleted. The gene encoding ICP27 is located in the unique long (UL) sequence of the virus genome. Preferentially, helper-independent vectors according to the invention carry the therapeutic transcription cassette(s) embedded into the LAT (Latency Associated Transcripts) locus (Berthomme et al. 2000 and Berthomme et al. 2001), which is a repeated locus that is contained in the inverted repeated sequences known as b and b' of the virus genome. More preferentially, the transcription cassette is placed either between the Latency Associated Promoter (LAP) and the Long-Term Expression (LTE) region (site 1), or between the LTE region and the DNA insulator (INS) sequence present downstream of the LTE (site 2) (as shown in FIG. 1). Defective recombinant HSV-1 vectors according to the present invention carry transcription cassette(s) expressing the different transgenes above described in order to inhibit/silence neurotransmission, i.e. expressing wild type or modified light chain *botulinum* toxins, and/or antisense RNA (AS-RNA) targeting SNARE proteins, and/or GAD67, and/or RIPs, and or NTRs, all of them driven by long-term DRG-specific promoters as described in the present invention. The b and b' sequences of the virus genome are also known as TRL (Terminal Repeat L) and IRL (Internal Repeat L) respectively, while the c' and c sequences are also known as IRS (Internal Repeat S) and TRS (Terminal Repeat S), where L and S refer respectively to the unique long (L) and unique short (S) sequences of the HSV-1 genome. Moreover, helper-independent vectors according to the invention can comprise additional deletions in genes encoding non-essential proteins such as ICP34.5, UL55, UL56, and UL41 proteins. These defective HSV vectors are multiplied in cell lines expressing simultaneously the proteins ICP4 and ICP27 (Marconi et al, 2010).

WO 2006/050211 discloses the use of a defective HSV-1 vector for gene therapy of pain. However, the vectors according to the invention differ from the vector described in WO 2006/050211 in several significant respects, which are important in regard to the usefulness and efficacy of the vectors according to the invention. Most important, transgenic transcription cassettes according to the invention are introduced into the LAT locus, as this region contains both the LTE and the DNA insulator sequences (INS) that confer long-term expression to the DRG-specific promoters driving transgene expression in transcription cassettes according to the invention, whereas the vector described in WO 2006/050211 was conceived and proved for short-term action and, therefore, their transcription cassettes are driven by ubiquitous promoters and were not introduced into the LAT regions.

By "Amplicon or amplicon vector" it is meant a helper-dependent vector, the genome of which lacks most or all HSV genes coding for virus proteins. The genome of amplicon vectors is a concatemeric DNA composed of multiple copies in tandem of a plasmid—known as the amplicon plasmid—that carries one origin of DNA replication and one packaging signal from HSV-1 genome, in addition to transgenic DNA (i.e. transcription cassettes) of interest. Amplicon plasmids according to the present invention carry transcription cassettes expressing the different transgenes above described in order to inhibit/silence neurotransmission, i.e., expressing wild type or modified light chain *botulinum* toxins, and/or interfering RNA (RNAi) targeting SNARE proteins, and/or GAD67, and/or RIPs, and/or NTRs, all of them driven by long-term promoters, preferentially a long-term DRG-specific promoters as described in the present invention (see FIG. 2).

In a preferred embodiment, the vector according to the invention is a defective recombinant vector lacking at least the genes coding for the essential proteins ICP4 and ICP27, preferentially a vector tacking both ICP4 and ICP27. This vector can lack other genes, coding for non-essential proteins, such as ICP34.5, UL55, UL56 and/or UL41 gene proteins, and carries the DRG-specific transcription cassette(s), described in FIG. 7, embedded into the LAT regions of the vector genome.

In another embodiment, the vector according to the invention is an amplicon vector carrying the above described transcription cassettes driven by long-term DRG-specific promoters, as described in other parts of this document.

In a preferred embodiment, the transcription cassette according to the invention is introduced into the LAT locus.

The expression "Recombinant DNA" as used herein describes a nucleic acid molecule, i.e., a polynucleotide of genomic, cDNA, viral, semisynthetic, and/or synthetic origin, which, by virtue of its origin or manipulation, is not associated with all or a portion of the polynucleotide with which it is associated in nature. The term "recombinant" as used with respect to virus means a virus carrying a recombinant genome or a genome that has been manipulated to introduce mutations, deletions or one or more heterologous polynucleotides, including genes. The term "recombinant" as used with respect to a protein or polypeptide, means a polypeptide produced by expression of a recombinant nuclei acid. The term "recombinant" as used with respect to a host cell means a recombinant vector that carries recombinant DNA within the host cell or a cell that contains recombinant DNA inserted in its genome. The term "infection" refers to the ability of a viral vector to enter into a host cell or subject.

Defective vectors derived from HSV allow to infect neighbouring sensory neurons and establish latent infections in the nucleus of these neurons, located in the trigeminal or the dorsal root ganglia (DRG), depending on the site of infection. In particular, HSV-1 naturally infects sensory neurons and establishes lifelong latent infections in the nucleus of these neurons. It could thus be hypothesized that following injection in the bladder wall, the vectors, such as vector derived from HSV-1, will reach the sensory DRG innervating the bladder from where they will stably express the therapeutic transgene, provided that adequate bladder afferent neuron-specific promoters drive their expression. However, HSV-1 can also infect and establish latent infections in autonomic neurons (Furuta et al., 1993; Warren et al. 1978), and preliminary results demonstrate that this is actually the case when the vector is inoculated into the bladder. Therefore, it is mandatory that expression from the vectors be utterly controlled by afferent-specific promoters, also called selective promoters or selective afferent neuron-specific promoters, in order to obtain significant transgene expression only in these neurons (i.e. afferent neuron), thus avoiding expression in autonomic, also called efferent, neurons. Selective molecular or biochemical (as opposite to surgical) deafferentation of bladder afferent neurons is the most critical aspect of the present invention as it is important to preserve remaining pelvi-perineal sensation if present, orgasm if present, reflex erection and ejaculation if present, and reflex micturition and defecation if present, all of which are conveyed by sensory nerves of the pelvis that do not originate in the bladder. Further, selective bladder deafferentation would also allow to preserve bladder efferent neurons, which could be later stimulated by electrical stimulation for example via electrodes. Some studies describe the use of HSV-1-based vectors in which the transcription cassettes comprise either transient (Miyazato et al., 2009) or long-term (Puskovic et al., 2004; Miyagawa et al., 2015; WO 2015/009952A1) promoters. However, the promoters used in the studies of Puscovic (LAP2), Miyazato (HCMV promoter) and Miyagawa (artificial CAG promoter) are non-selective, leading to expression of their transgenes in many cell types, including autonomic neurons, brain neurons, and non-neuronal cells. In contrast, by combining viral regulatory sequences and afferent neuron-specific cellular promoters, some of the vectors according to the present invention enable a significantly higher afferent neuron-specific expression of the transgenes of interest (see FIG. 13).

The vectors used in the practice of the invention include at least one promoter selectively active in afferent neurons that is operationally linked to nucleotides (usually DNA) encoding an RNA molecule. By "operationally linked" it is meant herein that, in the vector, the promoter is associated with the nucleotides encoding the RNA in a manner that allows the promoter to drive transcription (i.e. expression) of the RNA from the nucleotides. Transcription of RNA from, e.g. a DNA template is well-understood.

A "promoter," as used herein, is a DNA regulatory region capable of binding RNA polymerase in a mammalian cell and initiating transcription of an operably linked downstream (3' direction) sequence. For purposes of the present invention, a promoter sequence includes at least the minimum number of bases or elements necessary to initiate transcription of a gene of interest at levels detectable above background. Within the promoter sequence is a transcription initiation site, as well as RNA polymerase binding domains. Eukaryotic promoters will often, but not always, contain "TATA" boxes and other DNA motifs, such as "CAT" or "SP1" boxes. The promoter according to the invention comprises DNA sequence starting at least 2 kb, preferably 3 kb, more preferably 4 kb upstream to the initiation site of the messenger codifying for specific, relevant gene products. These sequences preferably contain known promoters' sequences elements, such as specific transcription binding sites, and distal sequences upstream of the gene, containing additional regulatory elements.

By "active selectively in afferent neurons" it is meant herein that the promoter is active mainly or only in the afferent neurons, preferably in afferent neurons of the bladder and drives transcription (i.e. expression) of the RNA.

Also, those of skill in the art will recognize that many such mammalian afferent neuron specific promoters are known, and additional afferent neuron specific promoters are continually being discovered. All such afferent neuron specific promoters are encompassed by the present invention. However, many cell-specific promoter candidates have been shown to display selectivity only when they express from their endogenous location in the cellular chromosomes (Mc-Cart et al., 2002; Vassaux et al., 1996). There is no way to predict how these promoters will behave when introduced into the genome of a non-integrative expression vector, such as HSV vectors. Notably, it cannot be anticipated whether afferent neuron-specific promoters will retain the same afferent neuron-specific activity. This is both because (a) the nucleosomes bound to the promoter could differ in several respects (for example they can be in a repressive or a permissive configuration) according to the location of the promoter (in the chromosomes versus in the extra-chromosomal vector genome, or even between different positions in cellular chromosomes) and also (b) because the accessibility of positive or negative transcription factors could also differ. This means that every promoter candidate should be thoroughly studied in each specific setting (i.e. episomal vector vs. chromosomal location) to establish whether it retains or not its afferent neuron-specific activity when placed into the vector genome, as we experimentally did (see results in Example 11 and FIG. 13).

In a preferred embodiment, the promoter according to the invention is selected from promoters of genes coding for sensory neuroreceptors, such as Transient Receptor Potential Vanilloid 1 (TRPV1) or Transient Receptor Potential cation channel subfamily M member 8 (TRPM8), or from promoters of genes coding for sensory neuromodulators or sensory neurotransmitters, such as the promoters of Substance P, PACAP, Calcitonin Gene Related Peptide (CGRP) of SEQ ID NO: 3 or SEQ ID NO: 4. Preferentially, promoter of genes coding for sensory neuroreceptors according to the invention is a promoter of the TRP gene family, more preferentially the promoter TRPV1 of SEQ ID NO: 1 or TRPM8 of SEQ ID NO: 2. Preferentially, promoters of genes coding for sensory neuromodulators or sensory neurotransmitters according to the invention is the CGRP of SEQ ID NO: 3 or SEQ ID NO: 4, or the promoter of genes involved in neurite outgrowth and stress response in sensory neurons, preferably the promoter of the gene encoding advillin (ADVL) of SEQ ID NO: 5 or SEQ ID NO: 6.

The viral expression vector of the invention is directed more particularly to vertebrate, preferably to mammals, more preferably primates and humans. Therefore, those skilled in the art will recognize that such promoters are specific to species and would be able to select homologous sequences of a particular species of interest. In particular, the promoters according to the invention are human homolog of rat TRPV1 of SEQ ID NO: 1 or human TRPM8 of SEQ ID NO: 2, or rat CGRP of SEQ ID NO: 3, or human CGRP of SEQ ID NO: 4, or rat advillin of SEQ ID NO: 5 or human advillin of SEQ ID NO: 6, amongst others.

By "long-term expression sequence" or "long-term expression element (LTE)" it is meant a nucleotide sequence operably linked to the transcription cassette included in the sequence of the viral expression vector, allowing to sustain the expression of a gene product for more than 15 to 45 days or 30 to 45 days, preferably 45 to 90 days, more preferably 90 to 365 days, even more preferably 365 days to several years or even more preferably during the life of the patient.

Long-term expression (LTE) sequences were identified in HSV-1 as a region of the latency-associated transcripts (LAT), which originate from the LAT-associated promoter (LAP). This LTE is located downstream of the LAT transcription start site. Indeed, viruses harboring a DNA fragment 3' of the LAT promoter maintained detectable promoter expression throughout latency (Lokensgard et. al, 1997, Berthomme et. al., 2000, 2001). Preferably, the LTE is comprised between about 1.5 kb to about 3 kb downstream of the LAT transcription start site (Perng et al., 1996). More recently, additional sequences, known as DNA insulators, have also been described both upstream and downstream the LTE region (Amelio et al., 2006). These sequences also contribute to provide long-term expression to a given transcription cassette probably by inhibiting epigenetic silencing, and also will be incorporated in the present invention as part of the LTE elements, to confer long-term expression to the transcription cassette. Interestingly, sequences conferring long-term expression to the transcription cassette (both the LTE and the DNA insulator sequences) can be placed either upstream and/or downstream the transcription cassette.

Those of skill in the art will recognize that other LTE-like sequences, as well as other DNA insulator sequences, have been described and are continually being discovered. All such LTE-like sequences and DNA insulator sequences are encompassed by the present invention.

In preferred embodiment, the viral expression vector of the invention comprises at least one nucleotide sequence that is transcribed into a non-coding nucleotides sequence inhibiting the synthesis of at least one protein selected from VAMP, SNAP-25 and syntaxin, which are part of the SNARE complex.

The SNARE complex (soluble N-ethylmaleimide-sensitive factor attachment protein receptor) is one of the two key components of the membrane fusion machinery with the SM (Sec1/Munc18) proteins. The SNARE complex comprises the vesicle-associated "v-SNAREs" (Vesicle Associated Membrane Proteins, VAMPs, particularly VAMP1, 2 and 3) and the target membrane-associated "t-SNAREs" Syntaxins (Syn-1, 2, 3, and 4) and Synaptosome-Associated Protein of 25 kDa (SNAP-25) that assemble into complexes to mediate different fusion events.

Therefore, one embodiment of the present invention is directed to methods able to silence a specific gene and/or to disrupt the corresponding encoded protein (a "gene of interest" or "targeted gene" or "selected gene"). By "silencing" a gene, we mean that expression of the gene product is reduced or eliminated, in comparison to a corresponding control gene that is not being silenced. Those of skill in the art are familiar with the concept of comparing results obtained with control vs. experimental results. Without being bound by theory, it is believed that silencing is characterized by specific mRNA degradation or mRNA block in translation after the expression of a non-coding complementary sequence such as antisense RNA (asRNA), a small hairpin RNA (shRNA), a microRNA (miRNA), or any other form of interfering RNA (iRNA) into cells.

As herein used, the term "antisense" relates to unmodified or chemically modified single-stranded nucleic acid molecules which are relatively short in general and which are able to hybridize to a unique sequence in the total pool of targets present in cells, the sequence of said nucleic acid molecule being complementary by virtue of Watson-Crick bp hybridization, to a specific mRNA and is able to inhibit said mRNA expression and then induce a blockade in the transfer of genetic information from DNA to protein.

In the context of the invention, "RNA interference" (hereinafter referred to as RNAi) is interpreted as a process by which a double stranded RNA (dsRNA) with a given sense nucleic sequence leads to the breakdown of all messenger RNA (mRNA) comprising said nucleic sequence, in a manner specific to said nucleic sequence. Although the RNAi process was originally demonstrated in Caenorhabditis elegans, it is now clear that the RNAi process is a very general phenomenon, and inhibition of human genes by RNAi has been achieved.

The process of RNAi can be achieved using small interfering RNA (or siRNA). These siRNAs are dsRNA of less than 30 nucleotides long, comprising in their sense sequence a sequence that is highly complementary to a fragment of the target mRNA. When a siRNA crosses the plasma membrane, the reaction of the cell is to destroy the siRNA and all the sequences comprising a highly complementary sequence. Thus, an mRNA with a fragment that is highly complementary to the siRNA sequence will be destroyed, the expression of this gene being thus inhibited.

shRNA may be also used as inhibitor according to the present invention. As used herein, an "shRNA molecule" includes a conventional stem-loop shRNA, which forms a precursor miRNA (pre-miRNA). "shRNA" also includes micro-RNA embedded shRNAs (miRNA-based shRNAs), wherein the guide strand and the passenger strand of the miRNA duplex are incorporated into an existing (or natural) miRNA or into a modified or synthetic (designed) miRNA. When transcribed, a conventional shRNA forms a primary miRNA (pri-miRNA) or a structure very similar to a natural pri-miRNA. The pri-miRNA is subsequently processed by Drosha and its cofactors into pre-miRNA. Therefore, the term "shRNA" includes pri-miRNA (shRNA-mir) molecules and pre-miRNA molecules.

In general, "reduced or eliminated" refers to a reduction or elimination of detectable amounts of the gene product by an amount in the range of at least about 10% to about 100%, or preferably of at least about 25% to 100%, or more preferably about 50% to about 100%, and most preferably from about 75% to about 100%. If desired, a reduction or elimination may be determined by any of several methods that are well known to those of skill in the art, and may vary from case to case, depending on the gene that is being silenced. For example, such a reduction or elimination of the expression of the gene may be determined by quantification of the gene product (e.g. by determining the quantity of a protein, polypeptide or peptide that is made) or quantification of an activity of the gene product (e.g. an activity such as signaling or transport activity, activity as a structural component of the cell, activity such as enzymatic activity, etc.), or by observation and quantification of a phenotypic characteristic of the targeted cell in comparison to a control cell (e.g the presence or absence of a protein using specific antibodies). Any suitable means to determine whether or not a targeted gene has been silenced may be used.

In one embodiment, the non-coding nucleotides sequence according to the invention is selected from antisense RNA (asRNA), a small hairpin RNA (shRNA), a micro RNA (miRNA), or any other interfering RNA (iRNA), which inhibits the synthesis of at least one protein selected from VAMP, SNAP-25 and syntaxin.

In one embodiment, the viral expression vector comprises at least one nucleotide sequence that is transcribed into an asRNA inhibiting the synthesis of VAMP, SNAP-25 and/or syntaxin. In particular, the sequences of the asRNA used in the context of the present invention are VAMP2 antisense of SEQ ID NO: 7, SNAP25 antisense of SEQ ID NO: 8 and syntaxin antisense of SEQ ID NO: 9.

In a particular embodiment, the viral expression vector comprises at least one nucleotide sequence that is transcribed into an shRNA inhibiting the synthesis of VAMP, SNAP-25 and/or syntaxin.

In another embodiment, the viral expression vector comprises at least one nucleotide sequence that is transcribed into an miRNA inhibiting the synthesis of VAMP, SNAP-25 and/or syntaxin.

The RNA molecule that is encoded by the construct of the present invention ultimately forms a double-strand RNA molecule within the cell in which it is transcribed. In general, one strand of the double-strand RNA structure will be in the range of from about 10 to about 30 ribonucleotides in length, and preferably from about 19 to about 25 ribonucleotides in length. In the case of asRNA, one of the double-strand RNA structure will be in the range of from about 100 to several hundreds of ribonucleotides in length. It could actually be as long as the target mRNA. Those of skill in the art will recognize that several viable strategies exist for forming such double-strand RNA.

Moreover, provision of multiple viral vectors with the same afferent neuron-specific promoter but which encode different silencing RNAs may be used within the practice of the invention.

Further, it should be possible to express more than one silencing RNA in a single viral vector, driven by a single afferent neuron-specific promoter, or by more than one promoter arranged in tandem (e.g. two or more promoters). Thus, the invention contemplates using a single viral vector for silencing more than one gene.

In another embodiment, the viral expression vector according to the invention comprises at least one nucleotide sequence coding for a wild-type or a modified toxin disrupting the SNARE complex or the ribosome complex or for an active fragment thereof.

Advantageously, the active fragment of the toxin is a bacterial neurotoxin, preferentially said bacterial neurotoxin is the light chain of said bacterial neurotoxin. In particular, the sequences of the toxins light chains used in the context of the present invention are the protein sequence light chain of the *botulinum* neurotoxin A (BoNT-A) of SEQ ID NO: 10 (coding nucleotides sequence SEQ ID: 11), the protein sequence light chain of the *botulinum* neurotoxin B (BoNT-B) of SEQ ID NO: 12 (coding nucleotides sequence SEQ ID: 13), the protein sequence light chain of the *botulinum* neurotoxin C1 (BoNT-C1) of SEQ ID NO: 14 (coding nucleotides sequence SEQ ID: 15), the protein sequence light chain of the *botulinum* neurotoxin E3 (BoNT-E3) of SEQ ID NO: 16 (coding nucleotides sequence SEQ ID: 17), the protein sequence light chain of the *botulinum* neurotoxin F1 (BoNT-F1) of SEQ ID NO: 18 (coding nucleotides sequence SEQ ID: 19) and the protein sequence light chain of the tetanic neurotoxin (TeNT) of SEQ ID NO: 20 (coding nucleotides sequence SEQ ID: 21).

In preferred embodiment, the viral expression vector according to the invention comprises at least one nucleotide sequence coding for a wild-type or a modified GAD67 protein or for an active fragment thereof, preferentially nucleotide sequence coding for a wild-type GAD67 protein of SEQ ID NO: 22 (coding nucleotides sequence SEQ ID: 23) or an active fragment thereof.

In preferred embodiment, the viral expression vector according to the invention comprises at least one nucleotide sequence coding for a wild-type or a modified RIP or for an active fragment thereof, preferentially said RIP is Saporin S6 protein of SEQ ID NO: 24 (coding nucleotides sequence SEQ ID: 25) or an active fragment thereof.

In preferred embodiment, the viral expression vector according to the invention comprises at least one nucleotide sequence coding for a wild-type or a modified NTR or an active fragment thereof, preferentially said NTR is nitroreductase nfnB protein of SEQ ID NO: 26 (coding nucleotides sequence SEQ ID: 27) or an active fragment thereof.

As used herein, the term "coding sequence" refers to a ribonucleic acid (e.g., RNA) sequence that, when it is translated, produces the polypeptide of interest. The polypeptide can be encoded by a full-length coding sequence or by any portion of the coding sequence so long as the desired activity or functional properties (e.g., enzymatic activity, ligand binding, signal transduction, etc.) of the full-length or fragment is retained.

In one embodiment, the invention relates to a viral expression vector that comprises at least one nucleotide sequence coding for a wild-type or a modified *botulinum* neurotoxin of *Clostridium botulinum* of any serotype or for an active fragment thereof, preferably the light chain of *Clostridium botulinum* neurotoxin of any serotype.

In another embodiment, the invention is directed to a viral expression vector that comprises at least one nucleotide sequence coding for a wild-type or a modified tetanus neurotoxin of *Clostridium tetani* or for an active fragment thereof, preferably the light chain of *Clostridium tetani* neurotoxin.

Clostridial neurotoxins are produced by various species of the genus *Clostridium*, for example several strains of *C. botulinum* and *C. tetani*. When *Clostridium* toxin molecules enter into the neuron, the light chain disrupts the proteins that form the SNARE complex located at the presynaptic nerve terminal. This prevents the neurotransmitter filled synaptic vesicles from attaching to the presynaptic membrane, therefore inhibiting exocytosis of the neurotransmitter from the presynaptic nerve terminal. At present, there are eight different classes of the neurotoxins known: tetanus toxin and *botulinum* neurotoxin in its serotypes A, B, C, D, E, F and G, all of which share homology and similar molecular structures. Within said serotypes, subtypes are also well documented, such as subtypes $A_1$-$A_3$, $B_1$-$B_3$, etc.

*Botulinum* neurotoxin serotypes A, C, and E cleaves the SNAP-25 protein located on the plasma membrane of the presynaptic nerve terminals. Because SNAP-25 is necessary for the fusion of neurotransmitter-filled vesicles with the plasma membrane and their release during exocytosis, its cleavage causes a highly specific blockade of vesicular neurotransmitter release at somatic and autonomic presynaptic nerve terminals. *Botulinum* neurotoxin serotypes B, D, F, and G cleave the synaptobrevin (VAMP) protein, so that the vesicles cannot fuse to the cell membranes. Each *botulinum* neurotoxin or its light chain fragment cleaves one of the SNARE proteins except for *botulinum* neurotoxin C, or its light chain fragment, which cleaves both SNAP25 and syntaxin 1a. Preferably, according to the invention the serotypes of *botulinum* neurotoxin are A, B, C, E and F.

The structure of Clostridial neurotoxins has been well-documented (Habermann et al, 1986; Sugiyama et al 1980); each of these documents is hereby incorporated in its entirety by reference thereto]. In this regard, Clostridial neurotoxins comprise two polypeptide chains, the heavy chain (H-chain), which has a molecular mass of approximately 100 kDa, and the light chain (L-chain), which has a molecular mass of approximately 50 kDa, joined together by a disulphide bond.

The different serotypes of *botulinum* toxin vary in the animal species that they affect and in the severity and duration of the paralysis they evoke. For example, it has been determined that *botulinum* toxin type A is 500 times more potent, as measured by the $LD_{50}$ in mice, than *botulinum* toxin type B. Additionally, *botulinum* toxin type B has been determined to be non-toxic in primates at a dose of 480 U/kg which is about 12 times the primate $LD_{50}$ for *botulinum* toxin type A. Naturally, *botulinum* toxin binds with high affinity to neurons, is translocated into the neuron and blocks the release of neurotransmitters.

In a particular embodiment, the invention is directed to a viral expression vector that comprises at least one nucleotide sequence coding for a wild-type or a modified tetanus neurotoxin of *Clostridium tetani* or for an active fragment thereof to cleave the protein VAMP-2.

In a particular embodiment, the invention is directed to a viral expression vector that comprises at least one nucleotide sequence coding for a wild-type or a modified *botulinum* neurotoxin of *Clostridium botulinum* of serotype B, D, F, and G or for an active fragment thereof to cleave the protein VAMP-2.

In a particular embodiment, the invention is directed to a viral expression vector that comprises at least one nucleotide sequence coding for a wild-type or a modified *botulinum* neurotoxin of *Clostridium botulinum* of serotype A and E or for an active fragment thereof to cleave the protein SNAP-25.

In a preferred embodiment, the invention is directed to a viral expression vector that comprises at least one nucleotide sequence coding for a wild-type or a modified *botulinum* neurotoxin of *Clostridium botulinum* of serotype C or for an active fragment thereof to cleave the proteins SNAP25 and syntaxin 1a.

In a preferred embodiment, the nucleotide sequence of transgene according to the invention codes for a wild-type or a modified protein silencing or inhibiting the transduction of the neurotransmitter signal in postsynaptic cell which is fused to a signal peptide domain. The signal peptide according to the invention is selected according to the intracellular compartment where transcript or protein targeted to silence or inhibit the transduction of the neurotransmitter signal in postsynaptic cell is located. Therefore, those skilled in the art will recognize that such signal peptides are specific to intracellular compartment and would be able to select the appropriate corresponding nucleotide sequences to be fused to the nucleotide sequence coding for the protein silencing or inhibiting neurotransmission or synaptic transmission according to the invention. In particular, the signal peptides according to the invention comprise at least the luminal, transmembrane or cytoplasmic domains of proteins selected from VAMP2 or Syntaxin 1a In a particular embodiment, fusion protein according to the invention comprises a signal peptide domain selected from luminal, transmembrane or cytoplasmic signal peptide domains, preferentially the luminal, transmembrane or cytoplasmic signal peptide domains of the SNARE proteins, the substance P or CGRP sequences. Such signal peptide domains include notably the signal peptide of syntaxin 1a (BoNTB-STX) of SEQ ID NO: 30 (coding nucleotides sequence SEQ ID: 31) and the signal peptide of VAMP2 (BoNTC-VAMP) of SEQ ID NO: 32 (coding nucleotides sequence SEQ ID: 33). Thus, according to a particular embodiment of the invention, the fusion protein comprises a modified bacterial neurotoxin, such as e.g., a modified *botulinum* neurotoxin, and a signal peptide such as e.g., the signal peptide of syntaxin 1a (BoNTA-STX) of SEQ ID NO: 28 or (BoNTB-STX) of SEQ ID NO: 30 (coding nucleotides sequence SEQ ID: 31) and the signal peptide of VAMP2 (BoNTC-VAMP) of SEQ ID NO: 32 (coding nucleotides sequence SEQ ID: 33).

In one specific embodiment, the fusion protein according to the invention comprises the wild-type or modified *Clostridium botulinum* neurotoxin of serotype A, B, C, E or F linked to the signal peptide of syntaxin 1a, preferentially the fusion protein comprises the wild-type or modified *Clostridium botulinum* neurotoxin of serotype A linked to the signal peptide of syntaxin 1a (BoNTA-STX) of SEQ ID NO: 28 (coding nucleotides sequence SEQ ID: 29) or the fusion protein comprises the wild-type or modified *Clostridium botulinum* neurotoxin of serotype B linked to the signal peptide of syntaxin 1a (BoNTB-STX) of SEQ ID NO: 30 (coding nucleotides sequence SEQ ID: 31).

In one specific embodiment, the fusion protein according to the invention comprises the wild-type or modified *Clostridium botulinum* neurotoxin of serotype A, C and E linked to the signal peptide of VAMP2, preferentially the fusion protein comprises the wild-type or modified *Clostridium botulinum* neurotoxin of serotype C linked to the signal peptide of VAMP2 (BoNTC-VAMP) of SEQ ID NO: 32 (coding nucleotides sequence SEQ ID: 33).

In one specific embodiment, the fusion protein according to the invention comprises the wild-type or modified *Clostridium botulinum* neurotoxin of any serotype linked to the signal peptide of Substance P.

In one specific embodiment, the fusion protein according to the invention comprises the wild-type or modified *Clostridium botulinum* neurotoxin of any serotype linked to the signal peptide of CGRP sequence.

The present invention is also directed to a viral expression vector according to the invention, comprising at least:
  a) one nucleotide sequence coding for a wild type or modified neurotoxin of *Clostridium tetani* or *botulinum* or for an active fragment thereof; and/or
  b) one nucleotide sequence whose transcripts inhibit the synthesis of the protein VAMP, SNAP-25 and/or syntaxin; and/or
  c) one nucleotide sequence coding for a wild type or modified GAD67 protein or for an active fragment thereof; and/or
  d) one nucleotide sequence coding for a wild type or modified RIP or for an active fragment thereof; and/or
  e) one nucleotide sequence coding for a wild type or modified NTR or for an active fragment thereof.

In a preferred embodiment, the viral expression vector according to the invention comprises:
  i. one said long-term expression sequence operably linked to two transcription cassettes according to the invention; or
  ii. two long-term expression sequences both operably linked to one said transcription cassette according to the invention; and wherein:

a) one transcription cassette according to the invention harbors a coding sequence according to the invention, and the second transcription cassette according to the invention harbors a sequence that is transcribed into a non-coding nucleotide according to the invention; or
b) both transcription cassettes according to the invention harbor a nucleotide sequence coding for a non-coding nucleotides sequence according to the invention; or
c) both transcription cassettes according to the invention harbor a nucleotide sequence coding for a wild type or modified neurotoxin of *Clostridium tetani* and/or *botulinum* or for an active fragment thereof; or for a wild type or modified GAD67 protein or for an active fragment thereof; or for a wild type or modified RIP or for an active fragment thereof; or for a wild type or modified NTR or for an active fragment thereof.

In a particular embodiment, the invention relates to a viral expression vector, wherein
  i. one said long-term expression (LTE) sequence is operably linked to two transgenic transcription cassettes according to the invention; or
  ii. two separated long-term expression (LTE) sequences are each operably linked to one said transcription cassette according to the invention;
and wherein:
  a) one transcription cassette according to the invention harbors a sequence coding for a bacterial neurotoxin, a GAD67, a RIP, or a NTR according to the invention, and the second transgenic transcription cassette according to the invention harbors a sequence that is transcribed into a non-coding nucleotides sequence according to the invention that inhibit the synthesis of the protein VAMP, SNAP-25 and/or syntaxin; or
  b) both transcription cassettes according to the invention harbor a nucleotide sequence coding for a non-coding nucleotides sequence according to the invention that inhibit the synthesis of at least one protein selected from VAMP, SNAP-25 and/or syntaxin; or
  c) both transgenic transcription cassettes according to the invention harbor a promoter and a nucleotide sequence coding for a wild type or modified neurotoxin of *Clostridium tetani* and/or *botulinum* or for an active fragment thereof; or a wild type or modified GAD67 protein or for an active fragment thereof; or a wild type or modified RIP or for an active fragment thereof; or a wild type or modified NTR or for an active fragment thereof.

In a preferred embodiment, the invention relates to a viral expression vector, wherein at least one of said transgenic transcription cassettes according to the invention harbors a promoter and a sequence coding for the wild-type protein GAD67 or for an active fragment thereof.

In a more preferred embodiment, the invention relates to a viral expression vector, wherein one of the said transgenic transcription cassettes according to the invention harbors a promoter and a sequence coding for the wild-type protein GAD67 or for an active fragment thereof; and one of the said transgenic transcription cassettes according to the invention harbors a promoter and a sequence coding for a wild type or modified neurotoxin of *Clostridium tetani* and/or *botulinum* or for an active fragment thereof.

In a preferred embodiment, the invention relates to a viral expression vector, wherein at least one of said transgenic transcription cassettes according to the invention harbors a promoter and a sequence coding for the wild-type RIP or for an active fragment thereof.

In a more preferred embodiment, the invention relates to a viral expression vector, wherein one of the said transgenic transcription cassettes according to the invention harbors a promoter and a sequence coding for the wild-type RIP or for an active fragment thereof; and one of the said transgenic transcription cassettes according to the invention harbors a promoter and a sequence coding for a wild type or modified neurotoxin of *Clostridium tetani* and/or *botulinum* or for an active fragment thereof; and/or a sequence coding for the wild-type protein GAD67 or for an active fragment thereof, and/or a sequence coding for the wild-type NTR of for an active fragment thereof.

In a preferred embodiment, the invention relates to a viral expression vector, wherein at least one of the transgenic transcription cassettes according to the invention comprises a promoter and a sequence coding for the wild-type NTR or for an active fragment thereof.

In a more preferred embodiment, the invention relates to a viral expression vector, wherein said viral expression vector comprises at least 2 transgenic transcription cassettes, wherein:

at least one of the said transgenic transcription cassettes according to the invention comprises a promoter and a sequence coding for the wild-type NTR or for an active fragment thereof; and At least one of the said transgenic transcription cassettes according to the invention comprises a promoter and a sequence coding for a wild type or modified neurotoxin of *Clostridium tetani* and/or *botulinum* or for an active fragment thereof; and/or a sequence coding for the wild-type protein GAD67 or for an active fragment thereof; and/or a sequence coding for the wild type RIP or for an active fragment thereof.

In a second aspect, the invention relates to a composition comprising the viral expression vector of the present invention for use as a medicament.

In a third aspect, the invention is directed to a pharmaceutical composition comprising at least one viral expression vector according to the invention.

Advantageously, the pharmaceutical composition according to the invention is used for the treatment of the NDO.

The invention also relates to a pharmaceutical composition comprising:
a) at least one viral expression vector comprising at least one nucleotide sequence transcribed into a non-coding nucleotides sequence, preferably selected from antisense RNA (asRNA), a small hairpin RNA (shRNA) or a microRNA (miRNA), more preferably antisense RNA (asRNA), to inhibit the synthesis of at least one protein selected from VAMP, SNAP-25 and syntaxin; and/or
b) at least one viral expression vector comprising at least one nucleotide sequence coding for a wild-type or a modified bacterial neurotoxin disrupting the SNARE complex or for an active fragment thereof, preferably the light chain of a bacterial neurotoxin, and wherein the said bacterial neurotoxin is advantageously the neurotoxin of *Clostridium tetani* and/or *Clostridium botulinum* of any serotype, preferably serotypes A, B, C, E and F; and/or
c) at least one viral expression vector comprising at least:
one nucleotide sequence coding for a wild type or modified neurotoxin of *Clostridium tetani* or *botulinum* or for an active fragment thereof, and
one nucleotide sequence whose transcripts inhibit the synthesis of the protein VAMP, SNAP-25 and/or syntaxin; and/or
d) at least one viral expression vector according to the invention, wherein
i. one said long-term expression (LTE) sequence is operably linked to two transgenic transcription cassettes according to the invention; or
ii. two long-term expression (LTE) sequences are each operably linked to one said transgenic transcription cassette according to the invention; and wherein:
one transgenic transcription cassette according to the invention harbors a promoter and sequence coding for said neurotoxin, and the second transgenic transcription cassette according to the invention harbors a promoter and a sequence nucleotide inhibiting the synthesis of the protein VAMP, SNAP-25 and/or syntaxin; or
both transgenic transcription cassettes according to the invention harbor a promoter and a nucleotide sequence coding for a non-coding nucleotides sequence inhibiting the synthesis of at least one protein selected from VAMP, SNAP-25 and/or syntaxin; or
both transgenic transcription cassettes according to the invention harbor a nucleotide sequence coding for a wild type or modified neurotoxin of *Clostridium tetani* and/or *botulinum* or for an active fragment thereof for simultaneous, separated or staggered use for treating NDO.

In a particular embodiment, the pharmaceutical composition according to the invention, further comprises at least one viral expression vector comprising at least one nucleotide sequence coding for the wild-type protein GAD67 and/or RIP and/or NTR, or for an active fragment thereof.

In a particular embodiment, the pharmaceutical composition according to the invention, comprises at least one viral expression vector comprising at least one nucleotide sequence coding for the wild-type protein GAD67 or for an active fragment thereof; and/or at least one nucleotide sequence coding for a wild type or modified neurotoxin of *Clostridium tetani* and/or *botulinum* or for an active fragment thereof; and/or for the wild-type RIP or for an active fragment thereof; and/or for the wild-type NTR or for an active fragment thereof.

In a fourth aspect, the present invention relates to a kit comprising at least one viral expression vector or the pharmaceutical composition according to the invention, or the pharmaceutical composition according to the invention, and an electrical stimulation system comprising electrodes to be implanted on the sacral anterior roots, such as S2-S3-S4, to apply intermittent stimulation pulse trains in order to achieve a sustained detrusor muscle contraction with intervals of urethral sphincter relaxation allowing urine to flow.

By "electrical stimulation" it is meant herein that an electrical stimulation is applied, via electrodes, in bursts of a few seconds, separated by longer gaps, to sustain pressure in the bladder, while allowing the external urethral sphincter to relax rapidly between bursts, causing urine to flow during these gaps. The preferred electrical stimulation system is the Finetech-Brindley stimulator (ref 6 à 19 in Ren et al, 2015).

The invention further relates to a method for the treatment of patient suffering from NDO comprising the steps of:
a) preparing at least one viral expression vector according to the invention;
b) injecting the viral expression vector of step a) in the bladder wall (detrusor muscle);

c) implanting electrical stimulation system via electrodes implanted on the sacral anterior roots, such as S2-S4 or S3-S4, to elicit by stimulation in bursts of a few seconds, separated by longer gaps, a sustained pressure in the bladder, while allowing the external urethral sphincter to relax rapidly between bursts, causing urine to flow.

The following examples merely intend to illustrate the present invention.

(A): The upper part of the figure describes the backbone of the HSV-1 genome used in this invention. The HSV-1 genome contains two unique regions, known as Unique Long (UL) and Unique Short (US), each bordered by repeated inverted sequences, known as Terminal Repeat L/Inverted Repeat L (TRL/IRL) and Inverted Repeat S/Terminal Repeat S (IRS/TRS). TRL/IRL are also denominated ab/b'a', whereas IRS/TRS are also denominated a'c'/ca. The genome therefore starts and ends by the direct repeat sequence 'a'. The black square in UL indicates that the gene coding for the essential ICP27 protein is deleted in the vector used in this invention. Similarly, the two black squares in the IRS/TRS repeats, indicate that the two genes coding for the essential ICP4 protein are also deleted. The white circle in UL, as well as the two white circles in the IRS and TRS regions, indicate the origins of DNA replication of HSV-1 (respectively OriL and two copies of OriS). Other genes, coding for non-essential proteins, such as UL41, UL55 and UL56, can be also deleted. In addition, both copies of the 1E4/5 promoters localized in the IRS and TRS are modified in such a way (deletion of one TAATGARAT sequence) that these promoters express with early kinetics (instead of immediate-early kinetics as in the wild-type virus genome).

(B): The middle part of the figure shows a detail of the b'a'a'c' region of the virus genome, indicating in particular the localization of LAT locus in the IRL region, which contains the gene expressing the latency associated transcripts (LAT).

Figures 3, 4:
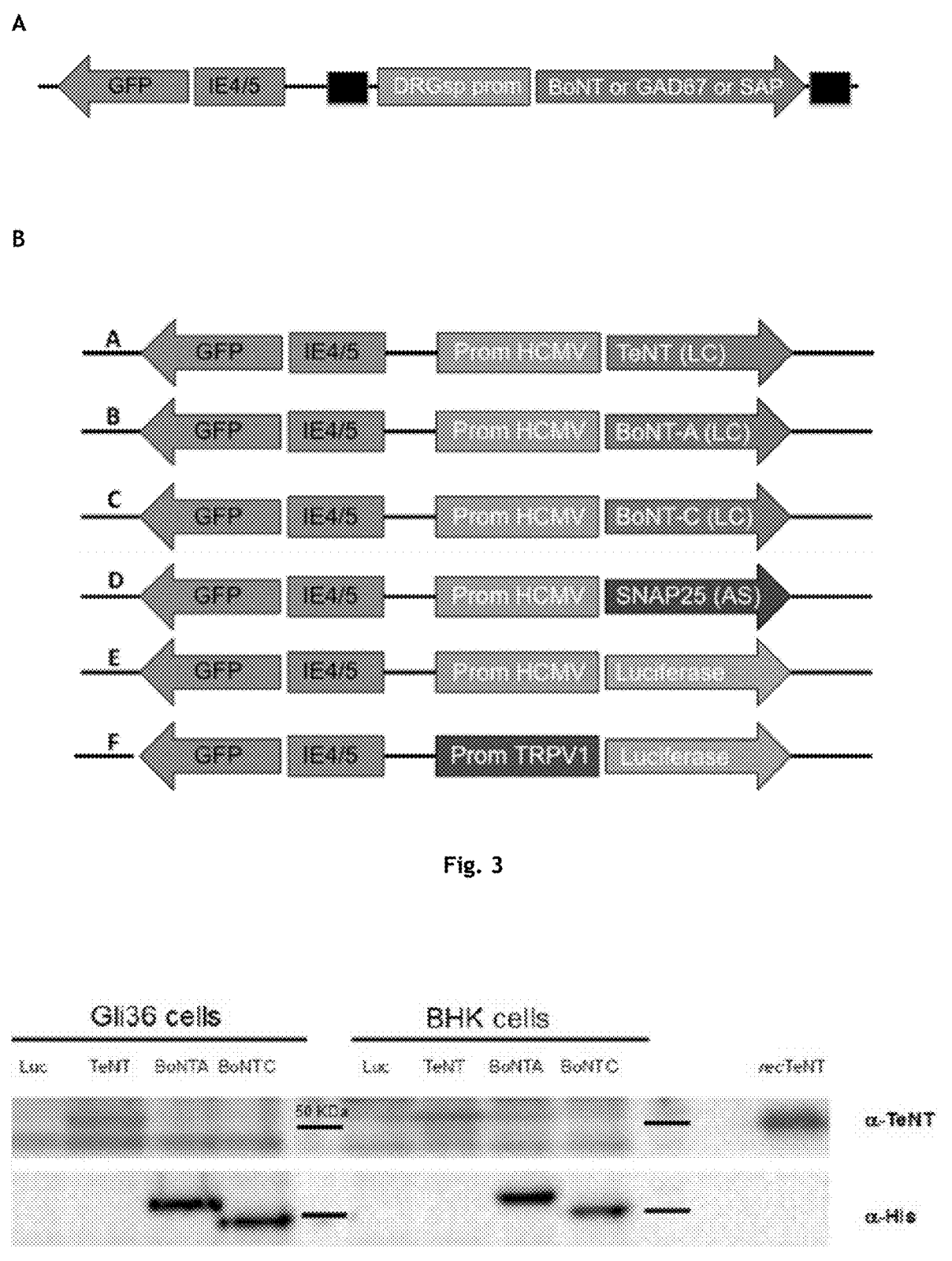

(C and C'): The bottom part of the figure shows the detailed structure of the 5' part of the LAT locus that carries the therapeutic DRG-specific transcription cassettes (indicated in the figure as the arrow labeled Transgene). This locus includes an upstream DNA insulator (INS) sequence, the Latency Associated Promoter (LAP), a region conferring Long-Term Expression (LTE) and a downstream DNA insulator (INS). The therapeutic DRG-specific transcription cassette is introduced either between the LAP and the LTE (site 1, in C) or between the LTE and the second DNA insulator (site 2 in C'). Other genes in the vicinity of LAT are also indicated in B (arrows). The different DRG-specific transcription cassettes that are introduced in the LAT region to generate the recombinant vectors are shown in FIG. 3. It should be stressed that the region b'a'a'c' is identical to the inverted caab region, which forms when the virus genome becomes circularized in the cell nucleus at the beginning of infection. This means that both copies of ICP4 are deleted and that the transgenic transcription cassette can be introduced in both copies of the LAT locus.

Figure 2:
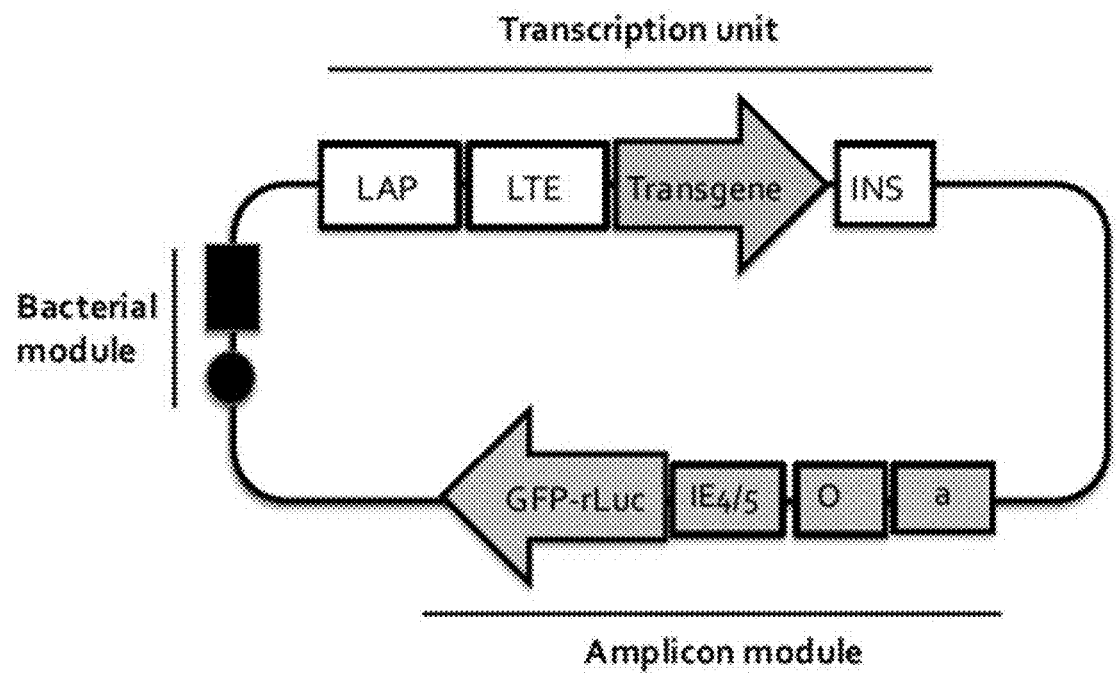

FIG. 2. Genome of amplicon vectors (the amplicon plasmid).

Amplicon plasmids are standard *E. coli* plasmids generally carrying three modules: (1) The bacterial module, which contains the Col E1 sequence for plasmid replication in bacteria, and a gene conferring resistance to an antibiotic, generally ampicillin (in black). (2) The amplicon module, which contains an HSV-1 origin of DNA replication, generally OriS (O), and a packaging signal (a) allowing amplification and packaging of a concatemeric form of the amplicon plasmid; in addition, this module generally express a reporter protein (in our case, either a GFP protein, or a fusion GFP/renilla luciferase (rLuc) protein) driven by the HSV-1 immediate early promoter 1E4/5. (3) The third module is the transcription unit, containing the DRG-specific transcription cassette (grey arrow labeled Transgene) placed between the LTE and INS sequenced, designed to inhibit or silence neurotransmission stably and selectively in sensory neurons, as described in this invention. The different transcription cassettes that are introduced into the amplicon plasmid to generate the amplicon vectors are shown in FIG. 3.

FIG. 3. A. This figure represents the region of the genome of amplicon vectors used in this invention that carries the two eukaryotic transcription cassettes. One of them expresses the reporter GFP (or the fusion GFP-rLuc) gene under the control of the 1E4/5 immediate-early promoter of HSV-1. The second transcription cassette expresses any of the therapeutic functions that inhibit or silence neurotransmission, as described in this invention. A DRG-specific promoter drives expression of the transcription cassettes, whereas the whole cassette is surrounded by sequences conferring long-term expression (black squares). B. This figure shows some of the transcription cassettes used in this study to demonstrate the efficacy and selectivity of the genetic constructs. These are: vector A: HCMV-TeNT light chain, (LC); vector B: HCMV-BoNT-A (LC); vector C: HCMV-BoNT-C (LC); vector D: SNAP25 antisense RNA; vector E: HCMV-Luciferase; vector F: TRPV1-Luciferase. BoNT-A (LC) and BoNT-C (LC) are fusion proteins that express a C-terminal HIS-tag, as no efficient anti-BoNT antibodies are available. HCMV is a strong and ubiquitous viral promoter, whereas TRPV1 is a DRG-selective promoter. Others vectors, expressing other *botulinum* toxins, or fusion SNARE/light chain toxins, or antisense RNA addressed to other SNARE proteins, or the human GAD67 protein, or a RIP protein such as Saporin S6, are not shown in this Figure.

FIG. 4 shows the expression of BoNT-A (LC), BoNT-C (LC) and TeNT (LC) in Gli36 (a cell line derived from a human glioblastoma) and BHK21 (hamster fibroblast cells) cell lines. Gli36 and BHK21 cells were infected with the amplicon vectors HCMV-Luc, HCMV-BoNT-A (LC), HCMV-BoNT-C (LC), or HCMV-TeNT (LC) (shown in FIG. 2B). Infected cells were then fixed and expression of the toxins was demonstrated using specific antibody in a Western assay. Anti-TeNT antibodies were used to reveal TeNT (LC); anti-HIS antibodies were used to reveal both BoNT-A (LC) and BoNT-C (LC).

Figures 5, 6A:
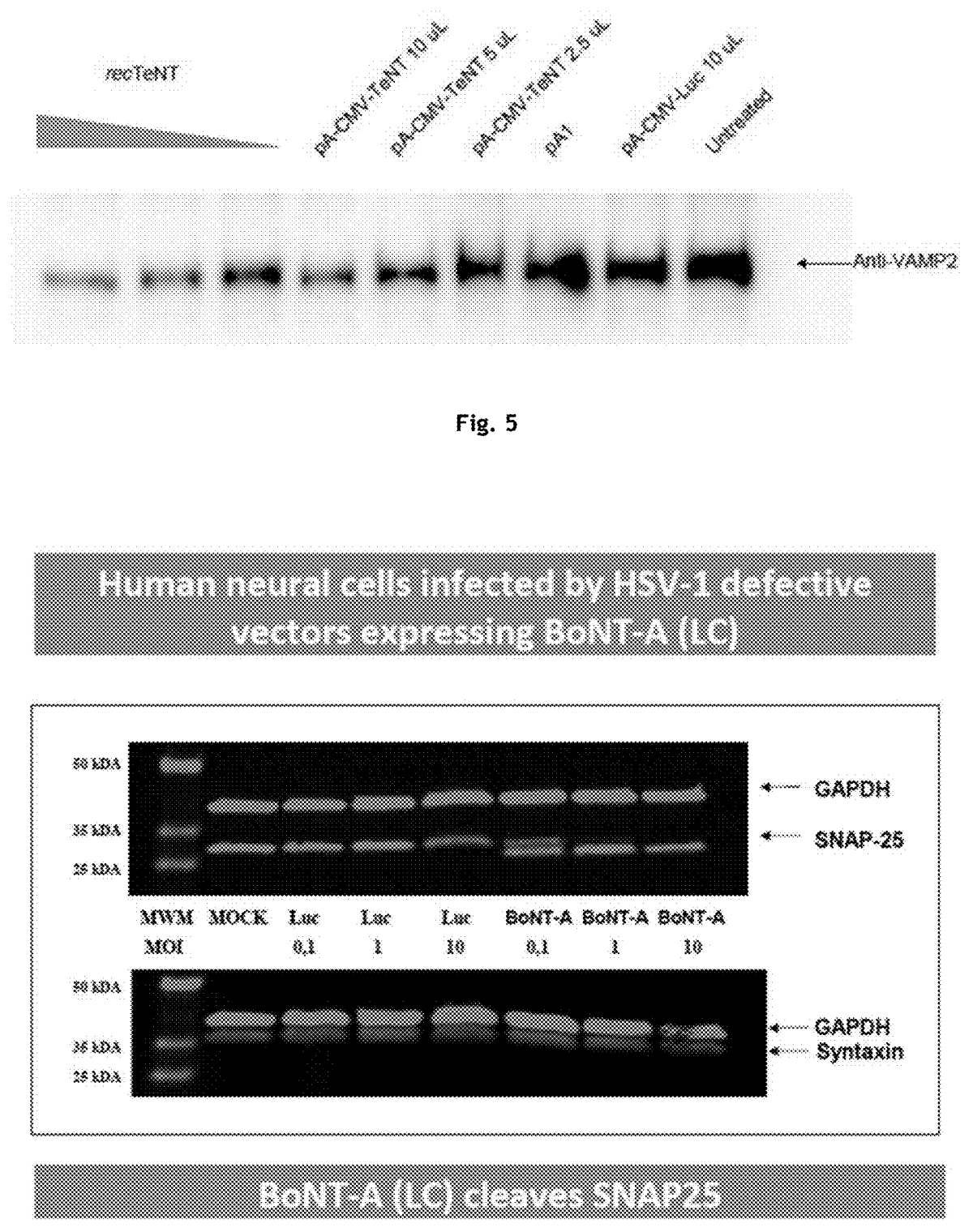

FIG. 5 shows that the toxin TeNT (LC) expressed in Gli36 cells and present in cell extracts possesses proteolytic activity with respect to VAMP2. Gli36 cells were infected with the amplicon vector expressing HCMV-TeNT (LC) at a multiplicity of infection (MOI) of 1. The infection was terminated 2 days later and protein extracts were prepared. These extracts were incubated in a suitable buffer (50 mM Hepes, 400 mM NaCl, 5 mM dithiothreitol and 2 µM $ZnSO_4$) containing the target protein of TeNT, i.e VAMP2. After incubation for 24 h at 37° C. with 2.5, 5, and 10 µL of cell extracts, westerns blots were performed using anti-VAMP2 antibody to reveal the proteolytic activity of TeNT (LC) expression.

FIG. 6A shows that at 48 hours post-infection (hpi) of human neuroblastoma SH-S5Y5 cells with amplicon vectors expressing HCMV-BoNT-A (LC) (see FIG. 3B), there is a significant decrease in cellulo of SNAP25 protein levels relative to the control cells infected with a vector expressing luciferase (HCMV-Luc) or not infected (Mock). Protein levels were detected by Western blot assay using anti-SNAP25 antibodies. Note that BoNT-A (LC) cleaves SNAP25 into two fragments. The antibodies used in these experiments recognize both the native SNAP25 protein (upper band) and the large fragment of the cleaved protein (lower band). FIG. 6B shows that at 48 hours post-infection (hpi) of human neuroblastoma SH-S5Y5 cells with amplicon vectors expressing HCMV-BoNT-C (LC) (see FIG. 3B), there is a significant decrease in cellulo of both SNAP25 and Syntaxin (STX) protein levels relative to the control cells infected with a vector expressing luciferase (HCMV-Luc) or not infected (Mock). Protein levels were detected by Western blot assay using anti-SNAP25 and anti-STX antibodies. Note that BoNT-C (LC) cleaves SNAP25 into two fragments. The antibodies used in these experiments recognize both the native SNAP25 protein (upper band) and the large fragment of the cleaved protein (lower band).

FIG. 7. Transcription cassettes carried by recombinant and amplicon vector genomes. This figure shows some of the transcription cassettes that are carried and expressed by the recombinant and amplicon HSV-1 vectors. These transcription cassettes are classified into three families. Members of the A2 family are transcription cassettes expressing different therapeutic gene products (proteins or antisense RNA or miRNA), driven by the strong and ubiquitous HCMV promoter. Vectors carrying the A2 transcription cassettes are used to study the impact of these gene products on neurotransmission (cleavage of SNARE proteins and inhibition of neurotransmitter release), thus allowing to select the most efficient transgenes in the context of this invention. Members of the A5 family are transcription cassettes expressing the reporter gene firefly luciferase (fLuc) driven by different DRG-selective candidate promoters. These vectors are used to study the intensity, selectivity, and duration of expression in cultured neurons and in explanted peripheral ganglia, thus allowing identifying the most selective vectors in the context of this invention. Finally, members of the A8 family of vectors express therapeutic transcription cassettes (therapeutic gene products driven by DRG-selective promoters), thus allowing selecting vectors with high therapeutic potential in vivo, in the context of this invention. It should be noted that, as shown in FIG. 2, amplicon vectors also express a GFP/rLuc transgene driven by the HSV-1 IE4/5 promoter.

Abbreviations

Gene Products:

- TeNT: light chain of Tetanus neurotoxin
- BoNT-X: light chains of *Botulinum* neurotoxins BoNT-A, -B, -C, -D, -E, or F
- BoNT-X-SNARE-Y: fusion proteins in which the light chain of *botulinum* neurotoxins are fused to the signal and transmembrane peptides of SNARE proteins. More precisely, these transgenes express BoNT-A-syntaxin, BoNT-B-syntaxin or BoNT-C-Vamp2.
- GAD67: glutamic acid decarboxylase of 67 kD
- NTR: nitroreductase.
- Luc: firefly luciferase (fLuc).
- Antisense-SNARE: antisense RNA to the SNARE proteins SNAP25, VAMP2 or Syntaxin.

Promoters:

Human elongation factor 1 promoter (EF1A), rat Transient Receptor Potential Vanilloide 1 (rTRPV1), human and rat Calcitonin Gene-Related Peptide (hCGRP and rCGRP), rat Acid-Sensing Ion Channel 3 (rASIC3), and human and rat Advillin (hADVL and rADVL) promoters.

FIG. 8. BoNT-A expressed from amplicon vectors cleave the SNARE protein SNAP25 in SH-SY5Y cells.

Human neuroblastoma cells (SH-S5Y5) are infected at an MOI of 01, 1.0, and 10.0 pfu/cell with amplicon vectors expressing transcription units A2-CMV-BoNT-A (LC) or A2-CMV-Luc, driven in both cases by HCMV promoter. The following day, infections were stopped, and cell proteins are analysed by Western blots using antibodies specific for BoNT-A LC and SNAP25. The higher part of the Western blot shows that increasing amounts of BoNT-A LC correspond to increasing MOI, demonstrating that the vectors used do express this protein in the infected cells. The lower part of the blots shows cleavage of SNAP25, the protein from the SNARE complex that is the natural target of BoNT-A, thus producing two fragments. At the lower MOI, mainly the native (not cleaved) form of SNAP25 is observed. At intermediate MOI, both the native and the cleaved form (the slightly lower band) can be seen, while at the higher MOI most of the SNAP25 protein is cleaved, since only the lower fragment of the doublet can be observed. This demonstrates that BoNT-A LC synthesized in SH-S5Y5 cells is able to cleave SNAP25. In contrast, in SH-S5Y5 cells infected with the vector expressing Luc, no cleavage of SNAP25 is observed.

FIG. 9. Light chains of botulin neurotoxins cleave SNARE proteins in infected neurons.

Primary cultures of rat embryonic dorsal root ganglia (DRG) neurons are infected at an MOI of 10 pfu/cell with amplicon vectors expressing transcription units A2-CMV-BoNT-A, A2-CMV-BoNT-B, A2-CMV-BoNT-C, A2-CMV-BoNT-E, and A2-CMV-BoNT-F. Neurons were also infected with amplicon vectors expressing A2-CMV-BoNT-A-syntaxin (STX), A2-CMV-BoNT-B-syntaxin (STX), and A2-CMV-BoNT-C-VAMP2 (V2). Vector expressing A2-CMV-Luc was used as negative control. In all cases, HCMV promoter drove expression of the transcription cassettes. The following day, infections were stopped and cell proteins were analyzed by Westerns blots. As shown in the figure, each BoNT LC synthesized in the neurons cleaved the expected SNARE protein: thus, the light chains of BoNT-A, -C and -E, cleaved SNP25, as evidenced by the decrease in size of this protein, whereas the light chains of BoNT-B, and -F, cleaved VAMP2, which is no more detectable in the blots. In addition, BoNT-C also cleaved Syntaxin (STX), also no more visible in the blots. BoNT-C is the only botulin toxin described to cleave two different SNARE proteins (SNAP25 and STX). The light chains of *botulinum* toxins fused to the signal and transmembrane peptides of SNARE proteins cleaved the corresponding SNARE proteins exactly as the parental non-fused toxins did. The lane Luc shows the positions of native, non-cleaved, SNARE proteins (arrows). This figure therefore demonstrates that the light chains of botulin toxins (fused or not with fragments of the SNARE proteins) synthesized in sensory neurons upon vector infection, are able to cleave their corresponding target proteins.

FIG. 10. Light chains of botulin toxins inhibit release of neuropeptides in sensory neurons.

Primary cultures of rat embryonic DRG neurons are infected at increasing MOI (from 0.5 to 3 pfu/cell) with amplicon vectors expressing A2-CMV-BoNT-A, A2-CMV-BoNT-B, A2-CMV-BoNT-C, A2-CMV-BoNT-D, A2-CMV- BoNT-E, and A2-CMV-BoNT-F. Neurons were also infected with amplicons expressing A2-CMV-BoNT-A-syntaxin, A2-CMV-BoNT-B-syntaxin, and A2-CMV-BoNT-C-VAMP2. Vector expressing A2-CMV-Luc was used as negative control. Neurons were also infected with vehicle only (mock). The following day, the infected neurons were treated with 75 mM KCl to stimulate release of CGRP, a neuropeptide normally synthesized in DRG neurons.

Thirty minutes before and thirty minutes after KCl treatment, 100 microliters aliquots were taken from the culture media and assessed for the presence of CGRP by ELISA (using the CGRP ELISA kit from Spi Bio, ref N° A05482). Results, expressed as linear regression profiles after logarithm conversion, show that all toxins inhibited CGRP release but that they do it with different intensities, with BoNT-F, BoNT-C and BoNT-A being the most effective in this respect. In mock-infected neurons, as well as in neurons infected with the vector expressing Luc, no inhibition of CGRP release was observed. These results clearly indicate that cleavage of SNARE proteins by BoNT LC results in inhibition of neuropeptide release, and that BoNT-F is the most efficient in this respect.

FIG. 11. GAD67 expressed from amplicon vectors induces synthesis and extracellular release of GABA (gamma amino-butyric acid).

7A) Glioblastoma cells (Gli36) were infected at MOI 0.1, 1.0 and 10 pfu/cell with amplicon vectors expressing A2-CMV-GAD67 or A2-CMV-Luc. The following day, infections were stopped and cell proteins were analyzed by Western blots, using antibodies specific for GAD67 and GAPDH (a housekeeping gene used as internal control). Extracts from rat brain were used as positive controls to identify endogenous GAD67. FIG. 11A shows that expression of GAD67 increases with the MOI, demonstrating that vector A2-CMV-GAD67 does express this protein. 7B) Primary cultures of rat embryonic DRG neurons were infected at MOI 0.1, 1.0 and 10 pfu/cell with vectors expressing A2-CMV-GAD67 or A2-CMV Luc. The following day infections were stopped and both, intracellular and extracellular, concentrations of GABA were evaluated using Resazurine assay, which is a fluorescence-coupled assay for GABA (the assay is performed as indicated in Ippolito et al., 2014). The upper panel shows that the amount of intracellular GABA increases with the MOI, while the lower panel shows the increase of extracellular GABA. The channel labeled GABA is a positive control for the Resazurine assay. This result clearly shows that expression of GAD67 from the A2-CMV-GAD67 vector increases synthesis of intracellular GABA and its release to the extracellular medium.

FIG. 12. Nitroreductase (NTR) activates the nitro compound 7'nitrocoumarin and induces cell death in the presence of mitronidazole (MTZ).

8A) Human glioblastoma (Gli36) cells were infected with amplicon vectors expressing A2-CMV-NTR or A2-CMV-Luc at an MOI of 1.0 pfu/cell. Two days later, infections were stopped and protein extracts were prepared and used to assess the activation of 7'nitrocoumarin, using a fluorescence-coupled assay (assay performed as in Muller et al. 2015). FIG. 12A shows that only the proteins extracted from cells infected with vector A2-CMV-NTR induced significant activation of 7'nitrocoumarin, demonstrating that functional NTR was expressed in Gli36 cells infected with A2-CMV-NTR.

8B). To assess whether expression of NTR induced cell death in the presence of metronidazole (MTZ), Gli36 cells were infected with amplicon vectors A2-CMV-NTR or A2-CMV-Luc at an MOI of 1.0 pfu/cell. The following day cells were incubated with or without MTZ (0.5. mM) for 24 hours. Infections were then stopped and cell viability was assessed using the MTT assay (as indicated by Carmichael et al., 1987). The figure shows that MTZ significantly increased cell death of infected cells. Mock: non-infected cells.

FIG. 13. Analysis of the selectivity of expression of DRG-selective promoter candidates in autonomic and sensory ganglia from adult rats.

Rat adult sensory ganglia (DRG), autonomic sympathetic ganglia (superior cervical ganglia, SCG), and autonomic parasympathetic ganglia (paracervical ganglia, GPC) were explanted and kept as organotypic cultures. After 3 days, the ganglia were individually infected with vectors expressing A5-TRPV1-Luc, A5-rCGRP-Luc, A5-ASIC3-Luc, or A5-EF1A-Luc, all of them expressing firefly luciferase (fLuc), but driven respectively by the following promoters: rat TRPV1 (rTRPV1), rat CGRP (rCGRP), rat ASIC3 (rASIC3), and EF1a, a non-selective promoter serving as general control. Each ganglion was infected with $10^6$ vector particles. The vectors also express renilla luciferase (rLuc) driven by a viral promoter (HSV-1 IE4/5). The following day infections were stopped and cells extracts were prepared for luciferase tests using Dual-luciferase reporter assay system from Promega. Results are expressed as ratio of fLuc/rLuc and were normalized as percentage of expression of the EF1a promoter in each of DRG (left), SCG (center) and GPC (right). FIG. 13 shows that some candidate promoters, such as rTRPV1 and rCGRP promoters, express significantly higher levels of fLuc in DRG than in autonomic ganglia, while other promoters, such as rASIC3, do not display preferential activity in DRG. According to these results the rTRPV1 and the rCGRP promoters appear to display selective activity for DRG while rASIC3 does not display such selectivity when expressed from the virus genome.

FIG. 14 shows that an amplicon vector expressing the reporter protein GFP can infect primary cultures of embryonic rat DRG neurons and adult rat DRG explants, and express the transgene GFP within these neurons.

FIG. 15 Intradetrusor inoculation of defective HSV-1 vectors reach dorsal root ganglia (DRG) and express transgenes in sensory neurons innervating the bladder.

Viral vector expressing IE4/5-GFP and HCMV-Luciferase (shown in FIG. 3B,) is capable to penetrate and express both transgenic proteins in the bladder afferent neurons following their inoculation into the bladder wall of spinal cord-injured (SCI) rats. DRG neurons expressing both GFP and Luciferase (Luc) are shown in DRG ganglion L6, from which neurons that innervate the bladder extend. However, in the DRG ganglion T13, which does not innervate the bladder, the results are negative. One week post-infection, the animals were sacrificed and transgenic proteins were revealed by IHC using specific antibodies for GFP and Luciferase. These results indicate that following inoculation into the bladder wall, the vectors enter the afferent neurons innervating the bladder and are retrogradely transported through the axons to the cell bodies of the neurons to the L6 ganglia, which lie in the dorsal root ganglia (DRG), from where the viral genome express both transgenic proteins. Vectors are not able to reach or to express in neurons not innervating the bladder (T13).

FIG. 16 shows the high cell selectivity of expression of the viral vector in the dorsal root ganglia (DRG) when Luciferase is driven by the DRG-selective TRPV1 promoter. Luciferase is significantly expressed only in the afferent neurons, and not in the autonomic neurons (sympathetic or parasympathetic). Results were normalized as percentage of luciferase expression relative to that from the vector expressing Luciferase under the control of the strong but not specific HCMV promoter (both vectors are shown in FIG. 3B).

EXAMPLES

Example 1: Construction of Defective Recombinant and Amplicon HSV-1 Vectors

Materials and Methods

Figure 1:
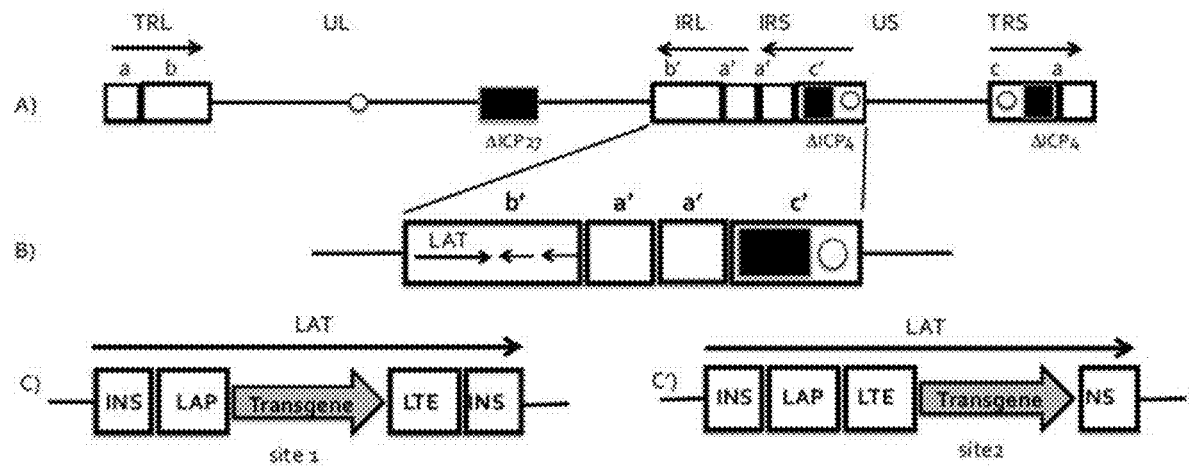
FIG. 1. Genome of recombinant defective HSV-1 vectors.

The invention provides set of defective recombinant HSV-1 vectors comprising complete deletions of ICP27 and ICP4 (both copies), and which carries, in addition, the therapeutic transcription cassettes embedded into the LAT locus, either between the LAP and LTE sequences (site 1) or between the LTE and INS sequences (site 2), as shown in FIG. 1 and FIG. 2, to provide long-term expression to said cassette. Some of the transcription cassettes used to generate these vectors are shown in FIG. 3.

Said transcription cassettes express the light chains (LC) of the *Clostridium* toxins TeNT (LC), BoNT-A (LC), BoNT B (LC), BoNT-C (LC), BoNT E (LC), BoNT-F (LC), or an antisense RNA (asRNA) directed to the SNARE proteins, VAMP2, SNAP25 and Syntaxin, or fusion SNARE/light-chain toxins, or the human GAD67 protein or a RIP protein such as Saporin S6, or the *E. coli* NTR nfnB, to inhibit/silence neurotransmission specifically in afferent neurons when, placed under the control of an afferent neuron-specific promoter.

To generate the vectors, we used a full-length HSV-1 genome of strain F cloned into a bacterial artificial chromosome (BAC) such as that described by Tanaka et al, 2003. Gene deletions and gene insertions were introduced by homologous recombination in bacteria and the vectors were then reconstituted by transfection of permissive cell lines as already described (Tanaka et al. 2003). The general structure of these vectors is illustrated in FIG. 1A.

Genome of HSV-1 Amplicon Vectors. FIG. 2

The invention also provides a set of defective amplicon vectors, which express the same transgenic therapeutic transcriptions cassettes as the recombinant vectors, and listed in FIG. 7. Sequences conferring long-term expression (LTE and INS) surround the transcription cassettes (FIG. 2). FIG. 2 also shows that in addition to the therapeutic transcription cassettes, amplicon vectors carry a second transcription cassette, expressing a reporter protein (either GFP or the fusion protein GFP/renilla luciferase) driven in all cases by the HSV-1 IE4/5 promoter.

Amplicon vectors are produced using as helper the defective LaLdeltaJ virus and the complementing cell lines already described by Epstein and collaborators (Zaupa, Revol-Guyot and Epstein, 2003), which expresses the set of proteins required for amplification and packaging of the vector genome.

Transcription Cassettes Carried by Recombinant and Amplicon Vector Genomes. FIG. 7

The recombinant and amplicon vectors described in this invention carry and express transgenic transcription cassettes embedded into HSV-1 sequences that confer long-term expression (LAP, LTE, INS), in both types of vectors, as shown in FIGS. 1 and 2. Some examples of the transcription cassettes used in this invention are listed in FIG. 7.

Example 2. HSV-1 Amplicon Vectors

The invention also provides a set of defective amplicon vectors, some of these vectors express either reporter proteins (luciferase) or the light chains (LC) of the *Clostridium* toxins (TeNT (LC), BoNT-A (LC), BoNT B (LC), BoNT-C (LC), BoNT E (LC), BoNT-F (LC)), or an antisense RNA (asRNA) directed to the SNARE proteins, VAMP2, SNAP25 and Syntaxin, or chimeric SNARE/light-chain toxins, or the human GAD67 protein or a RIP protein such as Saporin S6 or a nitroreductase (NTR) protein such as nfnB. The promoters (prom) that drive the expression of these transgenes are either non-specific promoters (HCMV, EF1A), or afferent neuron-specific of promoters (TRPV1, TRPM8, ASIC3, GCRP, ADVl). Additional sequences conferring long-term expression (LTE and DNA insulator sequences) are added to some of these promoters (FIG. 3A). The promoter that governs the expression of the reporter GFP, or the GFP-rLuc fusion protein, present in amplicon vectors, is the viral immediate-early promoter known as HSV-1 IE4/5 promoter. The general structure of some of the amplicon vectors used herein is shown in FIG. 3B.

Example 3: Expression of BoNT-A, BoNT-C and TeNT. FIG. 4

The expression of BoNT-A (LC), BoNT-C (LC) and TeNT (LC) is performed in Gli36 (a cell line derived from a human glioblastoma) and BHK21 (hamster fibroblast cells) cell lines. Gli36 and BHK21 cells are infected with the amplicon vectors expressing HCMV-Luc, HCMV-BoNT-A (LC), HCMV-BoNT-C (LC), or HCMV-TeNT (LC). The cells were then fixed and the expression of the toxin was demonstrated by Western blot using anti-TeNT antibodies to reveal TeNT (LC) and anti-HIS antibodies to reveal BoNT-A (LC) and BoNT-C (LC). Indeed, there is no efficient anti-BoNT antibodies available, therefore BoNT-A (LC) and BoNT-C (LC) are expressed as a fusion protein with a C-terminal HIS-tag. FIG. 4 shows that the viral vector carrying the genes coding for HCMV-BoNT-A (LC), HCMV-BoNT-C (LC), and HCMV-TeNT (LC) express respectively BoNT-A (LC), BoNT-C (LC) and TeNT (LC) in both Gli36 and BHK21 cells.

Example 4: In Vitro Proteolytic Activity of the Recombinant Toxin TeNT. FIG. 5

Proteolytic activity of the toxin TeNT (LC) with respect to VAMP2 was evaluated by Westerns blots using anti-VAMP2 antibody. The toxin TeNT (LC) was expressed in Gli36 cells after infection with the viral expression vector expressing HCMV-TeNT (LC). The infection was terminated 2 days later and protein extracts were prepared. These extracts were incubated in a suitable buffer (containing 50 mM Hepes, 400 mM NaCl, 5 mM dithiothreitol and 2 μM ZnSO4) containing the target protein of TeNT, i.e VAMP2. Westerns blots (FIG. 5) were performed using 2.5, 5, and 10 μL of cell extracts. Untreated sample, a sample from cells infected with a vector expressing no transgene (pA-1), and a sample from cells infected with a vector expressing HCMV-Luc (10 μL) were used as a negative control. Varying amounts of recombinant TeNT (recTeNT) were used as a positive control. Results show that the quantity of VAMP2 decreases when the protein extract expressing TeNT (LC) is increased, which demonstrate that the toxin present in the protein extract exhibits a proteolytic activity toward VAMP2.

Figure 6B:
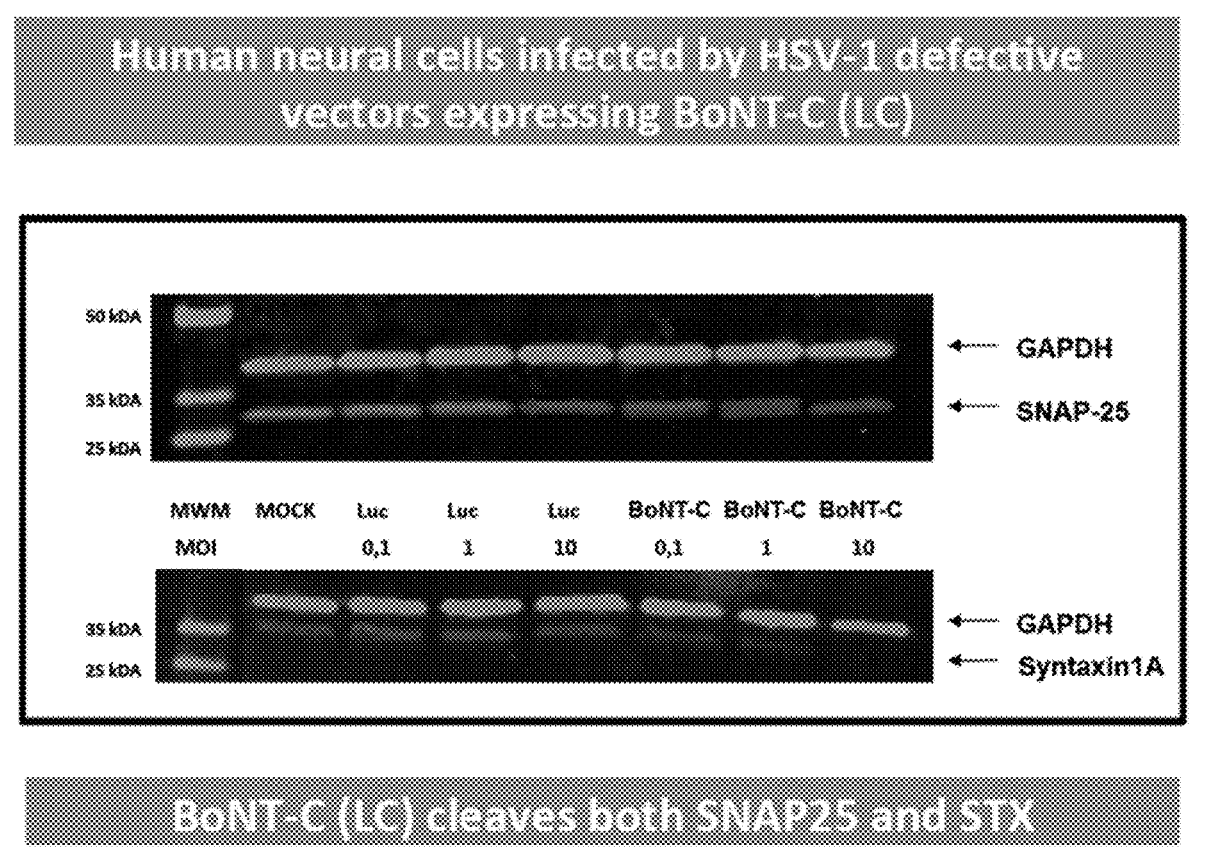

Example 5: In Cellulo Proteolytic Activity of the Recombinant Toxins BoNT-A (LC) and BoNT-C (LC). FIG. 6

The SH-S5Y5 human neuroblastoma cell line was used for their property to spontaneously express SNARE proteins, in order to follow in cellulo SNAP25 and Syntaxin 1a (STX) cleavage following infection by amplicon vectors expressing BoNT-A (LC) or BoNT-C (LC). SNAP25 and STX levels were detected by Western blot assay using anti-SNAP25 or anti-STX antibodies respectively. As negative controls, cells were not infected (Mock) or were infected with the vector expressing HCMV-Luc. Results (FIGS. 6a and 6b) show that at 48 hours post-infection (hpi) of SH-S5Y5 cells with vectors expressing the light chains of BoNT-A or BoNT-C, there is respectively cleavage and significant decrease of in cellulo SNAP25 (FIG. 6a) or SNAP25 and STX (FIG. 6b) protein levels relative to cells infected with the control vector expressing Luciferase.

Figures 8, 9:
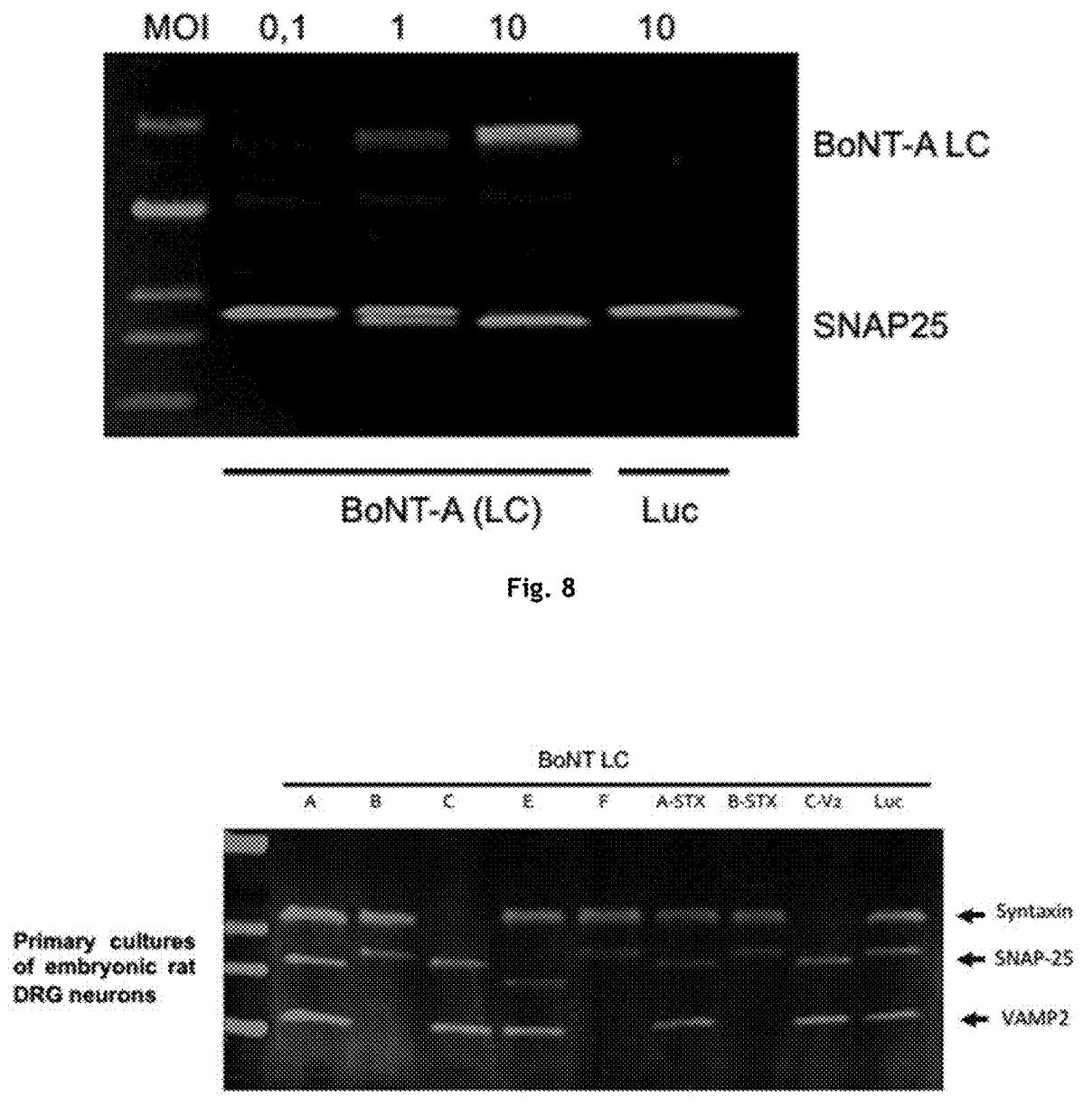

Example 6. FIG. 8

BoNT-A Expressed from Amplicon Vectors Cleaves the SNARE Protein SNAP25 in SH-SYS5 Cells This experiment was designed to assess whether vectors expressing the light chain of BoNT-A do express this protein, and to study whether this toxin has the same biological activity that the complete neurotoxin (light chain+heavy chain), i.e., the ability to cleave its target SNARE protein (SNAP25). As shown in FIG. 8, cells infected at increasing multiplicities with amplicon expressing A2-CMV-BoNT-A do express increasing amounts of the toxin. Moreover, when cells are infected at high MOI virtually all SNAP25 is cleaved, clearly demonstrating the functional activity of the light chain of BoNT-A.

Example 7. FIG. 9

Light Chains of Botulin Neurotoxins Cleave SNARE Proteins in Infected Neurons

This experiment was designed to confirm that all BoNT light chains synthesized in vector-infected neurons are able to cleave their natural SNARE target protein in sensory neurons. To this end, primary cultures of rat embryonic DRG neurons were infected at an MOI of 10 with amplicon vectors expressing A2-CMV-BoNT-A, -B, -C, -D, -E and -F, or A2-CMV-Luc as negative control. Infections were stopped the following day and cell extracts were analyzed by Western blots. As shown in FIG. 9, each of the *botulinum* neurotoxin expressed by the vectors cleaved its natural target SNARE protein. Thus, BoNT-A and -E cleaved SNAP25, BoNT-B, -D and -F cleaved VAMP2, while BoNT-C cleaved both SNAP25 and Syntaxine. This clearly demonstrates that the light chains of all neurotoxins display the same biological activity as the complete neurotoxins (light chain+heavy chain).

Figure 10:
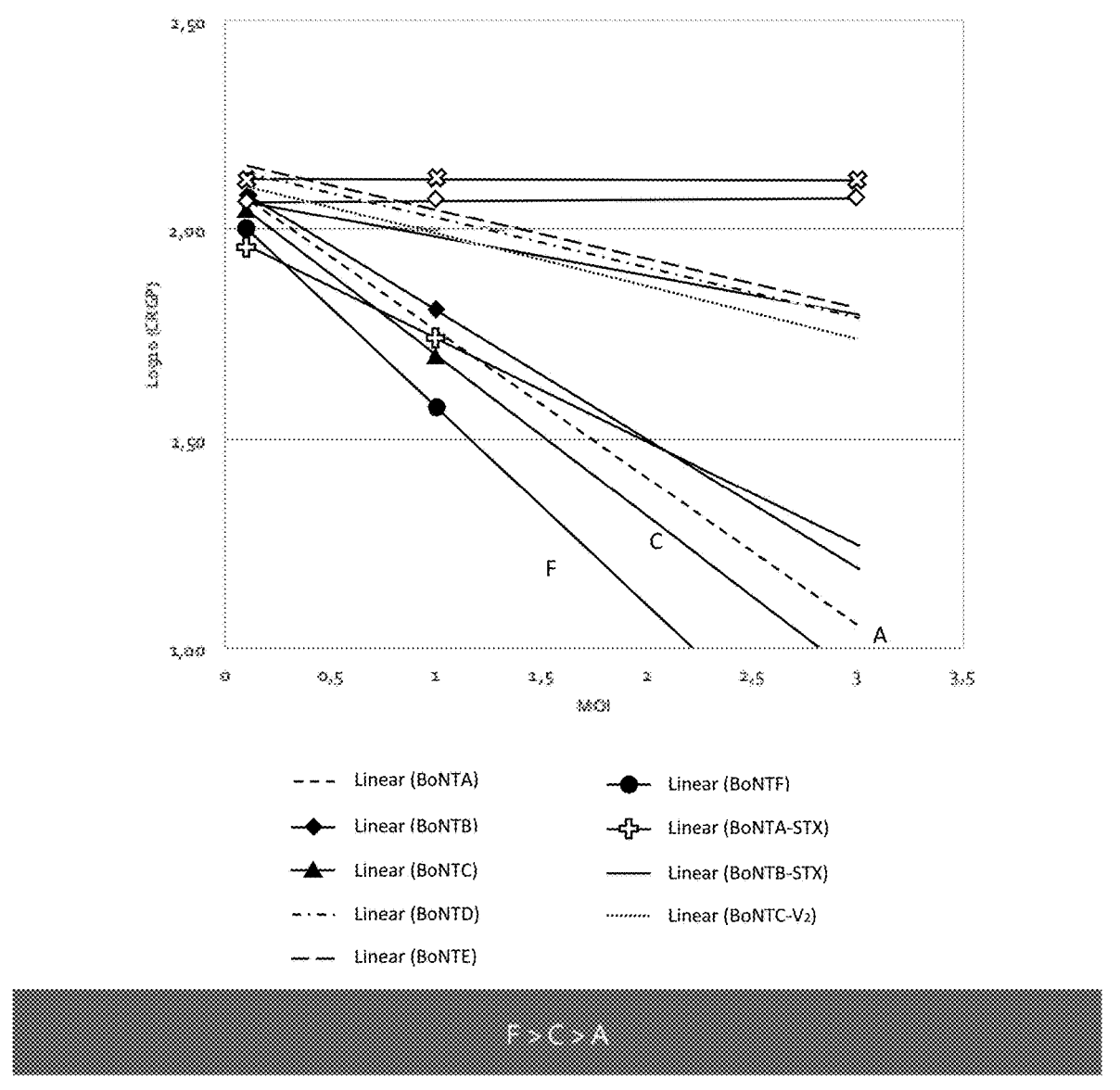

Example 8. FIG. 10

Light Chains of Botulin Toxins Inhibit Release of Neuropeptides in Sensory Neurons This experiment was designed to assess whether the light chains of *botulinum* neurotoxins induced inhibition of release of neurotransmitters and to evaluate their comparative efficacy in this respect. Primary cultures of rat embryonic DRG neurons were infected at increasing MOI with the vectors as described in FIG. 10. The following day, infected neurons were treated with KCl to stimulated release of neuropeptide CGRP and the extracellular concentrations of CGRP were evaluated by ELISA. As shown in FIG. 10, all neurotoxins induced inhibition of release of CGRP. Moreover, FIG. 6 shows that BoNT-F was the most effective in this respect, followed by BoNT-A and -C.

Example 9. FIG. 11

GAD67 Expressed from Amplicon Vectors Induces Synthesis and Extracellular Release of GABA The goal of this experiment is to assess whether vectors expressing GAD67 induce synthesis and release of the inhibitory neutransmitter GABA. To this end, glioblastoma cells (Gli36) were infected at increasing MOI with amplicon vectors as described in FIG. 11 and the following day infected cell extracts were analyzed by Western blots, using antibodies specific for GAD67 and GAPDH. FIG. 11 shows that expression of GAD67 increases with the MOI, demonstrating that vector A2-CMV-GAD67 does express this protein. In addition, primary cultures of rat embryonic DRG neurons were infected at different MOIs with the same vectors. The following day infections were stopped and both, intracellular and extracellular, concentrations of GABA were evaluated using Resazurine assay (as indicated in the legend to FIG. 11). The upper panel of this figure shows that the amount of intracellular GABA increases with the MOI, while the lower panel shows the increase of extracellular GABA, clearly demonstrating that expression of GAD67 from the A2-CMV-GAD67 vector increases synthesis of intracellular GABA and its release to the extracellular medium.

Example 10. FIG. 12

Nitroreductase (NTR) Activates the Nitro Compound 7'Nitrocoumarin and Induces Cell Death in the Presence of Mitronidazole (MTZ)

This experiment was designed to assess whether nitroreductase expressed from amplicon vectors induced cell death in the presence, but not in the absence of metronidazole. There are no available antibodies specific for nitroreductase (NTR). Therefore, to assess that this protein is expressed in A2-CMV-NTR infected cells, we used a functional in vitro test based on the evaluation of reduction of 7' nitrocoumarin (Muller et al., 2015). FIG. 12 shows that amplicon vectors expressing A2-CMV-NTR do activates the nitro compound. Furthermore, FIG. 12 shows that expression of NTR induced significant cell death in the presence of metronidazole (MTZ). This is explained by the fact that NTR can activate MTZ thus transforming this molecule into a cytotoxic drug.

Figure 13:
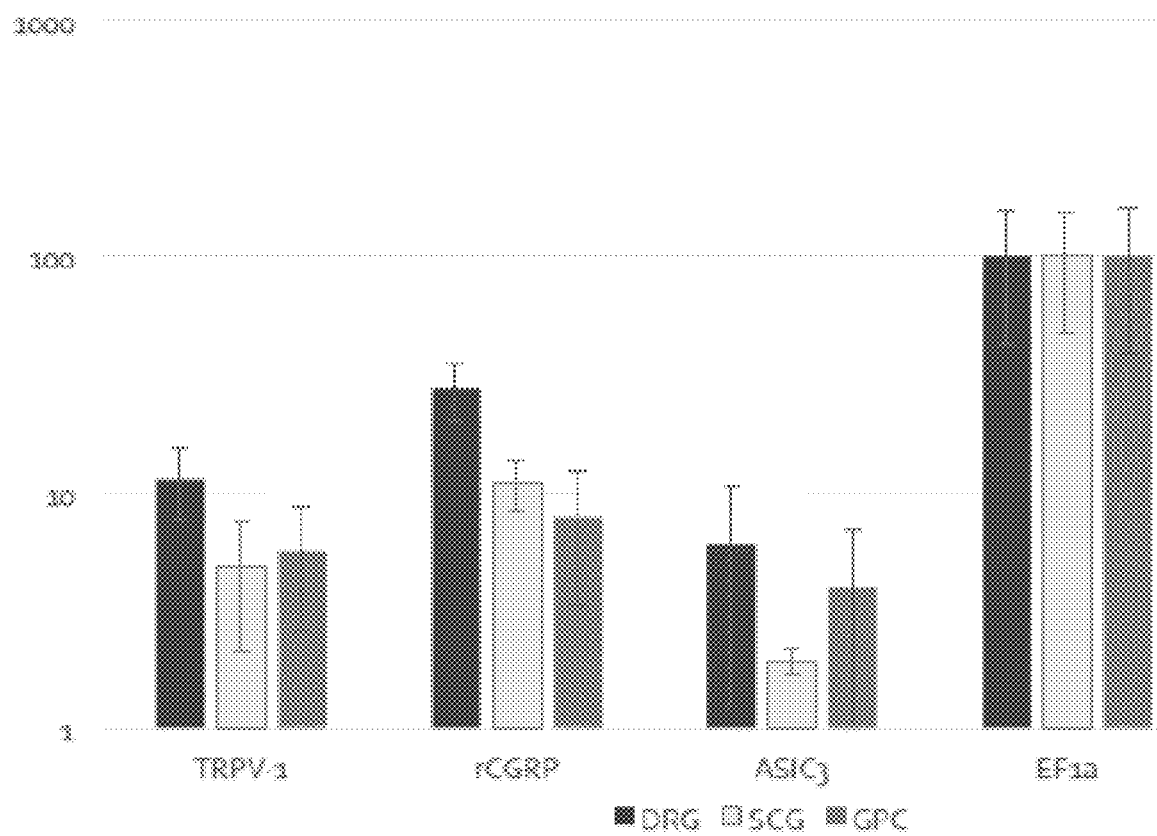

Example 11. FIG. 13

Analysis of the Selectivity of Expression of DRG-Selective Promoter Candidates in Autonomic and Sensory Ganglia from Adult Rats This test was designed to investigate whether afferent neuron-specific promoter candidates, which normally are active only or mainly in afferent neurons, preserve their afferent neurons-specific activity also when they are expressed from the non-replicative HSV-1 vector genome. Rat adult afferent ganglia (DRG), autonomic sympathetic ganglia (SCG), and autonomic parasympathetic ganglia (GPC) were explanted and kept as organotypic cultures. After 3 days, a time required for neurite outgrowth, the ganglia were individually infected with $3\times10^6$ vector particles as described in the legend to FIG. 13. These vectors express firefly luciferase (fLuc) driven by the following promoters: rat TRPV1 (rTRPV1), rat CGRP (rCGRP), rat ASIC3 (rASIC3), all of which are considered as afferent-neuron specific promoters, and EF1a, a non-selective promoter serving as general control. In addition to fLuc, these vectors also express renilla luciferase (rLuc) driven by a viral promoter (HSV-1 IE4/5). The following day infections were stopped and cells extracts were prepared for luciferase tests. Results are expressed as the ratio of fLuc/rLuc and as percentage of luciferase activity driven by EF1a. FIG. 13 shows that rTRPV1 and rCGRP express firefly luciferase activity preferentially in DRG and can thus be considered as DRG-specific even when they express from the vector genome. In contrast, rASIC3 does not display such preferential expression in the DRG demonstrating that this promoter does not preserve its selectivity when expressed from the vector genome. Therefore, this example shows that some DRG-specific promoter candidates, such as the rTRPV1 and rCGRP promoters, do preserve their selectivity for DRG while other promoter candidates, such as rASIC3, although considered a DRG-specific promoter when it expresses from the cellular chromosomes, does not preserve this specificity when expressed from the vector genome. Therefore, the behavior of any particular DRG-specific promoter candidate cannot be predicted and should be experimentally assessed.

Example 12: Infection and Expression of the Recombinant Protein in Cell Cultures Primary rat neuronal cultures from embryonic DRG and organotypic cultures of adult rat DRG explants were infected with and amplicon vector expressing GFP driven by the HSV-1 immediate early IE4/5 promoter. Results show that the viral expression vector infected and expressed the transgene (GFP) both in primary rat sensory neuronal cultures and in adult rat ganglion (DRG) explants (FIG. 14).

Example 13: In Vivo Expression of Recombinant Proteins in Neurons

Figure 15:
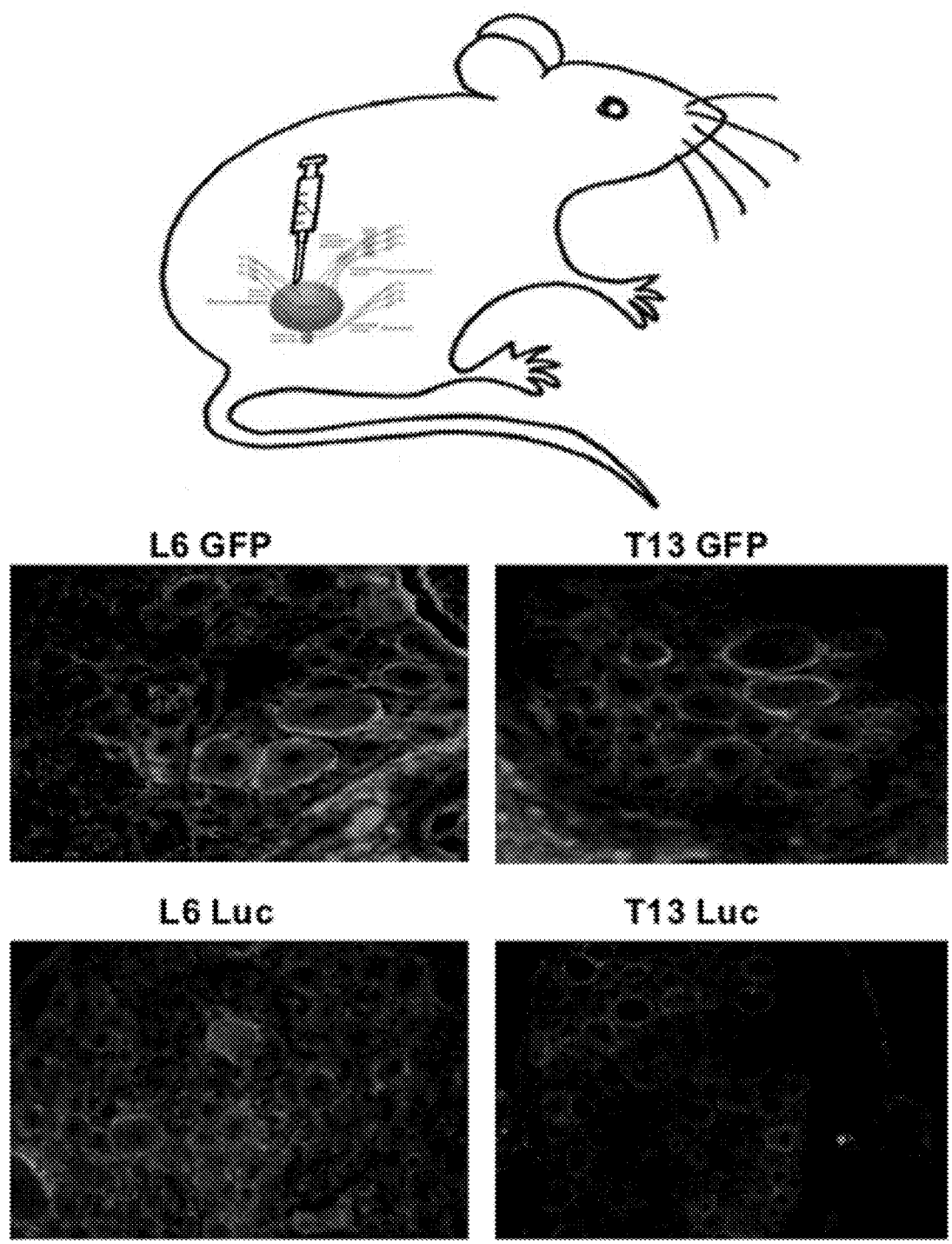

Spinal cord injured (SCI) rats were infected by the amplicon vector HCMV-Luc, which simultaneously expresses GFP and Luc reporter proteins. One week post-infection, the animals were sacrificed and transgenic proteins expressions were revealed by IHC. As indicated by the IHC, when inoculated into the bladder the amplicon vector is entering the afferent neurons innervating the bladder, and is then retrogradely transported through the axons to the cell bodies of the neurons, which lie in the dorsal ganglia (DRG), and where the viral genome express both transgenic protein. Results indicate that amplicon vectors HCMV-Luc are thus capable to penetrate and specifically express transgenic proteins into the bladder afferent neurons following their inoculation into the bladder wall (FIG. 15). Moreover, neurons expressing GFP and Luc are observed only in the ganglion from which neurons that innervate the bladder extend (the L6 ganglion). In contrast, in the ganglion T13, which does not innervate the bladder, no transgene expression could be observed (data not show).

Example 14: Cell Specificity Expression of the Viral Expression Vector

Figure 16:
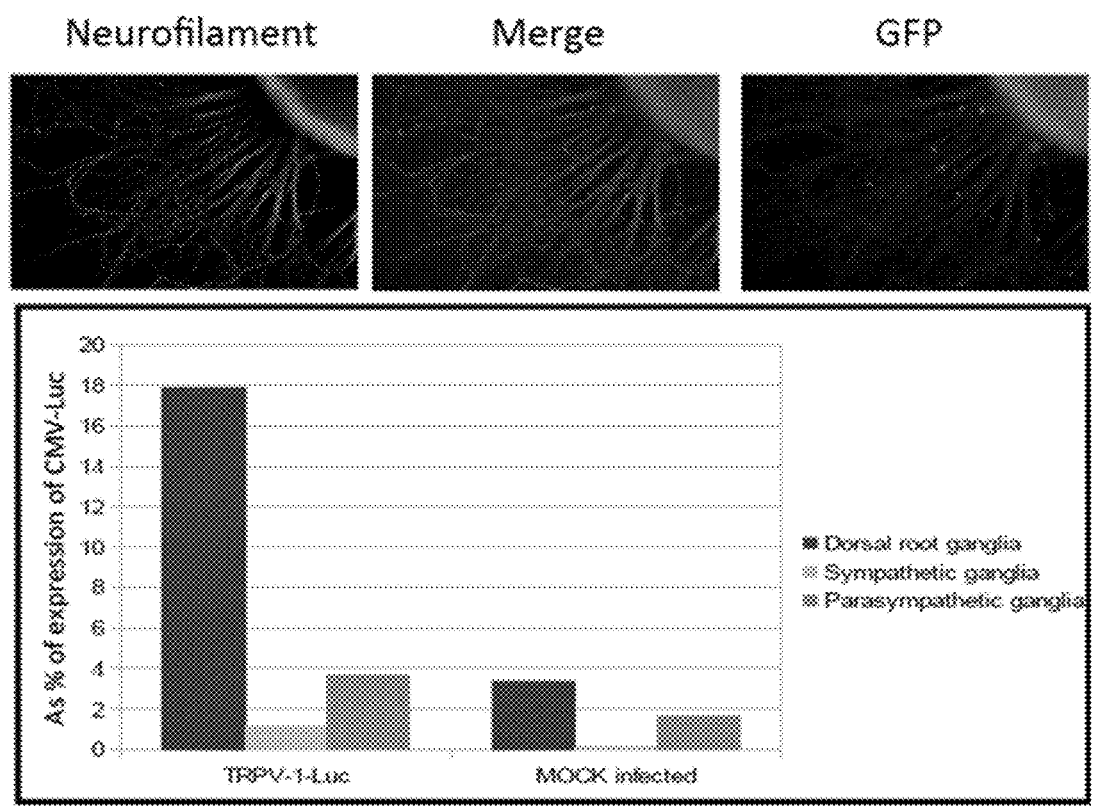

The amplicon vectors TRPV1-Luc, expressing luciferase under control of the promoter TRPV1 (promoter active selectively in afferent neurons) and HCMV-Luc, expressing luciferase under the control of the non-selective HCMV promoter, were used to infect sensory or autonomic ganglia (both sympathetic and parasympathetic ganglia). Results show that expression of the luciferase under TRPV1 promoter is specifically expressed in the afferent neurons of the sensory ganglia (Dorsal Root Ganglia, DRG), and not in the autonomic neurons (sympathetic or parasympathetic) (FIG. 16). Results are expressed as percentage of expression driven by the non-selective HCMV promoter, which is equally high in all types of ganglia.

BIBLIOGRAPHIC REFERENCES

Amelio A L, McAnany P K and Bloom D C. A chromatin insulator-like element in the herpes simplex virus type 1 latency-associated transcription region binds CCCTC-binding factor and displays enhancer-blocking and silencing activities. Journal of Virology 80: 2358-2368 (2006).

Berthommé H, Lokensgard J, Yang L, Margolis T, and Feldman L T. Evidence for bidirectional element located downstream from the herpes virus simplex type 1 latency-associated promoter that increases its activity during latency Journal of Virology 74:3613-3622 (2000).

Berthommé H, Thomas J, Texier P, Epstein A and Feldman L T. Enhancer and long-term expression functions of herpes simplex virus type 1 latency-associated promoter are both located in the same region. Journal of Virology 75: 4386-4393 (2001).

Brindley G S, Polkey C E, Rushton D N, and Cardozo L. Sacral anterior root stimulators for bladder control in paraplegia: the first 50 cases. J Neurol Neurosurg Psychiatry 49: 1104-1114 (1986).

De Groat W C. Spinal cord projections and neuropeptides in visceral afferent neurons. Prog Brain Res 67:165-187 (1986).

De Groat W C and Yoshimura N. Mechanisms underlying the recovery of lower urinary tract function following spinal cord injury. Prog Brain Res 152: 59-84 (2006).

Epstein A L. HSV-1-derived amplicon vectors: recent technological improvements and remaining difficulties—A review. Mem Inst Oswald Cruz 104: 339-410 (2009).

Fowler C J, Griffiths D and de Groat W C. The neural control of micturition. Nat Rev Neurosci 9: 453-466 (2008).

Furuta Y, Takasu T, Fukuda S, Inuyama Y, Sato K C, Nagashima K. Latent herpes simplex virus type 1 in human vestibular ganglia. Acta Otolaryngol Suppl. 1993; 503:85-9.

Habermann E, and Dreyer F. Clostridial neurotoxins: handling and action at the cellular and molecular level. Curr. Top. Microbiol. Immunol. 129: 93-179 (1986).

Lokensgard J R, Berthommé H and Feldman L T. The latency-associated promoter of herpes simplex virus type 1 requires a region downstream of the transcription start site for long-term expression during latency. Journal of Virology 71: 6714-6719 (1997).

Marconi P, Manservigi R and Epstein A L. HSV-1-derived helper-independent defective vectors, replicating vectors and amplicon vectors, for the treatment of brain diseases. Current opinion in drug discovery and development 13: 169-183 (2010).

McCart J A1, Wang Z H, Xu H, Hu Y, Park B, Alexander H R, Bartlett D L. Development of a melanoma-specific adenovirus. Mol Ther, 2002 October; 6(4):471-80.

Morrison J F, Birder L, Craggs M, de Groat W C, Downie J W, Drake M, Fowler C J, Thor K B. Neural control. In: Abrams P, Cardozo L, Khoury S, Wein A, editors. Incontinence. Plymouth: Health, 363-422 (2005).

Perng G, Ghiasi H, Slavina S M, Nesburn A B, and Wechsler S. The spontaneous reactivation function of the herpes simplex virus type 1 LAT gene resides completely within the first 1.5 kilobases of the 8.3-kilobase primary transcript. Journal of Virology 70: 976-984 (1996).

Ren J, Chew D J, Biers S, Thiruchelam N. Electrical nerve stimulation to promote micturition in spinal cord injury patients: A review of current attempts. Neurourolt Urodyn. doi: 10.1002/nau.22730. [Epub ahead of print] (2105).

Sugiyama H. *Clostridium botulinum* neurotoxin. Microbiol. Rev. 44, pp.419-448 (1980).

Tanaka M, Kagawa H, Yamanashi Y, Sata T, and Kawaguchi Y. Construction of an excisable bacterial artificial chromosome containing a full-length infectious clone of herpes simplex virus type 1: viruses reconstituted from the clone exhibit wild-type properties in vitro and in vivo. Journal of Virology 77: 1382-1391 (2003).

Warren K G, Brown S M, Wroblewska Z, Gitden D, Koprowski H, Subak-Sharpe J. Isolation of latent herpes simplex virus from the superior cervical and vagus ganglions of human beings. N Engt J Med. 1978 May 11; 298(19):1068-9.

Zaupa C, Revol-Guyot V and Epstein A L. Improved packaging system for generation of high-level noncytotoxic HSV-1 amplicon vectors using Cre-loxP site-specific recombination to delete the packaging signals of defective helper genomes. Human Gene Therapy 14: 1049-1063 (2003).

The invention claimed is:

1. A herpes simplex virus 1 (HSV-1) viral expression vector comprising at least:
   a) one promoter active selectively in afferent neurons of the bladder, wherein said promoter active selectively in afferent neurons of the bladder is a promoter of Calcitonin Gene Related Peptide (CGRP);
   b) at least one transcription cassette comprising a nucleotide sequence operably linked to said promoter,
      wherein said nucleotide sequence prevents the neurotransmitter filled synaptic vesicles from attaching to the presynaptic membrane, therefore inhibiting exocytosis of the neurotransmitter from the presynaptic nerve terminal, and
      wherein said nucleotide sequence codes for a wild-type or a modified bacterial neurotoxin light chain of Clostridium tetani or botulinum or for an active fragment thereof disrupting the SNARE complex or an active fragment thereof; and
   c) one sequence conferring long-term expression, wherein said long-term expression sequence is an LTE and a DNA insulator from the HSV-1 genome and wherein said transcription cassette is placed between the LTE and the DNA insulator.

2. The viral expression vector according to claim 1, wherein said nucleotide sequence inhibits neurotransmission or synaptic transmission of afferent neurons when transcribed by disrupting at least the soluble N-ethylmaleimide-sensitive factor attachment protein receptor (SNARE) complex.

3. The viral expression vector according to claim 1, wherein said HSV-1 vector is a defective viral vector derived from HSV-1.

4. A pharmaceutical composition comprising at least one viral expression vector according to claim 1.

5. A Kit comprising at least one viral expression vector according to claim 1, and an electrical stimulation system comprising electrodes to be implanted on the sacral anterior roots, to apply intermittent stimulation pulse trains in order to achieve a sustained detrusor muscle contraction with intervals of urethral sphincter relaxation allowing urine to flow.

6. The kit according to claim 5, wherein the sacral anterior roots are S2, S3, and/or S4.

7. The viral expression vector according to claim 1, wherein said light chain of said bacterial neurotoxin is selected from a light chain of the *botulinum* neurotoxin A (BoNT-A), a light chain of the *botulinum* neurotoxin B (BoNT-B), a light chain of the *botulinum* neurotoxin C1 (BoNT-C1), a light chain of the *botulinum* neurotoxin E3 (BoNT-E3), a light chain of the *botulinum* neurotoxin F1 (BoNT-F1), or a light chain of the tetanic neurotoxin (TeNT).

8. The viral expression vector according to claim 1, wherein said light chain of said bacterial neurotoxin is a light chain of the *botulinum* neurotoxin F1 (BoNT-F1).

\* \* \* \* \*